(12) United States Patent
Kim et al.

(10) Patent No.: US 10,622,657 B1
(45) Date of Patent: Apr. 14, 2020

(54) PROTON EXCHANGE MEMBRANE FUEL CELLS

(71) Applicant: Triad National Security, LLC, Los Alamos, NM (US)

(72) Inventors: Yu Seung Kim, Los Alamos, NM (US); Kwan-Soo Lee, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 133 days.

(21) Appl. No.: 15/670,935

(22) Filed: Aug. 7, 2017

Related U.S. Application Data

(60) Provisional application No. 62/377,163, filed on Aug. 19, 2016.

(51) Int. Cl.
| | |
|---|---|
| *H01M 8/1004* | (2016.01) |
| *H01M 4/94* | (2006.01) |
| *H01M 8/103* | (2016.01) |
| *H01M 8/1048* | (2016.01) |
| *B01J 23/42* | (2006.01) |

(52) U.S. Cl.
CPC .......... *H01M 8/1004* (2013.01); *H01M 4/94* (2013.01); *H01M 8/103* (2013.01); *H01M 8/1048* (2013.01); *B01J 23/42* (2013.01)

(58) Field of Classification Search
None
See application file for complete search history.

(56) References Cited

U.S. PATENT DOCUMENTS

| | | |
|---|---|---|
| 5,525,436 A | 6/1996 | Savinell et al. |
| 6,468,684 B1 | 10/2002 | Chisholm et al. |
| 6,946,211 B1 | 9/2005 | Bjerrum et al. |
| (Continued) | | |

OTHER PUBLICATIONS

Bozkurt et al., "Proton-conducting Polymer Electrolytes based on Phosphoric Acid," *Solid State Ionics* 125(1-4):225-233 (1999).

(Continued)

*Primary Examiner* — Sarah A. Slifka
(74) *Attorney, Agent, or Firm* — Klarquist Sparkman, LLP

(57) ABSTRACT

Disclosed embodiments concern a membrane electrode assembly or a proton exchange membrane fuel cell comprising a phosphoric acid-doped polymeric membrane comprising a cationic functional group, such as an assembly or fuel cell having an ion exchange capacity of 0.8 to 3 mmol/gram and an operating temperature range of from 80° C. to 220° C. The cationic functional group can be any suitable functional group, such as ammonium, imidazolium, guanidinium, phosphazenium, sulfonium, oxonium, and phosphonium, with working embodiments typically using quaternary ammonium cationic functional groups tethered to the polymeric core. The polymeric material may be any suitable polymeric material, such as a material selected from polyaryl polymers, polyarylamides, polyimides, polystyrenes, polysulfones, polyethers, polyether sulfones, polyketones, polyetherketones, polyarylethers, polyolefins, and polynitriles. The membrane electrode assembly or a proton exchange membrane fuel cell can be used in any application now known or hereafter developed, such as a vehicle or a stationary power device.

22 Claims, 22 Drawing Sheets
(15 of 22 Drawing Sheet(s) Filed in Color)

(56) References Cited

U.S. PATENT DOCUMENTS

| | | | |
|---|---|---|---|
| 7,108,934 | B2 | 9/2006 | Narayanan et al. |
| 7,618,732 | B2 | 11/2009 | Nakato et al. |
| 7,662,194 | B2 | 2/2010 | Kim et al. |
| 7,700,241 | B2 * | 4/2010 | Best ................ H01B 1/122 429/307 |
| 7,858,260 | B2 | 12/2010 | Lee et al. |
| 7,883,791 | B2 | 2/2011 | Nakato et al. |
| 2005/0095486 | A1 | 5/2005 | Hamamoto et al. |
| 2012/0225371 | A1 | 9/2012 | Kim et al. |
| 2015/0307654 | A1 | 10/2015 | Hibbs |

OTHER PUBLICATIONS

Chen et al., "Chemically stable hybrid polymer electrolyte membranes prepared by radiation grafting, sulfonation, and silane-crosslinking techniques," *Journal of Polymer Science Part A Polymer Chemistry* 46(16):5559-5567 (2008).

Fu et al., "SPEEK/epoxy resin composite membranes in situ polymerization for direct methanol fuel cell usages," *Journal of Power Sources* 165(2):708-716, Mar. 20, 2007.

Gupta et al., "Comparison of conversion and deposit formation of ethanol and butane under SOFC conditions," *Journal of Power Sources* 158(1):497-503, available online Nov. 14, 2005.

Hibbs et al., Synthesis and Characterization of poly(phenylene)-based Anion Exchange Membrane for Alkaline Fuel Cells, *Macromolecules* 42(21):8316-8321, Aug. 24, 2009.

Huang et al., "Effects of dopant on the electrochemical performance of $Li_4Ti_5O_{12}$ as electrode material for lithium ion batteries," *Journal of Power Sources* 165(1):408-412, available online Dec. 16, 2006.

Jeong et al., "Cross-Linking Density Effect of Fluorinated Aromatic Polyethers on Transport Properties," *Macromolecules* 42(5):1652-1658, Feb. 4, 2009.

Jin et al., "Proton conduction in metal pyrophosphates ($MP_2O_7$) at intermediate temperatures," *Journal of Materials Chemistry* 20(30):6214-6217, Feb. 16, 2010.

Kim et al., "Processing induced morphological development in hydrated sulfonated poly(arylene ether sulfone) copolymer membranes," *Polymer* 44(19):5729-5736, Sep. 2003.

Kundu et al., "Mechanical Properties of Nafion™ Electrolyte Membranes under Hydrated Conditions," *Polymer* 46(25):11707-11715, 2005.

Lee et al., "Robust Hydroxide Ion Conducting Poly(biphenyl alkylene)s for Alkaline Fuel Cell Membranes," *ACS Macro Letters* 4(8):814-818, Jul. 16, 2015.

Liang et al., "FT-IR study of the microstructure of Nafion® membrane," *Journal of Membrane Science* 233(1-2):39-44, Apr. 15, 2004.

Schmidt et al., "Properties of High Temperature PEFC Celtex®-P1000 MEAs in Start/Stop Operation Mode," *Journal of Power Sources* 176(2):428-434, Feb. 1, 2008.

Xiao et al., "High-Temperature Polybenzimidazole Fuel Cell Membranes via a Sol—Gel Process," *Chemistry of Materials* 17(21):5328-5333, published online Sep. 21, 2005.

Zhang et al., "A new and facile approach for the preparation of cross-linked sulfonated poly(sulfide sulfone) membranes for fuel cell application," *Journal of Power Sources* 170(1):42-45, Jun. 30, 2007.

* cited by examiner

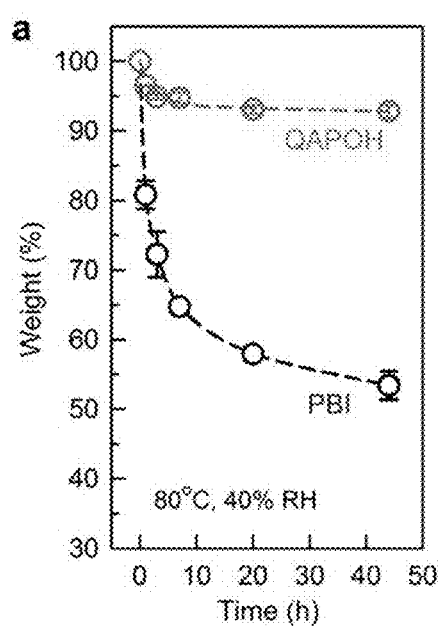
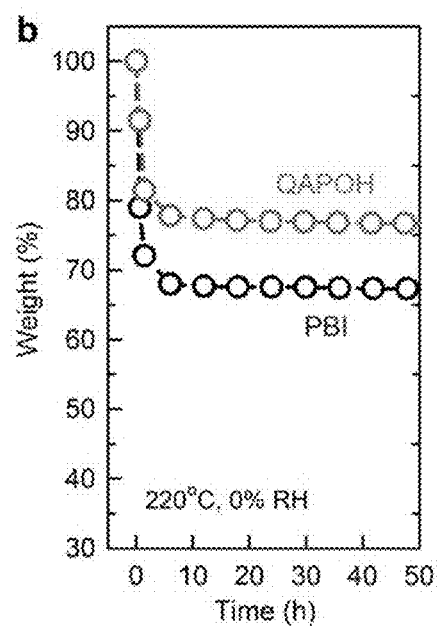
FIG. 3A          FIG. 3B

FIG. 4A
FIG. 4B
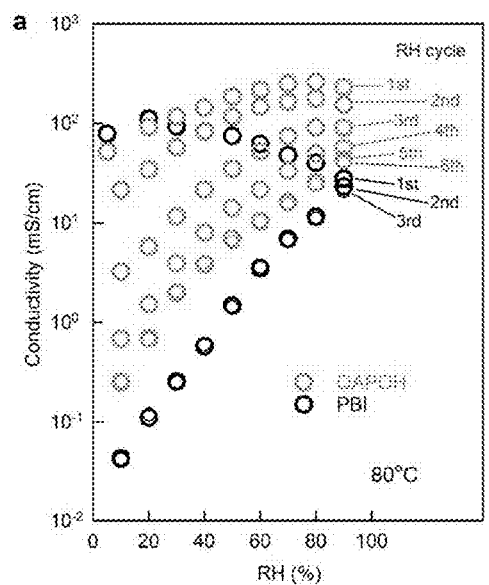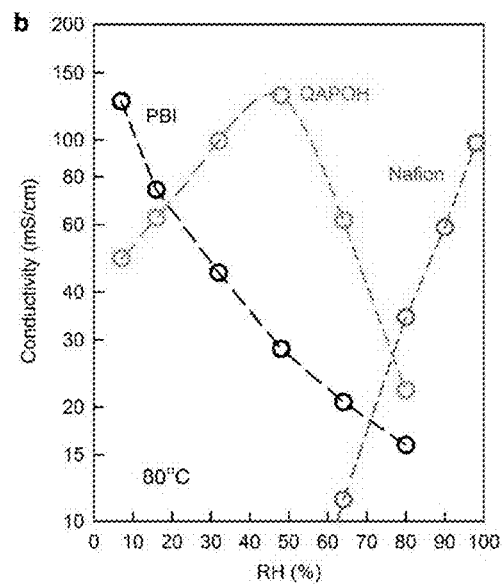
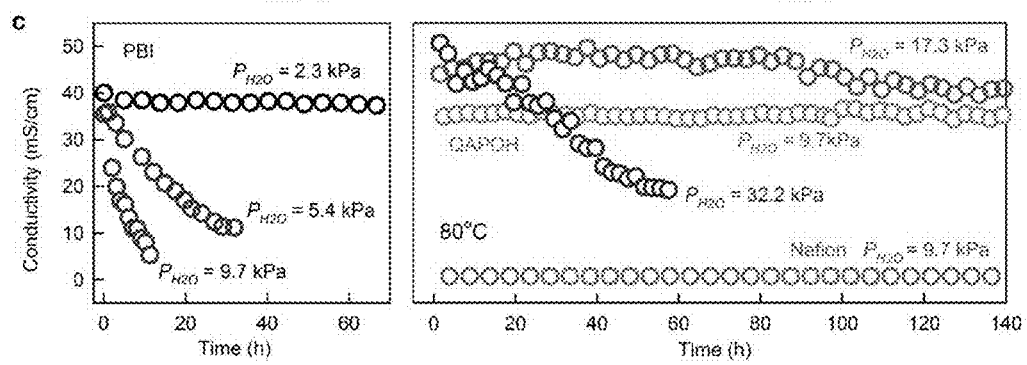
FIG. 4C

FIG. 5A    FIG. 5B    FIG. 5C
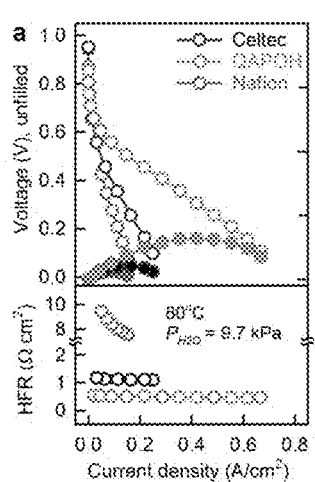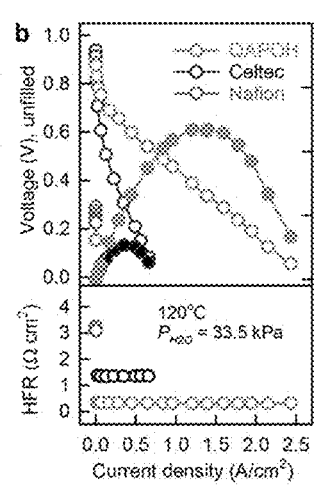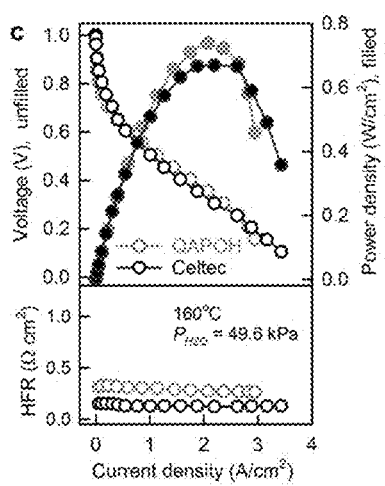
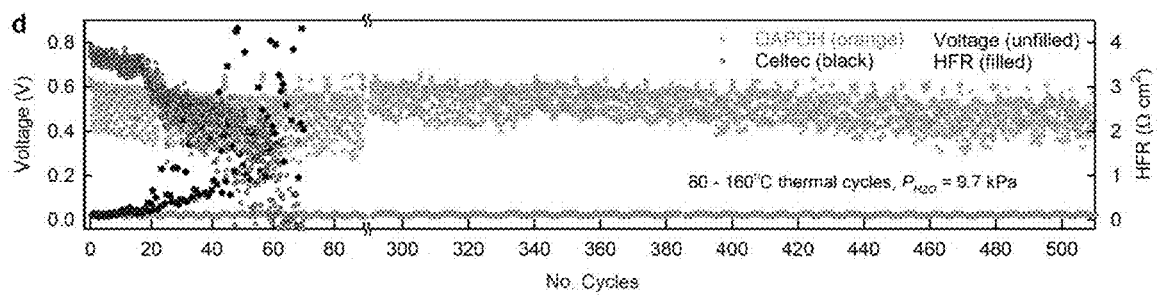
FIG. 5D

PROTON EXCHANGE MEMBRANE FUEL CELLS

CROSS REFERENCE TO RELATED APPLICATIONS

This application claims the benefit under 35 U.S.C. § 119(e) of the Aug. 19, 2016 earlier filing date of U.S. provisional patent application No. 62/377,163. U.S. provisional patent application No. 62/377,163 is incorporated herein by reference in its entirety.

ACKNOWLEDGMENT OF GOVERNMENT SUPPORT

This invention was made with government support under Contract No. DE-AC52-06NA25396 awarded by the United States Department of Energy. The government has certain rights in the invention.

FIELD

The present disclosure concerns proton exchange membrane fuel cells, particularly proton exchange membrane fuel cells comprising a phosphoric-acid-doped polymeric membrane comprising a cationic functional group.

BACKGROUND

Fuel cells are promising devices for clean power generation in a variety of economically and environmentally significant applications. By using hydrogen produced from renewable energy sources, such as solar and wind, fuel cells can provide carbon-neutral power without any pollutants, such as $SO_x$ and $NO_x$. Initial commercialization of clean, high-efficiency fuel cell electric vehicles is already underway, but further technological innovation is needed to improve cost-competitiveness of fuel cells in the marketplace.

Currently, there are two general types of fuel cells: low temperature fuel cells and high temperature fuel cells. Low-temperature proton exchange membrane (PEM) fuel cells utilizing Nafion® polymeric materials for membranes require a high level of hydration, which limits the operating temperature to less than 100° C. to preclude excessive water evaporation. The structure for Nafion® is provided below.

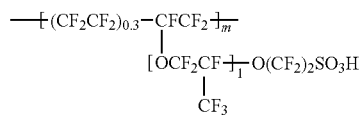

Low-temperature PEM fuel cells that use Nafion® are currently being commercialized in fuel cell vehicles, but these cells can operate only at relatively low temperatures and high hydration levels (FIG. 1A); therefore, they require humidified inlet streams and large radiators to dissipate waste heat.

In contrast, high-temperature PEM fuel cells typically utilize membranes comprising phosphoric acid-doped polybenzimidazole, shown below.

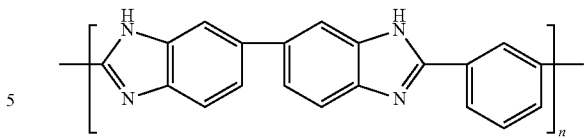

High temperature fuel cells can operate effectively up to 180° C.; however, these devices degrade when exposed to water below 140° C. High-temperature PEM fuel cells that use phosphoric acid (PA)-doped polybenzimidazole (PBI) could address these issues, but these PBI-based cells are difficult to operate below 140° C. without excessive loss of PA (FIG. 1B). The limited operating temperature range makes them unsuitable for automotive applications, where water condensation from frequent cold start-ups and oxygen reduction reaction at the fuel cell cathode occur during normal vehicle drive cycles.

Quaternary ammonium functionalized polymers are known, and some have been developed for alkaline electrochemical devices. As currently understood, phosphoric acid-doped QA functionalized polymers have been reported only once, by the Wegner research group at Max Planck Institute in 1999, A. Bozkurt et al., Proton-conducting Polymer Electrolytes based on Phosphoric Acid, *Solid State Ionics*, 125, 225 (1999). Bozkurt et al. used poly(diallyldimethylammonium) as the polymeric material used to produce the fuel cell membrane, and their approach was substantially the same as that of the PA-doped PBI in three respects: 1) the quaternary ammonium moiety of the synthesized polymer was located within the polymer backbone; 2) the quaternary ammonium moiety concentration was high (about 7.2 mmol/gram, which is comparable to that of PBI, about 6.5 mmol/gram); and 3) the researchers were primarily interested in anhydrous proton conductivity.

Despite the substantial development of fuel cell technology, there still is a need for developing fuel cells that address the substantial limitations associated with both low temperature and high temperature fuel cells.

SUMMARY

Disclosed embodiments concern a different class of PEM fuel cells comprising polymeric materials that include cationic-biphosphate ion pairs that can operate under conditions unattainable with current fuel cell technologies. Certain disclosed embodiments concern a membrane electrode assembly or a proton exchange membrane fuel cell comprising a phosphoric acid-doped polymeric membrane comprising a cationic functional group selected from ammonium

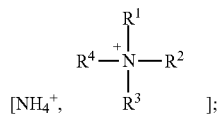

imidazolium

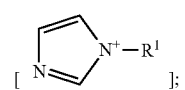

guanidinium

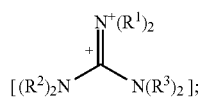

phosphazenium

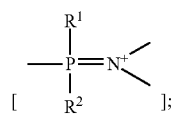

sulfonium

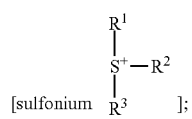

oxonium

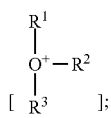

and phosphonium

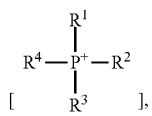

wherein $R^1$-$R^4$ are independently selected from hydrogen, aliphatic, aryl, and heteroaryl, and more typically are independently hydrogen, benzyl and alkyl, such as a $C_{1-10}$ alkyl. The polymeric material may be any suitable polymeric material, such as a material selected from polyaryl polymers, polyarylamides, polyimides, polystyrenes, polysulfones, polyethers, polyether sulfones, polyketones, polyetherketones, polyarylethers, and polynitriles.

Certain disclosed embodiment concern an assembly or fuel cell wherein the polymeric membrane has a formula

[Polymer repeating unit]$_m$-[Optional Linker]$_o$-[Cationic Functional Group (CFG)]$_n$ where m is two or more up to the number of monomeric subunits coupled to form a particular polymeric species; o is from 0 to at least m; and n is from 1 to at least o. For certain disclosed embodiments the polymeric material is cross-linked. The polymeric material also may be a substituted polymeric material, wherein the substituent is selected from alkyl, alkenyl, alkynyl, alkoxy, alkylamino, alkylthio, acyl, aldehyde, amide, amino, aminoalkyl, aryl, arylalkyl, carboxyl, cyano, cycloalkyl, dialkylamino, halo, haloaliphatic, heteroaliphatic, heteroaryl, heterocycloaliphatic, hydroxyl, nitrile, oxo, sulfonamide, sulfhydryl, thioalkoxy, or other functionality, particularly fluorine or nitrile.

A person of ordinary skill in the art will appreciate the present invention is directed to any polymeric material suitable for use in the assembly or fuel cell. For example, certain disclosed working embodiments concern polyphenylenes having a formula

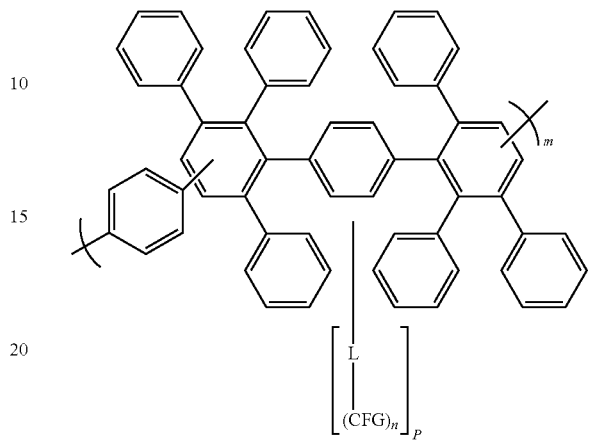

where L is a linker that links the cationic functional group to the polyphenylene core; n is from 1 to the number of possible positions on the linker; and p is the number of L-CFG units coupled to a monomeric unit. One particular example of such a polymeric material had a formula

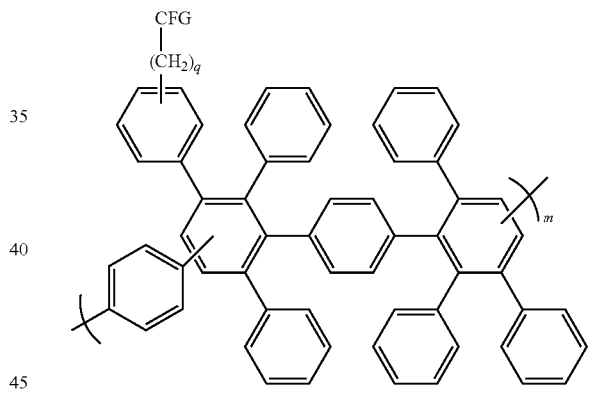

where q is $C_{1-10}$, more typically $C_{1-5}$. Other embodiments concern:

styrene polymers having a formula

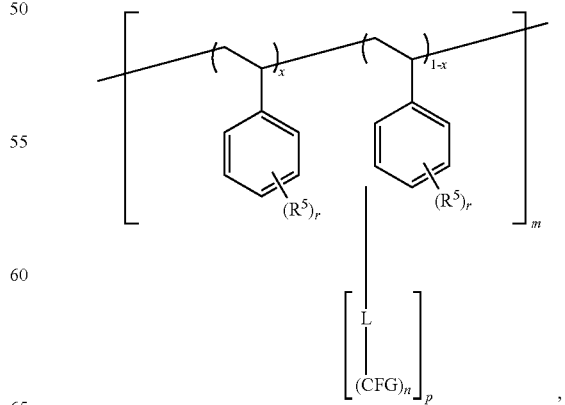

where x is from 0 to 0.99;

polyaryl compounds having a formula

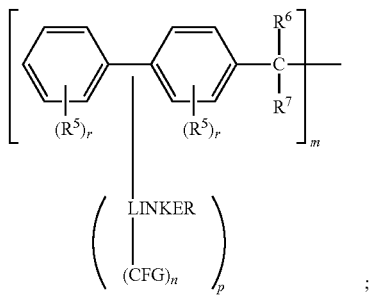

polyether sulfones having a formula

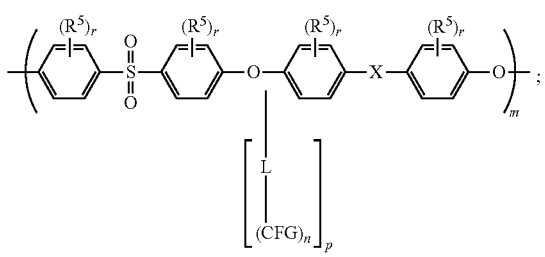

polyketones having a formula

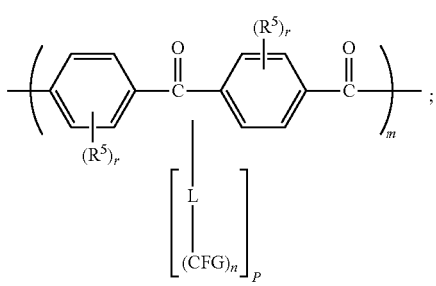

polyether ketones having a formula

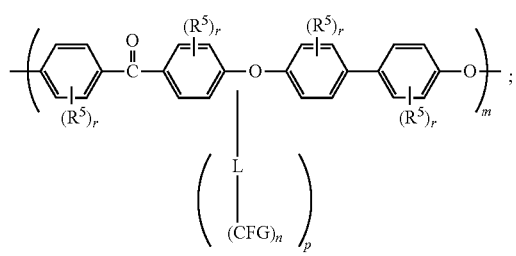

and halogenated polyarylethers or a nitrile-containing polyaryl ethers having a formula

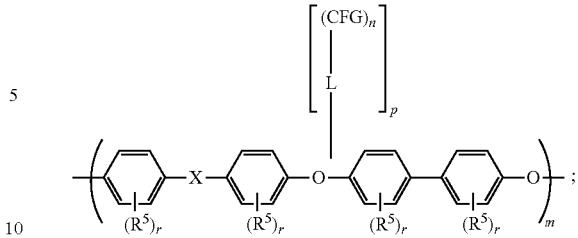

where $R^5$ is a halogen or nitrile.

Working embodiments typically used quaternary ammonium tethered, phosphoric acid-doped polyaromatic polymer. One particular example concerns quaternary ammonium (QA)-biphosphate ion pair coordinated polyaryl materials, such as polyphenylene (PA-doped QAPOH) PEMs.

Disclosed PEMs avoid the limitations of Nafion® and PBI-based fuel cells, which enables fuel cell operation under a wide range of conditions that current fuel cell technologies cannot tolerate. For example, Bozkurt et al.'s quaternary ammonium membrane had a substantially higher concentration of quaternary ammonium moieties. Stated positively, the disclosed embodiments of the present invention have a substantially lower concentration of cationic functional group moieties relative to those disclosed by Bozkurt et al. Because disclosed polymeric materials typically include cationic functional groups as side chains, such as alkyl or benzyl-linked side chains, these functional groups are more mobile than the previous Bozkurt et al. polymer system.

In certain disclosed embodiments the polymeric system has an ion exchange capacity that is different from any previously known systems, such as an ion exchange capacity of 0.8 to 3 mmol/gram, more typically 1.5 to 2.5 mmol/gram. Disclosed PEMs can conduct protons through stable ionic pair complexes and enable fuel cell operation at temperatures from 80° C. to 180° C. (FIG. 1C). Such fuel cells exhibit stable performance at 80° C. to 160° C. with more than three orders of magnitude lower conductivity decay rate than that of a commercial high-temperature PEM fuel cell. By increasing the operational flexibility, this class of fuel cell can simplify the requirements and potentially reduce the costs, associated with current, fully-functional fuel cell systems.

The membrane electrode assembly or a proton exchange membrane fuel cell can be used in any application now known or hereafter developed. For example, the assembly or proton exchange membrane fuel cell can be used in a vehicle or a stationary power device.

The foregoing and other objects, features, and advantages of the invention will become more apparent from the following detailed description, which proceeds with reference to the accompanying figures.

BRIEF DESCRIPTION OF THE DRAWINGS

The patent or application file contains at least one drawing executed in color. Copies of this patent with color drawings will be provided by the Patent and Trademark Office upon request and payment of the necessary fee.

FIG. 3A illustrates PA retention PEMs, and provides percent weight change of PA-doped polymers as a function of time at 80° C./40% RH, where the error bars represent the standard deviation for two separate measurements.

FIG. 3B illustrates PA retention PEMs, and provides percent weight change of PA-doped polymers as a function of time at 220° C./0% RH.

FIG. 4A provides proton conductivity of PEMs for in-plane proton conductivity change at 80° C. during RH cycles between 5% and 90% for PA-doped PEMs.

FIG. 4B provides proton conductivity of PEMs for in-plane equilibrated conductivity of PEMs at 80° C.

FIG. 4C provides proton conductivity of PEMs for through-plane proton conductivity change of three PEMs as a function of time, measured in fuel cell mode at 150 mA/cm$^2$ and 80° C., and cathode outlet water partial pressure, $P_{H2O}$, is calculated as 2.3, 5.4, 9.7, 17.3 and 32.2 kPa for the inlet RH of 0, 7, 16, 32 and 64%, respectively.

FIG. 5A provides fuel cell performance and durability, i-V curve, power density and high frequency resistance (HFR) for QAPOH (orange), Celtec (black) and Nafion® (olive) at 80° C., 16% inlet RH ($P_{H2O}$=9.7 kPa), 68.9 kPa backpressure, and after 10 h break-in; QAPOH thickness: 120 μm.

FIG. 5B provides fuel cell performance and durability, i-V curve, power density and high frequency resistance (HFR) for QAPOH (orange), Celtec (black) and Nafion® (olive), at 120° C., 16% inlet RH ($P_{H2O}$=33.5 kPa), 206.8 kPa backpressure, and after 14 h break-in; QAPOH thickness: 120 μm.

FIG. 5C provides fuel cell performance and durability, i-V curve, power density and high frequency resistance (HFR) for QAPOH (orange), Celtec (black) and Nafion® (olive) at 160° C., 8% inlet RH ($P_{H2O}$=49.6 kPa), 206.8 kPa backpressure, and after 40 h break-in; QAPOH thickness: 120 μm.

FIG. 5D provides HFR and cell voltage change of QAPOH (orange) and Celtec® (black) MEAs during AST; QAPOH thickness=80 μm.

DETAILED DESCRIPTION

I. Definitions

Figure 1A:
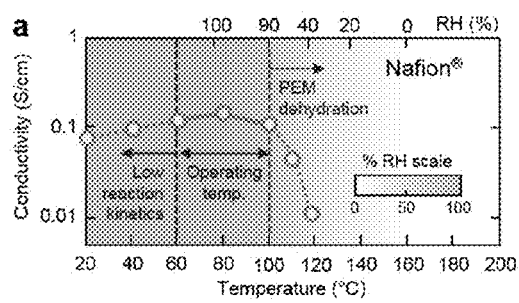
FIG. 1A illustrates the operating temperature of PEM fuel cells and PEM interactions, with a comparison of proton conductivity of Nafion®, where the background colors in the plots indicate the relative humidity (RH) of the measured data points, and the graphs provide fuel cell operating temperature and limitations.
Figure 1B:
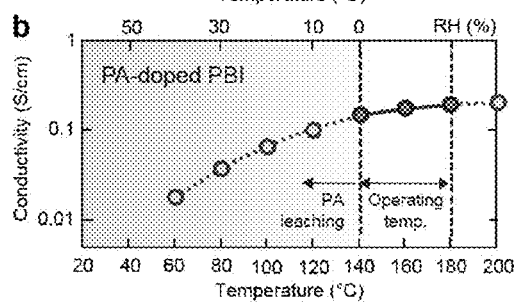
FIG. 1B illustrates the operating temperature of PEM fuel cells and PEM interactions, with a comparison of proton conductivity of PA-doped PBI where the background colors in the plots indicate the relative humidity (RH) of the measured data points, and the graphs provide fuel cell operating temperature and limitations.
Figure 1C:
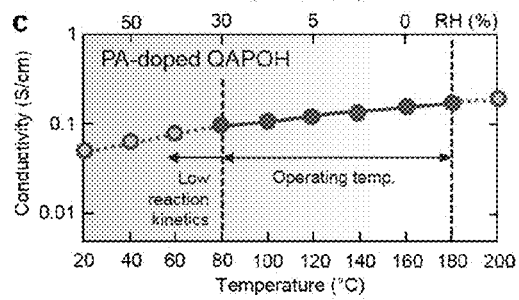
FIG. 1C illustrates the operating temperature of PEM fuel cells and PEM interactions, with a comparison of proton conductivity of PA-doped QAPOH, where the background colors in the plots indicate the relative humidity (RH) of the measured data points, and the graphs provide fuel cell operating temperature and limitations.

The following explanations of terms and methods are provided to better describe the present disclosure and to guide those of ordinary skill in the art in the practice of the present disclosure. The singular forms "a," "an," and "the" refer to one or more than one, unless the context clearly dictates otherwise. The term "or" refers to a single element of stated alternative elements or a combination of two or more elements, unless the context clearly indicates otherwise. As used herein, "comprises" means "includes." Thus, "comprising A or B," means "including A, B, or A and B," without excluding additional elements. All references, including patents and patent applications cited herein, are incorporated by reference.

Unless otherwise indicated, all numbers expressing quantities of components, molecular weights, percentages, temperatures, times, etc., as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

Unless explained otherwise, all technical and scientific terms used herein have the same meaning as commonly understood by one of ordinary skill in the art to which this disclosure pertains. Although methods and materials similar or equivalent to those described herein can be used in the practice or testing of the present disclosure, suitable methods and materials are described below. The materials, methods, and examples are illustrative only and not intended to be limiting.

When organic chemical structures are depicted or described, unless explicitly stated otherwise, all carbons are assumed to include hydrogen so that each carbon conforms to a valence of four. For example, in the structure on the left-hand side of the schematic below there are nine hydrogen atoms implied. The nine hydrogen atoms are depicted in the right-hand structure.

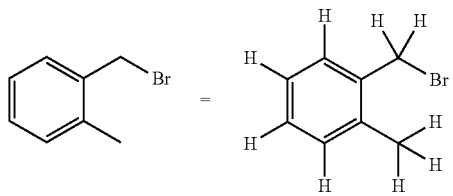

Sometimes a particular atom in a structure is described in textual formula as having a hydrogen or hydrogen atoms, for example —$CH_2CH_2$—. It will be understood by a person of ordinary skill in the art that the aforementioned descriptive techniques are common in the chemical arts to provide brevity and simplicity when describing organic structures.

Aliphatic: A substantially hydrocarbon-based compound, or a radical thereof (e.g., $C_6H_{13}$, for a hexane radical), including alkanes, alkenes, alkynes, including cyclic versions thereof, and further including straight- and branched-chain arrangements, and all stereo and position isomers as well. Unless expressly stated otherwise, an aliphatic group contains from one to twenty-five carbon atoms; for example, from one to fifteen, from one to ten, from one to six, or from one to four carbon atoms. The term "lower aliphatic" refers to an aliphatic group containing from one to ten carbon atoms. An aliphatic chain may be substituted or unsubstituted. Unless expressly referred to as an "unsubstituted aliphatic," an aliphatic group can either be unsubstituted or substituted. An aliphatic group can be substituted with one or more substituents (up to two substituents for each methylene carbon in an aliphatic chain, or up to one substituent for each carbon of a —C=C— double bond in an aliphatic chain, or up to one substituent for a carbon of a terminal methine group). Exemplary substituents include, but are not limited to, alkyl, alkenyl, alkynyl, alkoxy, alkylamino, alkylthio, acyl, aldehyde, amide, amino, aminoalkyl, aryl, arylalkyl, carboxyl, cyano, cycloalkyl, dialkylamino, halo, haloaliphatic, heteroaliphatic, heteroaryl, heterocycloaliphatic, hydroxyl, oxo, sulfonamide, sulfhydryl, thioalkoxy, or other functionality.

Alkyl: A hydrocarbon group having a saturated carbon chain. The chain may be cyclic, branched or unbranched. Examples, without limitation, of alkyl groups include methyl, ethyl, propyl, butyl, pentyl, hexyl, heptyl, octyl, nonyl and decyl. The term lower alkyl means the chain includes 1-10 carbon atoms. The number of carbon atoms in a chain also can be stated as, for example and with reference to lower alkyl, $C_{1-10}$. The terms alkenyl and alkynyl refer to hydrocarbon groups having carbon chains containing one or more double or triple bonds, respectively.

Alkylamino: A chemical functional group —N(H)R, where R is an alkyl group.

Amino: A chemical functional group —N(R)R' where R and R' are independently hydrogen, alkyl, heteroalkyl, haloalkyl, aliphatic, heteroaliphatic, aryl (such as optionally substituted phenyl or benzyl), heteroaryl, alkylsulfano, or other functionality. A "primary amino" group is —$NH_2$. "Mono-substituted amino" means a radical —N(H)R substituted as above and includes, e.g., methylamino, (1-methylethyl)amino, phenylamino, and the like. "Di-substituted amino" means a radical —N(R)R' substituted as above and includes, e.g., dimethylamino, methylethylamino, di(1-methylethyl)amino, and the like.

Aminoalkyl: A chemical functional group —$RNH_2$ where R is an alkyl group.

Ammonium: A functional group having a formula ammonium [$NH_4^+$ or

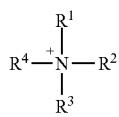

where $R^1$-$R^4$ are independently selected from hydrogen, aliphatic, aryl, and heteroaryl, and more typically are hydrogen and alkyl, such as $C_{1-10}$ alkyl.

Anionic: An anionic group is any group that has a negative charge, such as sulfate, phosphate, carboxylate, etc.

Anode: An electrode through which electric charge flows into a polarized electrical device. From an electrochemical point of view, negatively-charged anions move toward the anode and/or positively-charged cations move away from it to balance the electrons leaving via external circuitry. In a discharging battery or galvanic cell, the anode is the negative terminal where electrons flow out. For proton exchange membrane fuel cells, protons move from the anode to the cathode.

Aralkyl/arylalkyl: An aryl group (such as a phenyl group) appended to an alkyl radical including, but not limited to, benzyl, ethylbenzene, propylbenzene, butylbenzene, pentylbenzene, and the like. Conversely the term "phenylalkyl" refers to a phenyl group appended to an alkyl radical. Aralkyl groups, such as benzyl groups, may be unsubstituted or substituted with one, two or three substituents, with substituent(s) independently selected from alkyl, heteroalkyl, aliphatic, heteroaliphatic, thioalkoxy, haloalkyl (such as —$CF_3$), halo, nitro, cyano, —OR (where R is hydrogen or alkyl), —N(R)R' (where R and R' are independently of each other hydrogen or alkyl), —COOR (where R is hydrogen or alkyl) or —C(O)N(R')R" (where R' and R" are independently selected from hydrogen or alkyl). Non-limiting examples, include o-, m-, and/or p-chlorobenzyl, o-, m-, and/or p-methoxybenzyl, and o-, m-, and/or p-(trifluoromethyl)benzyl.

Aromatic or aryl: Unsaturated, cyclic hydrocarbons having alternate single and double bonds. Benzene, a 6-carbon ring containing three double bonds, is a typical aromatic compound.

Aryl: A monovalent aromatic carbocyclic group of, unless specified otherwise, from 6 to 15 carbon atoms having a single ring (e.g., phenyl) or multiple condensed rings in which at least one ring is aromatic (e.g., quinoline, indole, benzodioxole, and the like), provided that the point of attachment is through an atom of an aromatic portion of the aryl group and the aromatic portion at the point of attachment contains only carbons in the aromatic ring. If any aromatic ring portion contains a heteroatom, the group is a heteroaryl and not an aryl. Aryl groups are monocyclic, bicyclic, tricyclic or tetracyclic.

Arylalkyl: An acyclic alkyl group in which one of the hydrogen atoms bonded to a carbon atom, typically a terminal or $sp^3$ carbon atom, is replaced with an aryl group. Typical arylalkyl groups include, but are not limited to, benzyl, 2-phenylethan-1-yl, naphthylmethyl, 2-naphthylethan-1-yl, naphthobenzyl, 2-naphthophenylethan-1-yl and the like. Where specific alkyl moieties are intended, the nomenclature arylalkanyl, arylalkenyl and/or arylalkynyl may be used.

Cathode: An electrode through which electric charge flows out of a polarized electrical device. From an electrochemical point of view, positively charged cations invariably move toward the cathode and/or negatively charged anions move away from it to balance the electrons arriving from external circuitry. In a discharging battery or galvanic cell, the cathode is the positive terminal, toward the direction of conventional current. This outward charge is carried internally by protons in a proton membrane fuel cell.

Cationic: A cationic group is any group that has a positive charge, such as ammonium, phosphonium, guanidinium, etc.

Conjugating, joining, bonding, tethering or linking: Coupling a first unit to a second unit. This includes, but is not limited to, covalently bonding one molecule to another molecule, noncovalently bonding one molecule to another (e.g. electrostatically bonding) (see, for example, U.S. Pat. No. 6,921,496, which discloses methods for electrostatic conjugation), non-covalently bonding one molecule to another molecule by hydrogen bonding, non-covalently bonding one molecule to another molecule by van der Waals forces, and any and all combinations of such couplings.

Counterion(s): The ion, or ions, accompanying another ionic species to provide electric neutrality. For example, in NaOH, $Na^+$ is the counterion to $OH^-$.

Cycloalkyl: A saturated monovalent cyclic hydrocarbon radical of three to seven ring carbons, e.g., cyclopentyl, cyclohexyl, cycloheptyl and the like.

Electrolyte: A substance containing free ions that behaves as an electrically conductive medium. Electrolytes generally comprise ions in a solution, but molten electrolytes and solid electrolytes also are known. An electrolyte in contact with the anode, or negative half-cell, may be referred to as an anolyte, and an electrolyte in contact with the cathode, or positive half-cell, may be referred to as a catholyte. For fuel cells, the anolyte and catholyte typically comprise the same materials.

Ether: A class of organic compounds containing an ether group, that is an oxygen atom connected to two aliphatic and/or aryl groups, and having a general formula R—O—R', where R and R' may be the same or different.

Functional group: A specific group of atoms within a molecule that is responsible for the characteristic chemical reactions of the molecule. Exemplary functional groups include, without limitation, alkyl, alkenyl, alkynyl, aryl, halo (fluoro, chloro, bromo, iodo), epoxide, hydroxyl, carbonyl (ketone), aldehyde, carbonate ester, carboxylate, carboxyl, ether, ester, peroxy, hydroperoxy, carboxamide, amino (primary, secondary, tertiary), ammonium, imide, azide, cyanate, isocyanate, thiocyanate, nitrate, nitrite, nitrile, nitroalkyl, nitroso, pyridyl, phosphate, sulfonyl, sulfide, thiol (sulfhydryl), disulfide.

Haloalkyl: An alkyl group substituted with one or more same or different halo atoms, e.g., —$CH_2Cl$, —$CF_3$, —$CH_2CF_3$, —$CF_2CF_3$, —$CH_2CCl_3$, and the like.

Heteroalkyl: An alkyl or cycloalkyl radical as defined above containing at least one heteroatom, such as N, O, S, or $S(O)_n$ (where n is 1 or 2).

Heteroaliphatic: An aliphatic compound or group having at least one heteroatom, i.e., one or more carbon atoms has been replaced with an atom having at least one lone pair of electrons, typically nitrogen, oxygen, phosphorus, silicon, or sulfur. Heteroaliphatic compounds or groups may be substituted or unsubstituted, branched or unbranched, cyclic or acyclic, and include "heterocycle", "heterocyclyl", "heterocycloaliphatic", or "heterocyclic" groups.

Heteroaryl: A monovalent monocyclic or bicyclic aromatic radical of 5 to 10 ring atoms with each ring containing one, two, or three ring heteroatoms selected from N, O, or S, the remaining ring atoms being C. The aromatic radical is optionally fused to a phenyl or an optionally substituted heteroaryl ring or it is optionally substituted independently with one or more substituents, such as one or two substituents selected from alkyl, haloalkyl, heteroalkyl, aliphatic, heteroaliphatic, alkoxy, halo, cyano, nitro, aryl, optionally substituted heteroaryl, amino, monosubstituted amino, disubstituted amino, hydroxyamino, —OR (where R is hydrogen, haloalkyl, or optionally substituted phenyl), —$S(O)_nR$ (where n is an integer from 0 to 2 and R is alkyl, haloalkyl, optionally substituted phenyl, amino, mono or disubstituted amino), —C(O)R (where R is hydrogen, alkyl, haloalkyl or optionally substituted phenyl), —COOR (where R is hydrogen, alkyl or optionally substituted phenyl), —C(O)N(R')R" (where R' and R" are independently selected from hydrogen, alkyl, haloalkyl, or optionally substituted phenyl). In specific examples, the term heteroaryl includes, but is not limited to pyridyl, pyrrolyl, thiophene, pyrazolyl, thiazolyl, imidazolyl, pyrimidinyl, thiadiazolyl, indolyl, carbazolyl, azaindolyl, benzofuranyl, benzimidazolyl, benzthiazolyl, quinoxalinyl, benzotriazolyl, benzisoxazolyl, purinyl, quinolinyl, isoquinolinyl, benzopyranyl, and derivatives thereof.

Heterobifunctional: Cross-linking agents contain at least two different reactive groups at each end, which are reactive towards numerous groups, including but not limited to sulfhydryls and amines, and create chemical covalent bonds between two or more molecules, for example between specific binding agent or moiety (such as an antibody) and an enzyme (such as horseradish peroxidase).

Heterocyclic: Refers to a closed-ring compound, or radical thereof as a substituent bonded to another group, particularly other organic groups, where at least one atom in the ring structure is other than carbon, and typically is oxygen, sulfur and/or nitrogen.

Ion exchange capacity: Refers to the number of exchangeable ions per dry weight of membrane and is generally stated herein as mmol/gram.

Lower: Refers to organic compounds having 10 or fewer carbon atoms in a chain, including all branched and stereochemical variations, particularly including methyl, ethyl, propyl, butyl, pentyl, hexyl, heptyl, octyl, nonyl, and decyl.

Membrane: A membrane is a thin, pliable material, sometimes formed as a sheet, of synthetic or natural material. An ion exchange membrane has anionic or cationic groups that permit ions to pass through the membrane. For fuel cells, the current density and operational lifetime of the fuel cell are factors in selecting the ion conductivity for the fuel cell. Some membranes are selective membranes, through which certain ions or molecules with particular characteristics pass more readily than other ions or molecules.

Relative humidity: A measure of the amount of water in air compared with the amount of water the air can hold at a particular temperature.

Substituent: An atom or group of atoms that replaces another atom in a molecule as the result of a reaction. The term "substituent" typically refers to an atom or group of atoms that replaces a hydrogen atom, or two hydrogen atoms if the substituent is attached via a double bond, on a parent hydrocarbon chain or ring. The term "substituent" may also cover groups of atoms having multiple points of attachment to the molecule, e.g., the substituent replaces two or more hydrogen atoms on a parent hydrocarbon chain or ring. In such instances, the substituent, unless otherwise specified, may be attached in any spatial orientation to the parent hydrocarbon chain or ring. Exemplary substituents include, for instance, alkyl, alkenyl, alkynyl, alkoxy, alkylamino, alkylthio, acyl, aldehyde, amido, amino, aminoalkyl, aryl, arylalkyl, arylamino, carbonate, carboxyl, cyano, cycloalkyl, dialkylamino, halo, haloaliphatic (e.g., haloalkyl), haloalkoxy, heteroaliphatic, heteroaryl, heterocycloaliphatic, hydroxyl, oxo, sulfonamide, sulfhydryl, thio, and thioalkoxy groups.

Substituted: A fundamental compound, such as an aryl or aliphatic compound, or a radical thereof, having coupled thereto one or more substituents, each substituent typically replacing a hydrogen atom on the fundamental compound. Solely by way of example and without limitation, a substituted aryl compound may have an aliphatic group coupled to the closed ring of the aryl base, such as with toluene. Again solely by way of example and without limitation, a long-chain hydrocarbon may have a hydroxyl group bonded thereto.

II. Background

Figure 1D:
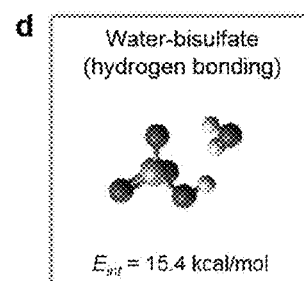
FIG. 1D illustrates intermolecular interaction energy of water-bisulfate, where the intermolecular interaction energy was calculated by density functional theory employing ωB97XD functional and 6-311++G(2d,2p) basis sets.
Figure 1E:
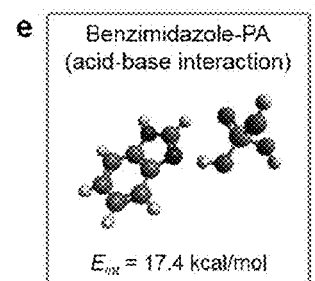
FIG. 1E illustrates intermolecular interaction energy of benzimidazole-PA, where the intermolecular interaction energy was calculated by density functional theory employing ωB97XD functional and 6-311++G(2d,2p) basis sets.

The operating temperature window of a PEM fuel cell is dictated by the interactions between the acid (e.g. tethered sulfonic acid or free phosphoric acid) and the base moieties (e.g. free water or tethered QA) in the PEM. For example, the hydrogen bonding interactions between the sulfonic acid group and water molecules in Nafion® is only 15.4 kcal/mol (FIG. 1D), which does not provide enough stability above the boiling temperature of water, leading to membrane dehydration, particularly at elevated operating temperatures. For phosphoric acid-doped PBI, a proton from phosphoric acid is located between the phosphoric acid and benzimidazole, but due to the weak basicity of benzimidazole, the proton remains close to the biphosphate anion, producing a relatively weak benzimidazole•••$H_2PO_4$ interaction. The intermolecular interaction energy, $E_{int}$, between benzimidazole and phosphoric acid is calculated as 17.4 kcal/mol (FIG. 1E), which is only 4.8 kcal/mol greater than that between phosphoric acid and one water molecule, ca. 12.6 kcal/mol. Additional phosphoric acid molecules have even weaker interactions within the matrix. Due to the relatively weak interaction, benzimidazole tends to lose phosphoric acid easily with water absorption. Consequently, phosphoric acid-doped PBI requires a high concentration of base moieties, approximately >6 mmol/gram, and a high acid content, such as approximately 90 wt. % to impart sufficient anhydrous conductivity.

Certain disclosed embodiments of the present invention address these limitations by using polymeric materials that include two components, a cationic functional group component, such as a quaternary ammonium component, and a polymeric material to which the quaternary component is coupled. These aspects are discussed in more detail below.

III. Membrane Electrode Assembly

Figure 2:
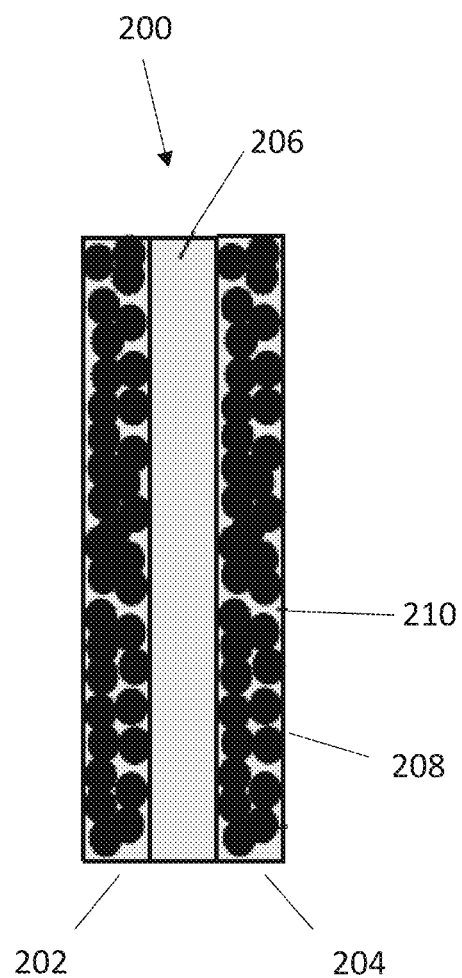
FIG. 2 is a schematic cross sectional drawing illustrating an exemplary membrane electrode assembly according to the present invention.

FIG. 2 illustrates an exemplary membrane electrode assembly 200 according to the present invention. The illustrated assembly comprises a phosphoric-acid-doped, cationic-functionalized membrane and a binder, such as an ionomeric binder. Membrane electrode assembly 200 includes an anode catalyst layer 202, a cathode catalyst layer 204, a phosphoric-acid-doped, cationic-functionalized polymeric membrane 206 comprising a cationic functional group, such as an ammonium functionalized membrane, an electrocatalyst 208, and a phosphoric-acid-doped, cationic-functionalized ionomeric binder 210.

IV. Polymeric Membrane Materials

One aspect of the present invention is the development of polymeric membranes for use in fuel cells to operate within a temperature range over at least some portion of which low temperature and high temperature fuel cells cannot operate efficiently at, such as at a temperature range of from 80° C. to about 200° C. Low temperature fuel cells cannot operate efficiently, or at all, in temperatures approaching and above 100° C. High temperature fuel cells cannot operate efficiently, or at all, in the lower portions of this 80° C. to about 200° C. operating temperature range.

Certain disclosed embodiments of membrane materials according to the present invention include considering two separate components: (a) a polymeric group; and (b) a cationic group. Suitable polymeric materials also may include a linker or tether to couple the cationic group to the polymeric group. Accordingly, certain disclosed embodiments of the present invention concern polymeric materials having a formula

[Polymer repeating unit]$_m$-[Optional Linker]$_o$-[Cationic Functional Group (CFG)]$_n$.

With reference to this formula, m is two or more up to the number of monomeric subunits coupled to form a particular polymeric species, such as 2 to 1000, 2 to 100, 2 to 50, or 10 to 50 monomeric units, etc.; o is from 0 to at least m, and plural linkers may be attached to a single monomeric unit; and n is from 1 to at least o, where the material includes optional linkers, and may be greater than y if the material includes one or more functional groups that are directly coupled to, but not incorporated in, a monomeric unit or units. For certain disclosed embodiments, suitable polymeric materials according to the present invention do not include poly(diallyldimethylammonium) polymeric materials. And in certain disclosed embodiments, suitable polymers according to the present invention have an ion exchange capacity of less than 3 mmol/gram. There are several disadvantages associated with polymeric materials having an ion exchange capacity higher than 3 mmol/gram, such as solvent resistance, mechanical properties and interfacial resistance.

A. Cationic Functional Groups

A person of ordinary skill in the art will appreciate that any suitable cationic group is within the scope of the present invention. Solely by way of example, and without limitation, such cationic functional groups include ammonium

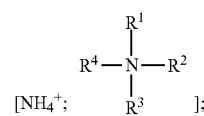

imidazolium

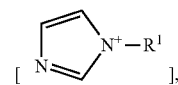

gaunidinium

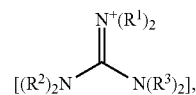

phosphazenium

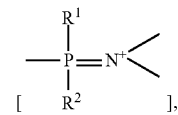

sulfonium

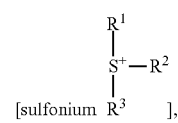

oxonium

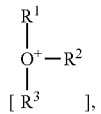

and phosphonium

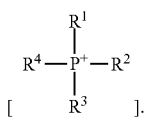

With reference to these cationic species, $R^1$-$R^4$ are independently selected from hydrogen, aliphatic, aryl, and heteroaryl, and more typically are hydrogen and alkyl, such as $C_{1-10}$ alkyl. These cationic functional groups also can be used in any and all combinations.

For certain disclosed embodiments the cationic group is a quaternary amine cationic group, e.g.

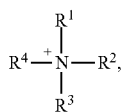

a quaternary phosphonium

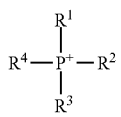

cationic group, and/or a sulfonium

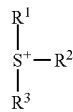

cationic group. With reference to these cationic groups, $R^1$-$R^4$ are independently selected from hydrogen, aliphatic, such as alkyl, with particular examples including $C_{1-10}$ alkyl, more typically $C_{1-5}$ alkyl [such as methyl, ethyl, propyl, butyl, pentyl and hexyl], aryl, heteroaryl, cyclic, heterocyclic, and combinations thereof.

B. Linker

The linker typically comprises an aliphatic, particularly alkyl, or aryl group. Certain disclosed embodiments concern materials comprising an alkyl linker, such as a $C_{1-10}$ alkyl linker, more typically $C_{1-6}$ alkyl linkers, with particular alkyl linker examples including methyl, ethyl, propyl, butyl, pentyl, hexyl, heptyl, octyl, nonyl and decyl linkers. Substituted aliphatic linkers, particularly substituted alkyl linkers, aryl linkers, substituted aryl linkers, or aliphatic and aryl linkers comprising heteroatom-containing functional groups also can be used as suitable linkers. For example, the linkers may comprise amide functional groups, hydroxyl functional groups, ketone functional groups, sulfone functional groups, sulfone amide functional groups, etc., or suitable linkers may comprise combinations of such functional groups. Particular examples of aryl linkers include phenylene $(C_6H_4)_n$ and halogenated phenylenes, such as fluorophenylene [e.g. $(C_6F_4)_n$].

C. Polymer

The polymer may be any polymer now known or hereafter developed that can be used when considering other operating features of the present invention. For example, the polymers need to be stable at relatively high operating temperatures of up to at least 160° C., and preferably up to at least 200° C. These materials also need to be stable under acidic conditions, such as produced by doping with phosphoric acid, at typical operating temperatures. Furthermore, fuel cell operating conditions also may be highly acidic even without using phosphoric-acid-doped polymeric materials, and hence suitable polymeric materials must be stable under typical fuel cell operating conditions.

Exemplary classes of polymeric materials include, by way of example, and without limitation, polyaryl polymers, such as polyphenylenes, polystyrenes, polyolefins, polysulfones, polyethers, polyether sulfones, polyketones, polyetherketones, polyarylethers, nitrile containing polyarylethers, halogenated polymers, such as perfluorinated polymers, etc. Substituted polymers also may be used, and substituted polymers may include any substituent in addition to the cationic group that imparts a desirable feature or features to the resulting polymeric material. For example, the polymeric material may be halogenated, particularly fluorinated, or may include halogenated aliphatic groups, such as trifluoromethyl. All polymeric materials disclosed herein are to be considered as also including all substituted versions thereof unless expressly stated otherwise.

Polyaryl compounds are one particular class of suitable polymer according to the present invention. Polyphenylenes are one example of a suitable polyaryl polymer. Certain disclosed polyphenylenes had the following general formula

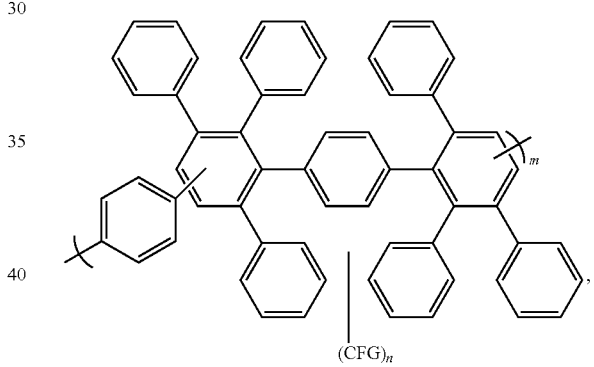

where m is 2 to 1000, 2 to 100, 2 to 50, or 10 to 50 monomeric units; and n is at least 1 up to the number of total positions available on each monomeric unit. Certain disclosed embodiments having a single cationic functional group (CG) coupled to the polyphenylene core without any intervening linker have the following formula

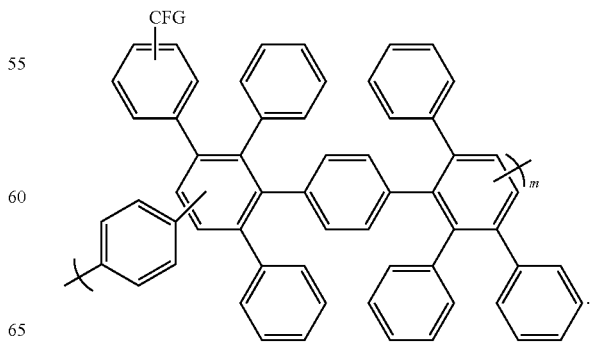

Multiple cationic groups also can be coupled to the polymeric core, as exemplified by the following formula having 4 cationic groups per repeating polyphenylene core unit

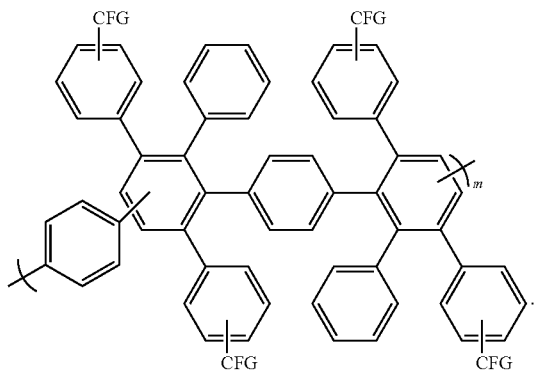

The cationic group also can be coupled to the polymeric group through a linker, as shown below.

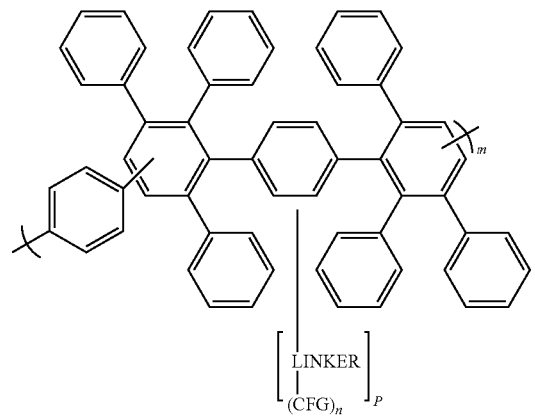

With reference to this formula, a linker may have a single cationic functional group or multiple cationic functional groups, so that n is from 1 to the number of possible positions on the linker, typically 1 to 5, more typically 1 or 2; and p is the number of LINKER-CFG units coupled to a monomeric unit, and hence typically is from 1 to the number of possible positions on the monomeric unit, typically 1 to 5, more typically 1 to 2. For example, the polyphenylene core unit may have multiple LINKER-CFG units, as exemplified by the following formula.

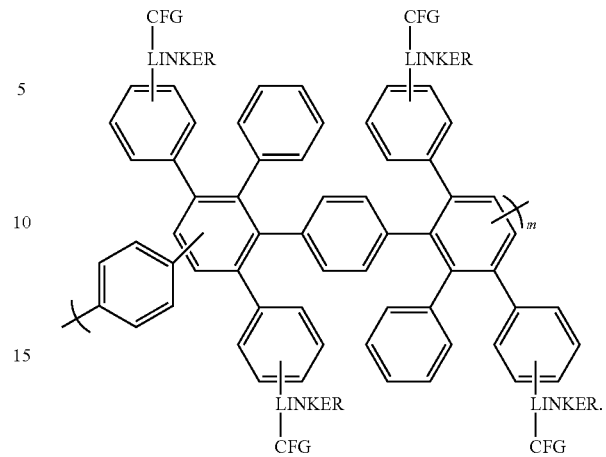

Certain disclosed embodiments concern methyl and butyl linkers. Accordingly, certain disclosed embodiments concern materials potentially having alkyl linkers as shown below

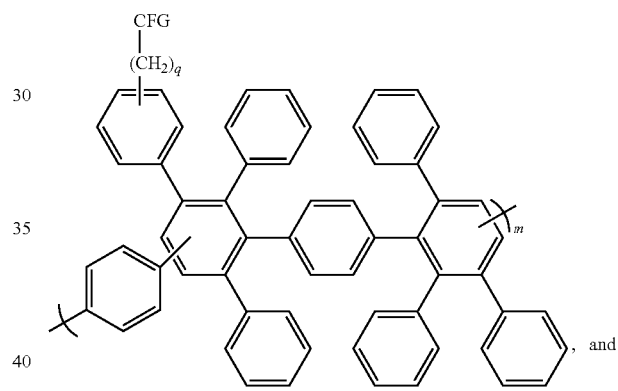

, and

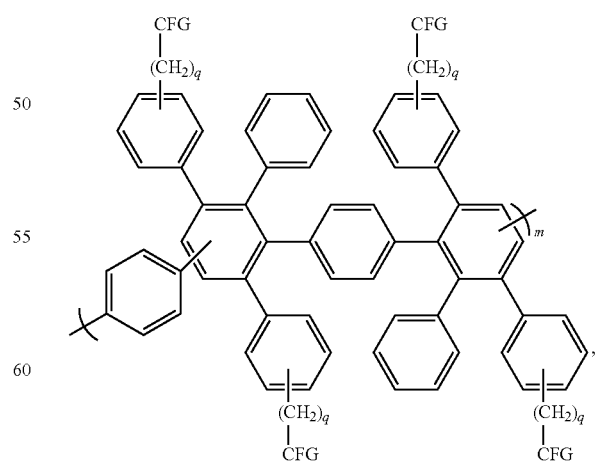

, where m is as stated above, and q is 0 to 10, more typically 1-10, such as 1-6.

Quaternary amine cationic groups have been used in certain working embodiments. Accordingly, certain disclosed embodiments concern materials having a formula

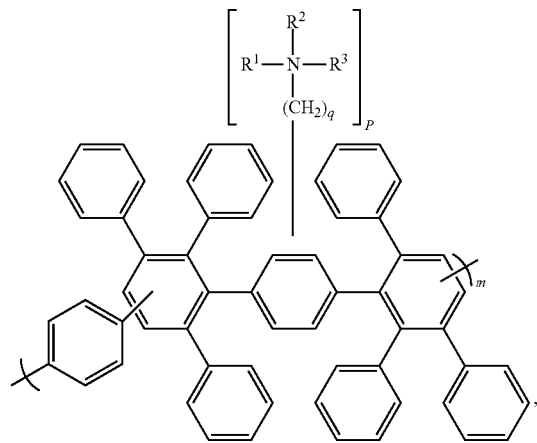

where p is the number of —(CH$_2$)$_q$—NR$^1$R$^2$R$^3$ units coupled to a monomeric unit, and typically 1 to 5, more typically 1 to 2. A particular polymeric material has a formula

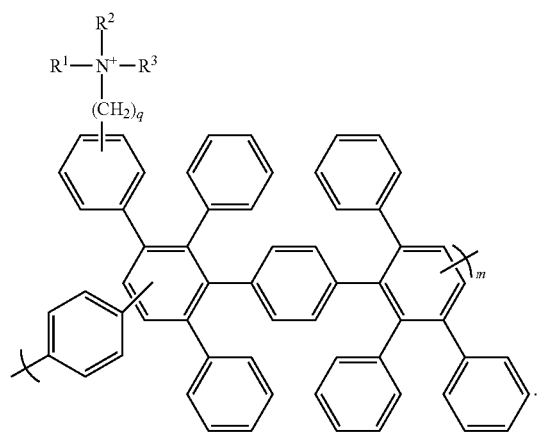

Multiple ammonium functional groups also can be linked to the polyaryl core, such as with the following example

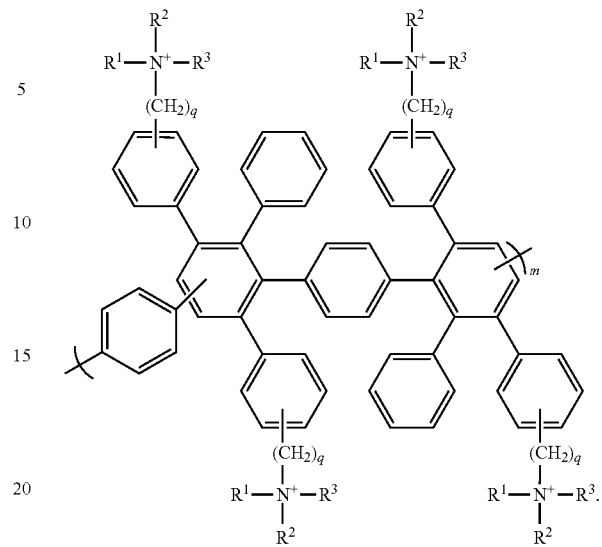

Similarly, different cationic functional groups can be linked to the polymeric core, as with the following examples.

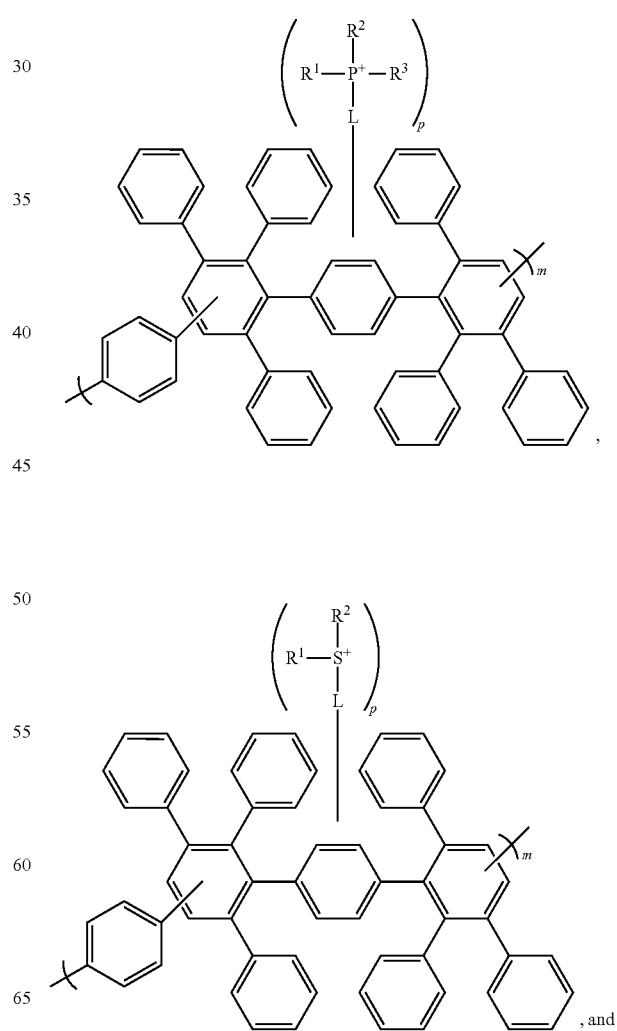

, and

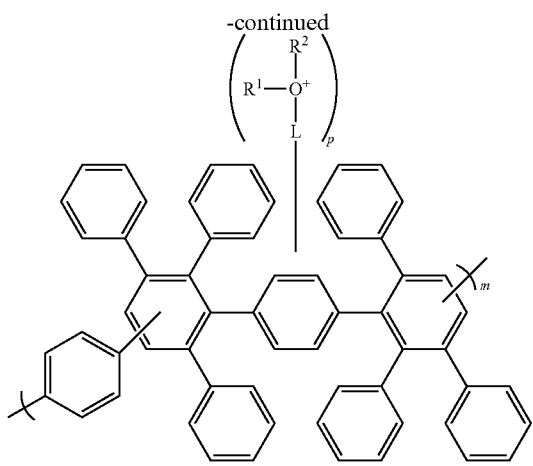

Polymeric materials comprising combinations of cationic functional groups also can be used with disclosed embodiments of the present invention, such as with compounds having a formula

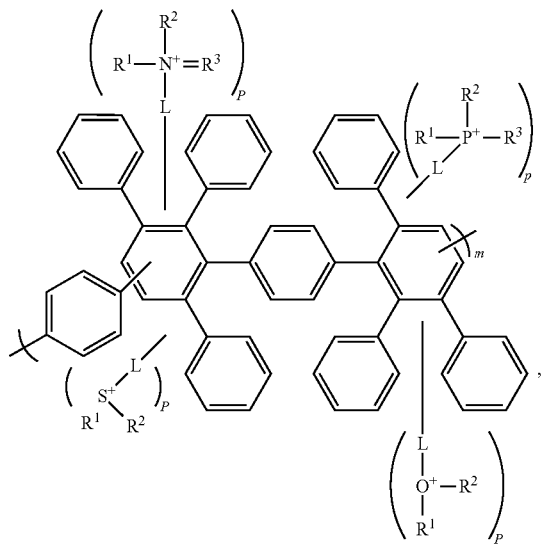

where p is 0 or 1. A person of ordinary skill in the art will also appreciate that the phenyl rings can be substituted phenyl rings having one or more substituents bonded thereto, such as a substituent selected from alkyl, alkenyl, alkynyl, alkoxy, alkylamino, alkylthio, acyl, aldehyde, amide, amino, aminoalkyl, aryl, arylalkyl, carboxyl, cyano, cycloalkyl, dialkylamino, halo, haloaliphatic, heteroaliphatic, heteroaryl, heterocycloaliphatic, hydroxyl, oxo, sulfonamide, sulfhydryl, thioalkoxy, or other functionality.

Polymeric materials based on polystyrene and derivatives thereof also are useful materials for the presently disclosed embodiments. Certain embodiments include styrene polymers having a formula

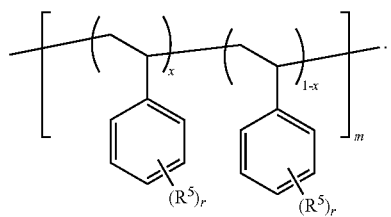

With reference to this formula, $R^5$ is a substituent selected from alkyl, alkenyl, alkynyl, alkoxy, alkylamino, alkylthio, acyl, aldehyde, amide, amino, aminoalkyl, aryl, arylalkyl, carboxyl, cyano, cycloalkyl, dialkylamino, halo, haloaliphatic, heteroaliphatic, heteroaryl, heterocycloaliphatic, hydroxyl, nitrile, oxo, sulfonamide, sulfhydryl, thioalkoxy, or other functionality; m is as stated above; r is from 0 (an unsubstituted polymeric material having hydrogen atoms bonded to the aromatic ring) to 4; and x is from 0 to 0.99.

Certain disclosed embodiments of polystyrene compounds having a cationic group coupled to the polymeric compound may have a formula

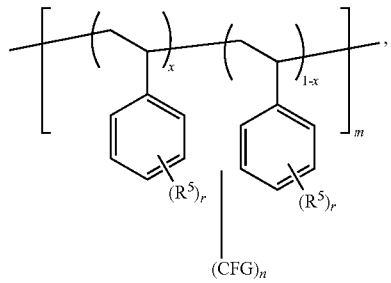

where the variables are as discussed above. For example, the polymer may have a formula

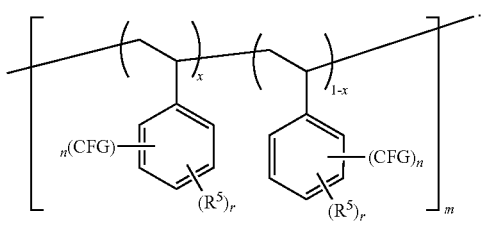

Compounds having this structure as well as a cationic group and an optional linker may have a following formula

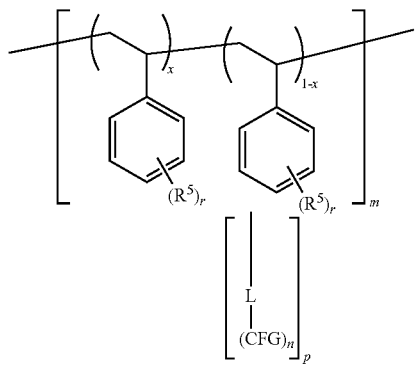

This formula indicates that the linker-CFG unit can be coupled to any available monomeric unit position, such as

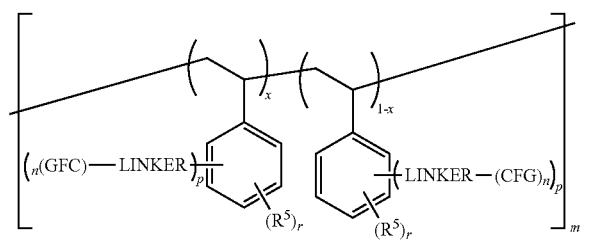

where the variables are as discussed above. Compounds having alkyl linkers have a formula

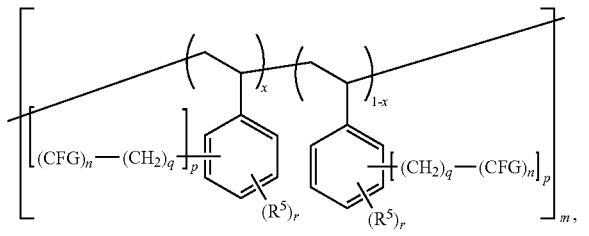

where the variables are as discussed above.

Other disclosed embodiments concern biphenyl polymeric materials having a formula

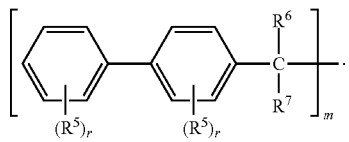

With reference to this formula, $R^6$ and $R^7$ are independently selected from hydrogen, aliphatic, heteroaliphatic, aryl, heteroaryl, and LINKER, m, $R^5$ and q are as stated above. Particular disclosed compounds have $R^6$ selected from hydrogen, alkyl and haloalkyl, typically $C_{1-10}$ alkyl and $C_{1-10}$ haloalkyl, more typically $C_{1-5}$ alkyl or $C_{1-10}$ haloalkyl, such as trifluoromethyl. Compounds having a cationic functional group or groups have a formula

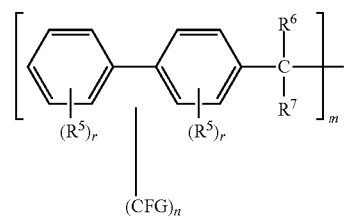

where the cationic functional group may be attached to any position of the ring and/or at the benzylic carbon. Compounds having linkers between the cationic functional group and the monomeric units typically have a formula

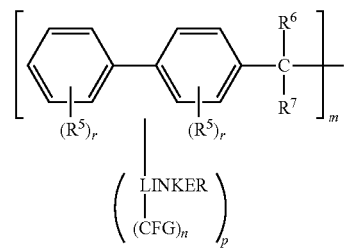

And compounds having alkyl linkers have a formula

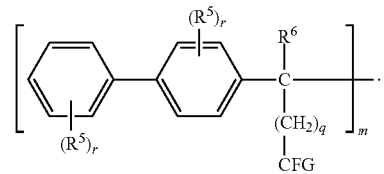

Polyether sulfones provide another example of a suitable class of polymers. Certain exemplary polyether sulfones are described below. With reference to these formulas, X is not present, or is selected from SO, $SO_2$, CO, O, S,

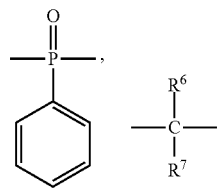

where $R^6$ and $R^7$ are aliphatic, aryl, heteroaryl, more typically alkyl, such as $C_{1-10}$ alkyl, or haloalkyl, such as

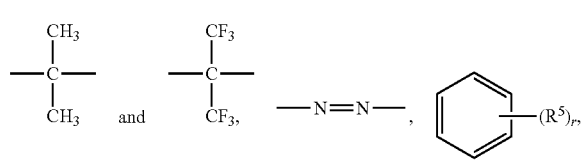

such as

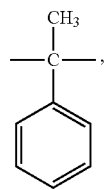

and combinations thereof.

Certain disclosed polyether sulfones have a formula

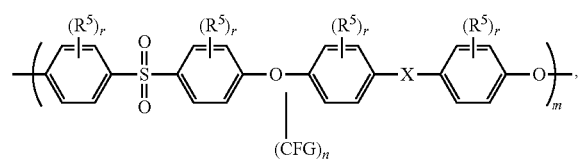

where the cationic functional group may be directly bonded to any available position or positions provided by the monomeric unit. The cationic functional group may be bonded via a linker to any available position or positions provided by the monomeric unit as well, as indicated below.

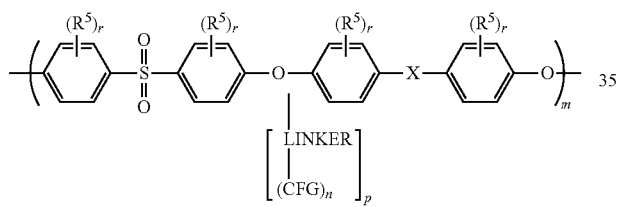

Particular embodiments have the cationic functional group bonded to the monomeric unit of the polyether sulfone as follows

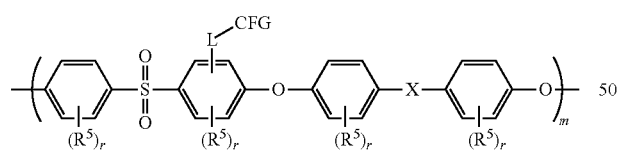

With reference to this formula, X can be present or not present, as exemplified by the following two species:

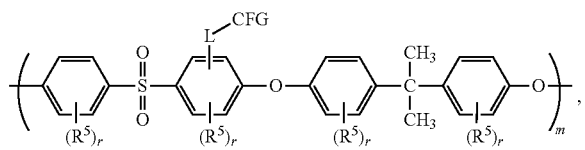

and

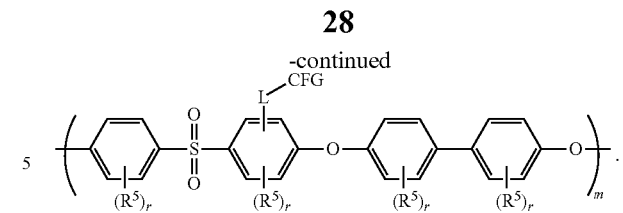

Polyketones, having the following formula, provide another example of a suitable class of polymers

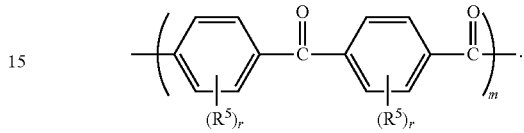

Certain disclosed embodiments having a cationic functional group bonded to any available position of the monomeric unit directly have a formula

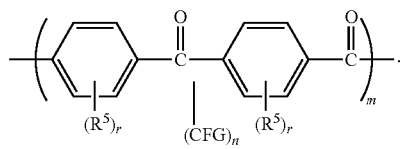

As with previously disclosed examples, the cationic functional group may be bonded to the monomeric unit by a linker L as shown below.

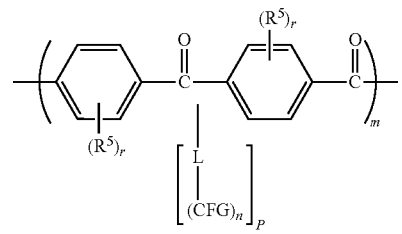

The polyketone can also be a polyether ketone, as follows:

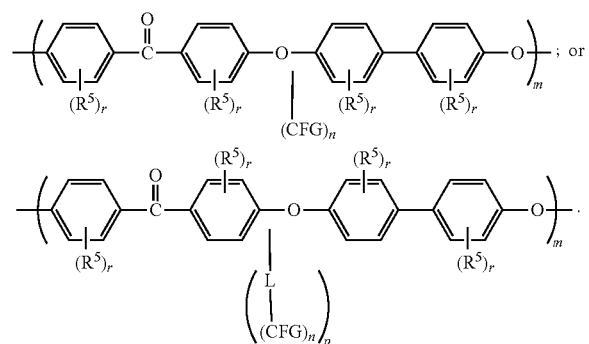

Halogenated polyarylethers are another example of a suitable polymeric material. Certain disclosed embodiments had the following structure

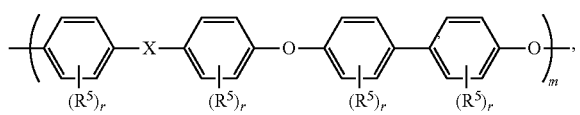

where $R^5$ is a halogen, particularly fluorine. Such compounds can have a cationic functional group linked to any available position of the monomeric unit, as shown below

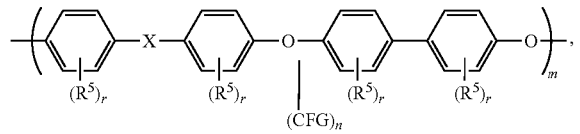

or through a linker

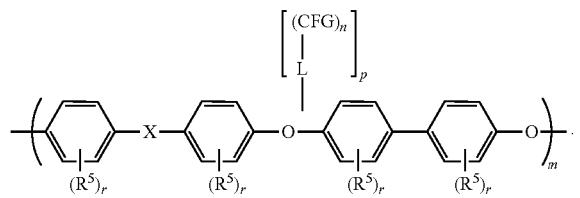

Certain disclosed exemplary fluorinated polyarylethers had the following formula

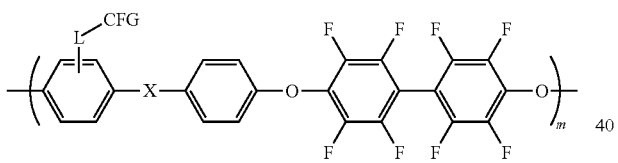

Polynitriles also are a suitable polymeric material useful for practicing the present invention. Certain disclosed polynitriles have a formula

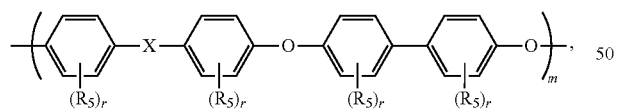

where $R^5$ is nitrile (—CN). These materials may have a cationic functional group bonded to any available position, such as indicated below

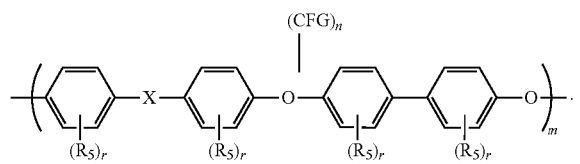

And as with the above examples, the cationic functional group may be coupled to any available position of the monomeric unit by a linker, such as with compounds having a formula

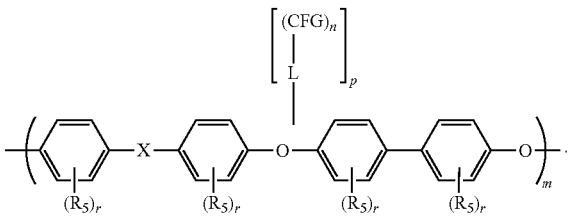

Certain exemplary nitrile-containing compounds had the following structures:

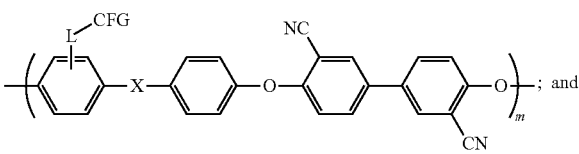

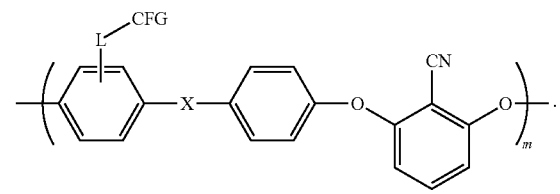

D. Doping

The polymeric materials are doped with an acid to form a cation-anion bonding pair in the polymeric portion. Any suitable acid useful for this purpose can be used to practice the present invention, but particular disclosed embodiments concern polymeric materials that are doped with phosphoric acid. Phosphoric acid doping can be achieved by, for example, immersing selected polymeric materials in an 85 weight % aqueous solution of phosphoric acid at room temperature for 2 hours. Excess phosphoric acid is removed by blot drying.

The structures of certain exemplary phosphoric-acid-doped polymeric materials that are useful for the present invention are provided below.

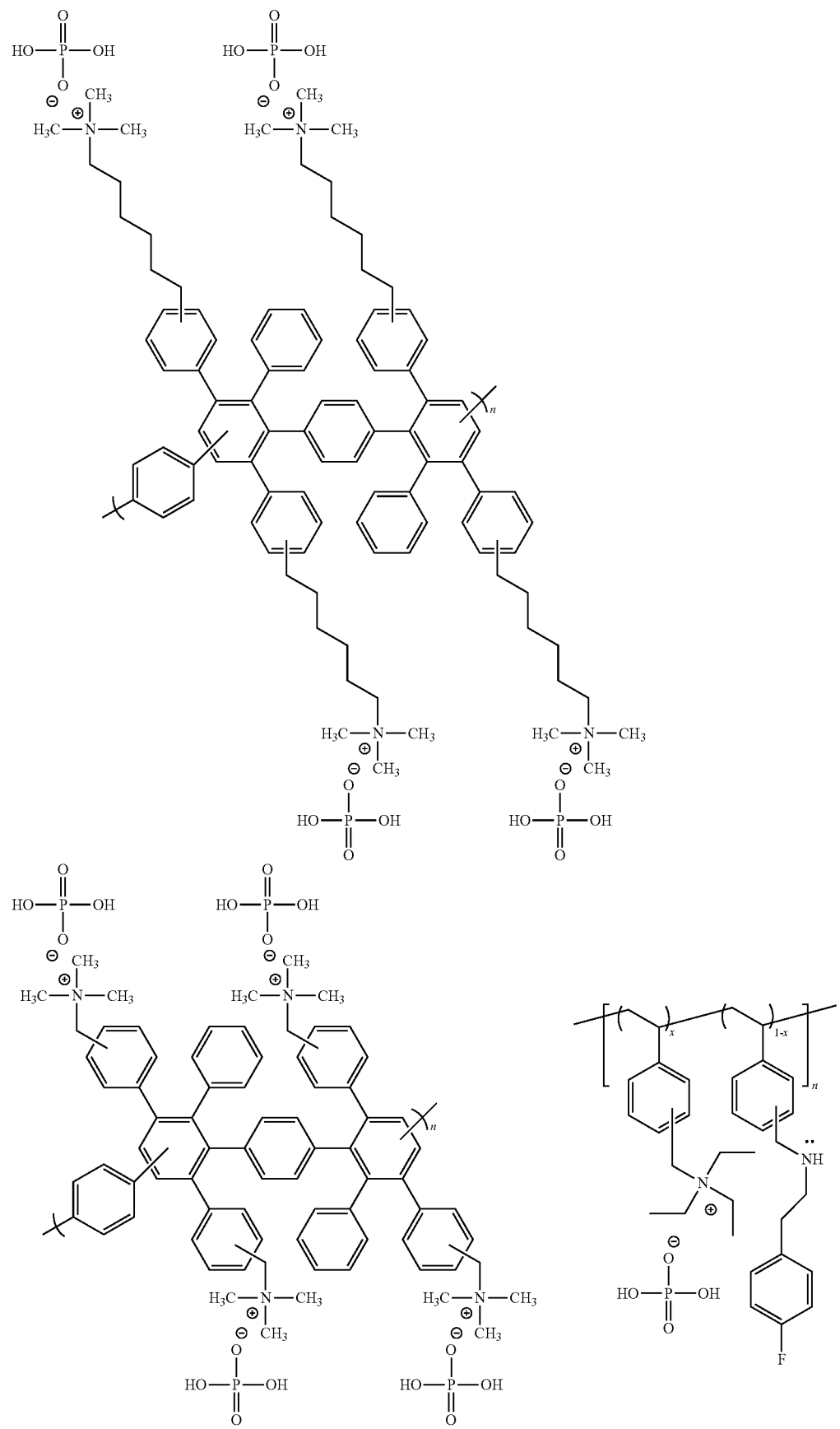

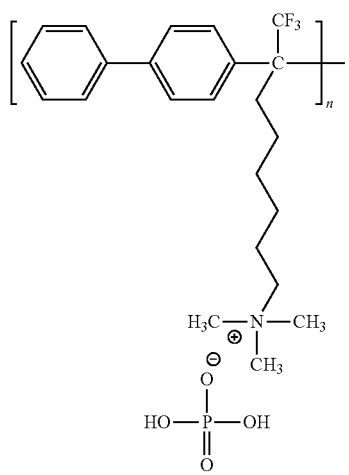

E. Synthesis

Figure 6:
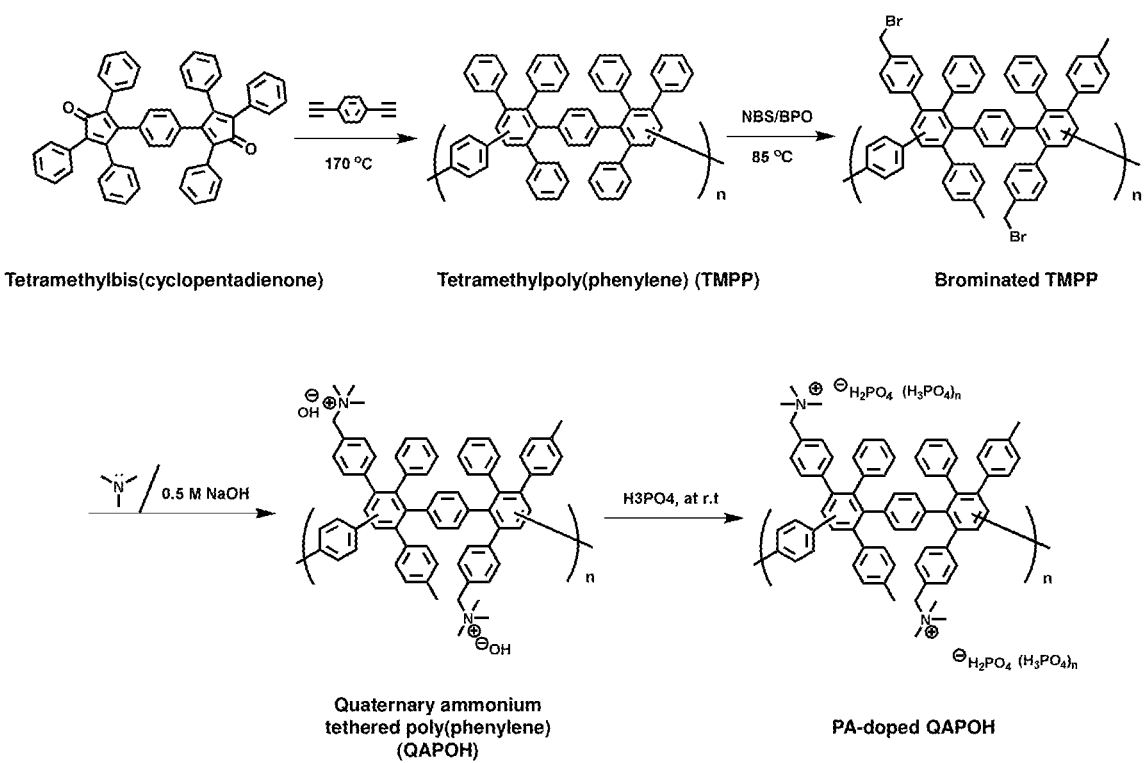
FIG. 6 illustrates one embodiment of a synthetic procedure for making PA-doped QAPOH.

Polymeric materials disclosed herein can be purchased commercially or synthesized. One embodiment of a method for synthesizing polyphenylene polymeric materials is provided by FIG. 6. With reference to FIG. 6, the synthesis of the particular QAPOH membranes was initiated by an irreversible Diels-Alder reaction between tetramethylbis(cyclopentadienone) and 1,4-diethynylbenzene. Additional details concerning this reaction are provided by Hibbs, M. R., et al. Synthesis and Characterization of poly(phenylene)-based Anion Exchange Membrane for Alkaline Fuel Cells, *Macromolecules* 42, 8316-8321 (2009), which is incorporated herein by reference. This polymer was then brominated using NBS and BPO at 85° C., converting a fraction of the benzyl positions into bromomethyl groups. The resultant functionalized polymer was then cast into films from chloroform. The films were then soaked in a 5 M solution of aqueous trimethyl amine to generate QAPOH membranes. Different length amine tethers can be synthesized too by selection of appropriate reagents. For example, the amine tether can be an aliphatic chain, particularly a $C_{1-10}$ alkyl chain, more typically a $C_{1-5}$ alkyl chain. The QAPOH membranes were then immersed in an 85 wt. % aqueous solution of phosphoric acid at room temperature for 2 hours. All PA-doped QAPOH were used after removing the excess PA on the membrane surface by blot drying.

Figure 7:
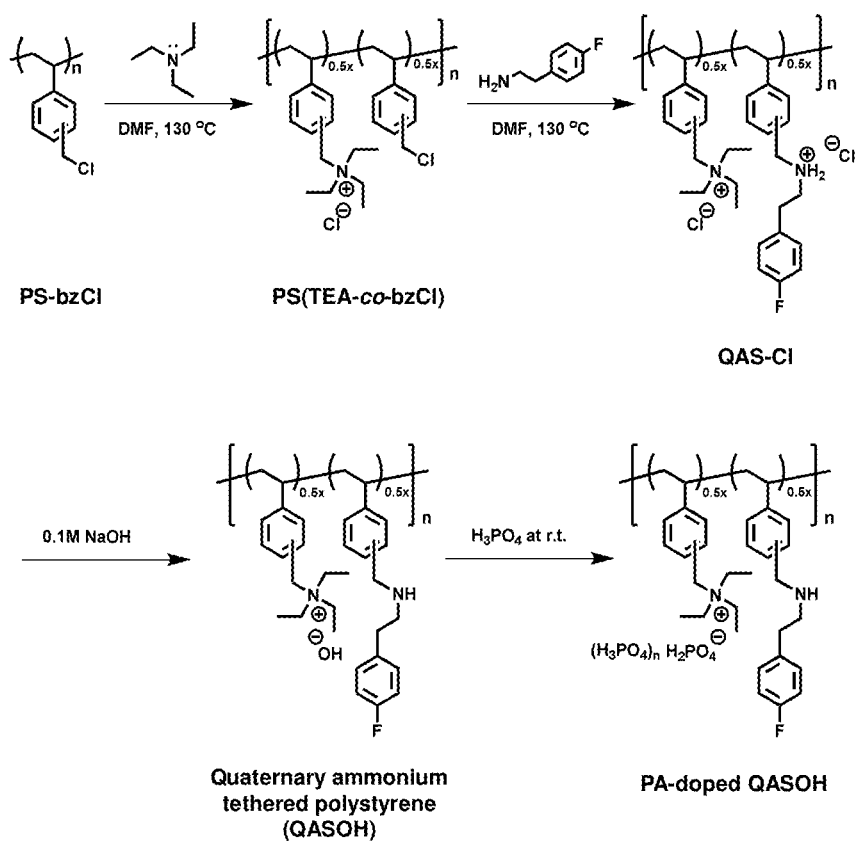
FIG. 7 illustrates one embodiment of a synthetic procedure for making PA-doped QASOH.
Figure 8:
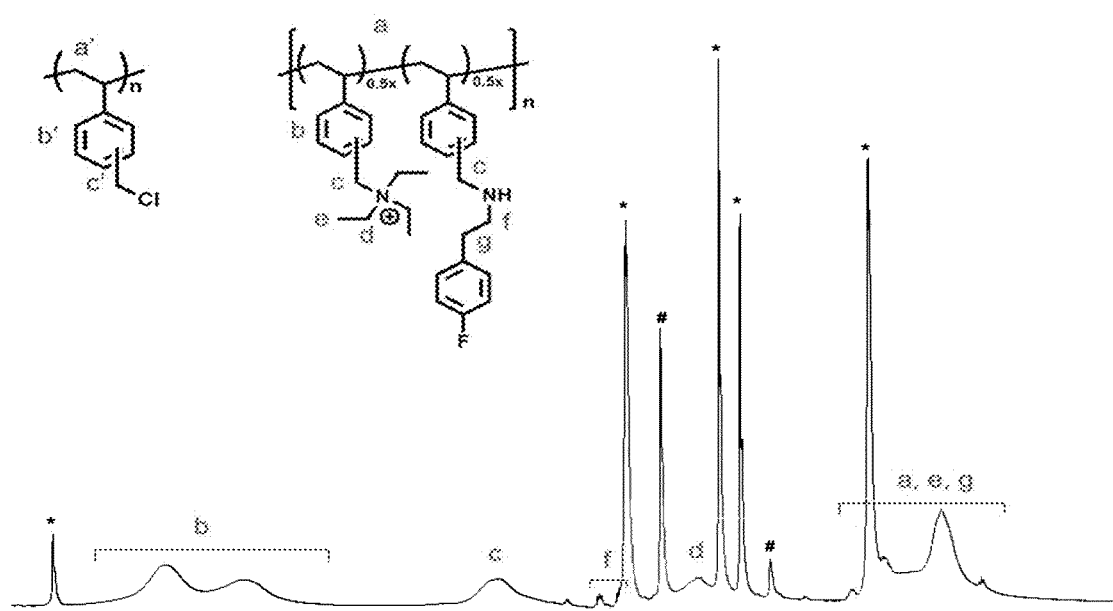
FIG. 8 provides a $^1$H NMR spectrum and proton assignment information: $^1$H NMR (500 MHz, DMSO-d$_6$) spectrum of QAS-Cl (blue); δ 7.8-6.1 (br, 12H, —ArH), 5.0-4.2 (br, 4H, —ArCH$_2$N—), 5.0-4.2 (br, 4H, —ArCH$_2$N—), 3.9-3.6 (m, 2H, —NCH$_2$CH$_2$Ar), 3.05 (br, 6H, —ArCH$_2$N(CH$_2$CH$_3$)$_3$), 1.8-0.3 (br, 17H, —CH$_2$CHAr—, —N(CH$_2$CH$_3$)$_3$, ArCH$_2$CH$_2$N—); QAS-Cl copolymer was dissolved using THF, DMF, and water represented by *; DMSO-d$_6$ is represented by #. $^1$H NMR (500 MHz, DMSO-d$_6$) spectrum of PS-bzCl (red); δ 7.4-6.2 (br, 3H, —ArH), 4.8-4.3 (br, 2H, —ArCH$_2$Cl), 2.2-1.1 (br, 3H, —CH$_2$CHAr—).
Figure 9:
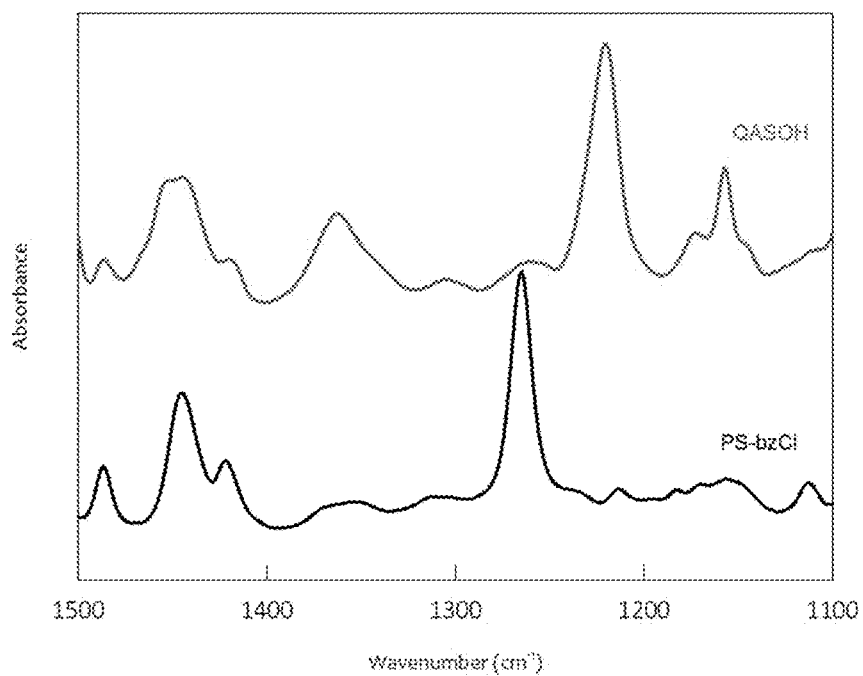
FIG. 9 provides FTIR spectra of poly(vinylbenzyl chloride) (PS-bzCl) and QASOH, showing that the intensity of a characteristic C—Cl peak at 1261 cm$^{-1}$ disappeared after the reaction of PS-bzCl with TEA and 4-fluorophenethylamine, but the OH and C—N peak emerged clearly at approximately 3300 and 1363 cm$^{-1}$, respectively, establishing that the Cl of the benzyl group was replaced by TEA and 4-fluorophenethylamine.
Figure 10A:
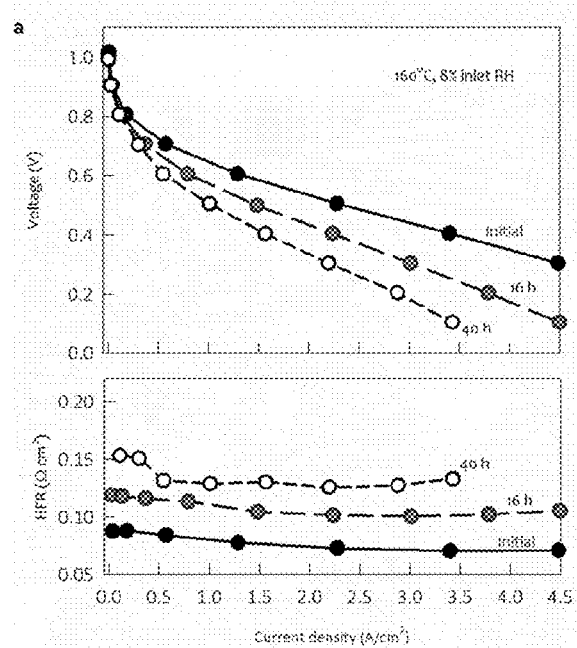
FIG. 10 illustrates H$_2$/O$_2$ fuel cell performance comparison at 160° C. by I-V curves (Top) and HFR (Bottom) for PA-doped PBI (Celtec®) MEA (FIG. 9A) and PA-doped QAPOH MEA (FIG. 9B), where the conditions were: inlet RH—8%; and backpressure—206.8 kPa. I-V curves were obtained at the beginning of the test and after 16 and 40 hours of operation; Cathode $P_{H2O}$ at open circuit voltage, 0.15 A/cm$^2$ and 3.0 A/cm$^2$ are 47.4, 49.6 and 108.0 kPa, respectively.
Figure 10B:
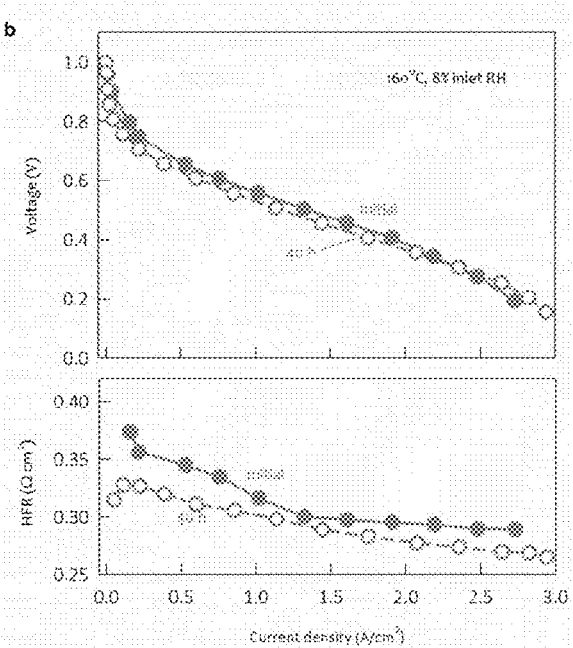

A representative synthesis of a quaternary ammonium tethered poly(styrene) hydroxide (QASOH) ionomeric binder is illustrated in FIG. 7. Synthesis was initiated via nucleophilic substitution of triethylamine (TEA) and 4-fluorophenethylamine onto poly(vinylbenzyl chloride) (PS-bzCl). A solution of poly(vinylbenzyl chloride) (10 grams, Sigma-Aldrich) in N,N-dimethylformamide (DMF) (360 ml) was reacted with TEA (3.3151 grams, Sigma-Aldrich) at 130° C. for 3 hours. To the reaction mixture, 4-fluorophenethylamine (4.5594 grams, Sigma-Aldrich) was added and reacted for an additional 12 hours. This 5 wt. % polystyrene copolymer solution in DMF was used as an ionomer solution. PA-doped QASOH was obtained after electrode fabrication process via an imbibing process, as discussed herein.

Figure 22:
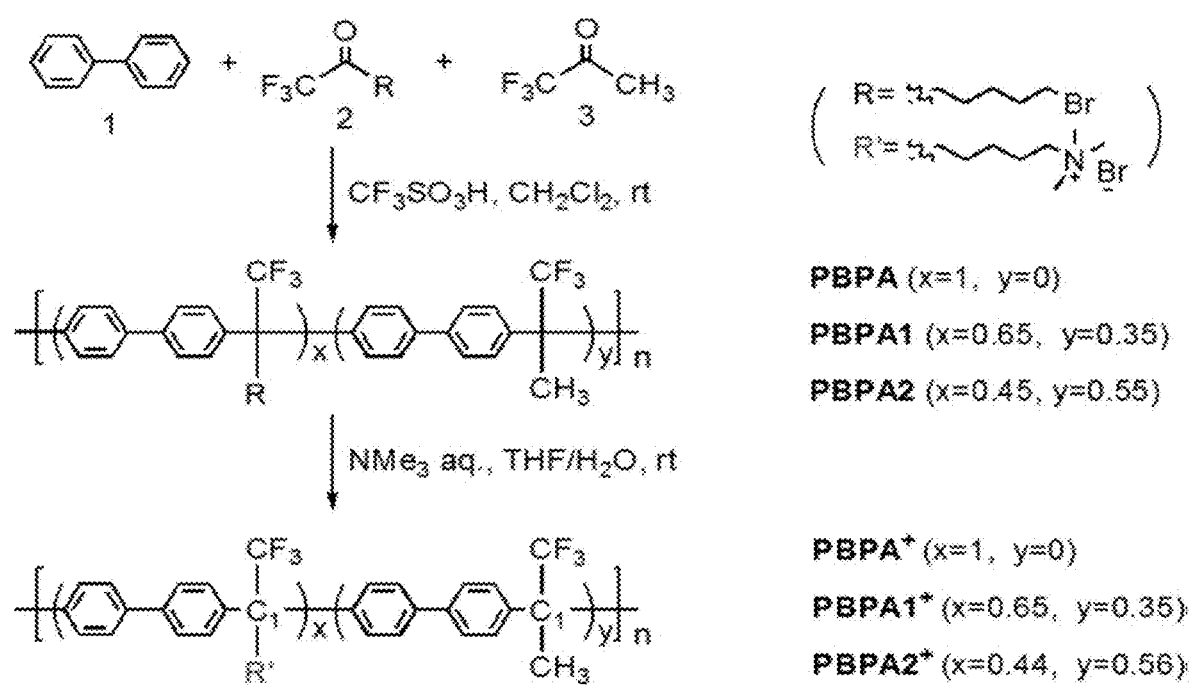
FIG. 22 provides one embodiment of a method for synthesizing a quaternary ammonium poly(biphenyl alkylene) compound for use as a fuel cell membrane material according to the present invention.

FIG. 22 provides an exemplary representative synthesis of a particular quaternary ammonium poly(biphenyl alkylene) for use as a fuel cell membrane. The aromatic main-chain polymers, made solely of C—C bonds, were prepared by one-pot, acid catalyzed Friedel-Crafts polycondensations of biphenyl, (1) and trifluoromethyl alkyl ketones (7-bromo-1,1,1-trifluoroheptan-2-one and methyl trifluoromethyl ketone; compounds 2 and 3, respectively, of FIG. 22). Traditional AEM polymer synthesis via nucleophilic aromatic substitution requires a basic medium for polymerization. This process precludes using monomers having a potential leaving group such as alkyl halide. However, using acidic reaction conditions allows for the condensation polymerization of a monomer containing bromoalkyl side chains without affecting the quaternary ammonium precursor group. Although the repeating units of the condensation polymers are composed of a rigid biphenyl and a methine (C1 in FIG. 22), they were all obtained in high molecular weights (Mw>100 kg/mol measured by size exclusion chromatography; see Table 1 of Woo-Hyung Lee et al. Robust Hydroxide Ion Conducting Poly(biphenyl alkylene)s for Alkaline Fuel Cell Membranes, *ACS Macro Letters*, 4, 8, 814-818 (2015), which is incorporated herein by reference.) while remaining soluble in common organic solvents (e.g., $CHCl_3$ and THF). The bromopentyl group on the side chain of the precursor polymers was subsequently converted to trimethylpentylammonium bromide via substitution reaction with trimethylamine, affording PBPA+, PBPA1+, and PBPA2+ (FIG. 22). These quaternary ammonium polymers were insoluble in water, THF, $CHCl_3$, and $CH_2Cl_2$ but were soluble in N,N-dimethylformamide, dimethyl sulfoxide, and methanol at room temperature. The chemical structures of the ionic polymers were analyzed by $^1H$ and $^{19}F$ NMR spectroscopies. Comparison of the integral ratio of the trimethylammonium protons at 3.02 ppm and the aromatic proton peaks at 7.30-7.80 ppm indicated that the quaternization reaction gave quantitative conversion. Two $CF_3$ groups in the polymer chain also displayed slightly different $^{19}F$ NMR chemical shifts, which allowed convenient estimation of the ratio of repeating units in the polymers. The NMR spectroscopic analysis confirmed that the ratio of the two different repeating units of the polymers (x and y in FIG. 22) matched well with the monomer feed ratio added during polymerization. Thus, the ion exchange capacities of the membranes can be easily controlled by adjusting the feed ratio of the two ketone monomers in the polymerization. See, Table 2 of Woo-Hyung Lee et al. The calculated ion exchange capacities from the monomer feed ratios were 2.61, 2.00, and 1.50 mmols/gram for PBPA+, PBPA1+, and PBPA2+, respectively, which were in good agreement with the ion exchange capacities determined with $^1H$ and $^{19}F$ NMR (2.61, 1.91, and 1.45 mmols/gram) and titration (2.70, 1.94, and 1.46 mmols/gram, see Table 2 of Woo-Hung Lee et al.). Transparent and flexible membranes were prepared by dissolving the ionic polymers in dimethyl sulfoxide and casting them on a flat Teflon sheet.

F. Crosslinking i. Background

Crosslinked polymeric materials can provide certain benefits for use as membrane materials for fuel cells. For example, at elevated fuel cell operating temperatures certain polymeric materials can begin to dissolve in acids, such as phosphoric acid. Moreover, mechanical properties and dimensional stability can be enhanced by using cross-linkable polymer electrolytes. Accordingly, crosslinked polymeric materials are within the scope of the present invention The effects of crosslinking polymeric materials has been demonstrated by characterization of end-group, cross-linkable sulfonated poly(arylene ether) copolymers (ESF-BPs). Moreover, the degree of cross-linking can be controlled by reaction time. Accordingly, the present disclosure concerns using a series of polymers within a particular genus, wherein each species within the genus has two, independent tunable parameters: the number of cationic functional groups present; and the degree of cross-linking (DC). In general, cross-linking has been shown to improve proton conductivity while reducing water uptake, an uncommon trend in polymer electrolytes where water is critical for proton conduction. Certain disclosed embodiments concern membrane testing in fuel cells where performance and durability of polymeric materials with accelerated relative humidity cycling were compared to Nafion®.

In general, proton conductivity and water uptake of PEMs increase with increasing ion exchange capacity (IEC). This is somewhat intuitive as cationic groups responsible for proton conduction are hydrophilic and their increased abundance usually leads to both higher conductivity and water uptake. However, many properties are coupled in PEMs, and hydration typically has a significant impact on other PEM properties. This limits the ability to create higher performing membranes simply by increasing the number of hydrophilic functional groups alone. Specific PEM properties can exhibit changes greater than an order of magnitude in the presence of water. In particular, mechanical properties of PEMs may be dependent on hydration. Kundu et al. reported that the yield strength of Nafion® decreased from 3.47 to 0.73 MPa with hydration. Kundu, L. C. Simon, et al. Mechanical Properties of Nafion™ Electrolyte Membranes under Hydrated Conditions, *Polymer* 46, 11707 (2005). The modulus of a sulfonated polysulfone PEM also decreased from 585 to 64 MPa when water uptake increased from 39 to 126%. Y. S. Kim, et al., Processing Induced Morphological Development in Hydrated Sulfonated Poly(Arylene Ether Sulfone) Copolymer Membranes, *Polymer* 44, 5729 (2003).

Several approaches have been performed to restrict water uptake of PEMs including (partial) fluorination, incorporation of polar functional groups, using rigid backbone structures, incorporation into composite membranes, and cross-linking. Among those approaches, only cross-linking and incorporation into composite membranes do not significantly change the chemical structure of the polymer electrolytes. Cross-linking, in general, reduces water uptake. Cross-linking also reduces the phosphoric acid uptake and improves solvent resistance of the polymeric materials. This will enhance the mechanical properties of phosphoric acid-doped quaternary ammonium polymers by lowering the phosphoric acid content and increasing phosphoric acid resistance.

ii. Crosslinking Methodologies

There are several methods that can be used to produce suitable cross-linked polymeric materials according to the present invention. For example, polymers may be cross-linked using thermal crosslinking, photo crosslinking, radiation crosslinking, crosslinkable intermediates, and/or using composite systems that comprise a polymer electrolyte in combination with a crosslinking polymer or monomer. Although few cross-linked systems have been developed, cross-linked PEMs have, in general, been prepared by two routes: adding base functionality to the polymers (ionically cross-linking) or using a cross-linking agent (covalent cross-linking, often through the acid group functionality). Ionically cross-linked system are more flexible and less processing limited than covalently cross-linked systems. In covalently cross-linked systems, sulfonic acid groups or other functional groups have been used to create cross-links.

One embodiment of a method for thermally crosslinking a sulfonated poly(sulfide sulfone) is illustrated below.

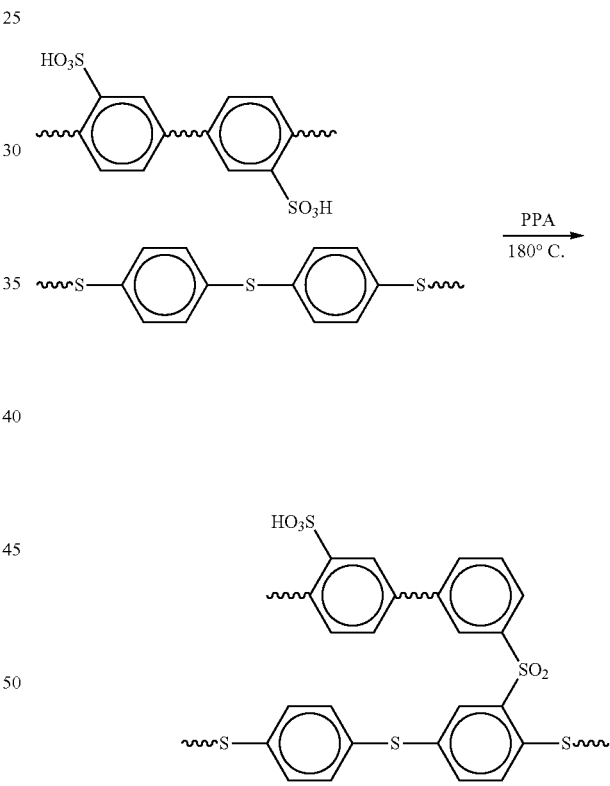

Heating the sulfonated poly(sulfide sulfone) at 180° C. was sufficient to crosslink this polymeric material. Additional information concerning this process is provided by *J. Pow. Sour.*, 170, 42 (2007), which is incorporated herein by reference.

Certain disclosed embodiments concern using ethynyl group-containing, cross-linkable PEMs. These compounds can be thermally crosslinked as well. For example, fluorinated aromatic polyethers comprising pendant ethynyl groups can be thermally crosslinked, as was accomplished for the following polymeric system.

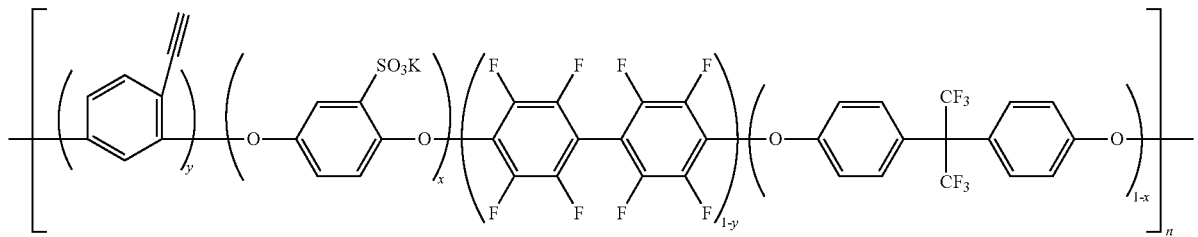

Additional information concerning this process is provided by *Macromolecules*, 42, 1652-1658 (2009), which is incorporated herein by reference. This thermal crosslinking approach does not result in lost cationic functional group sites and allows cross-linking effects to be probed independently without sacrificing functional group content or impacting chemical structure of the polymer chains, except for the ethynyl groups.

Polymeric materials comprising photoactive moieties can be crosslinked by irradiation at the appropriate wavelength or wavelengths. For example, compounds comprising azide functional groups can be crosslinked by UV irradiation, as was accomplished using the following system.

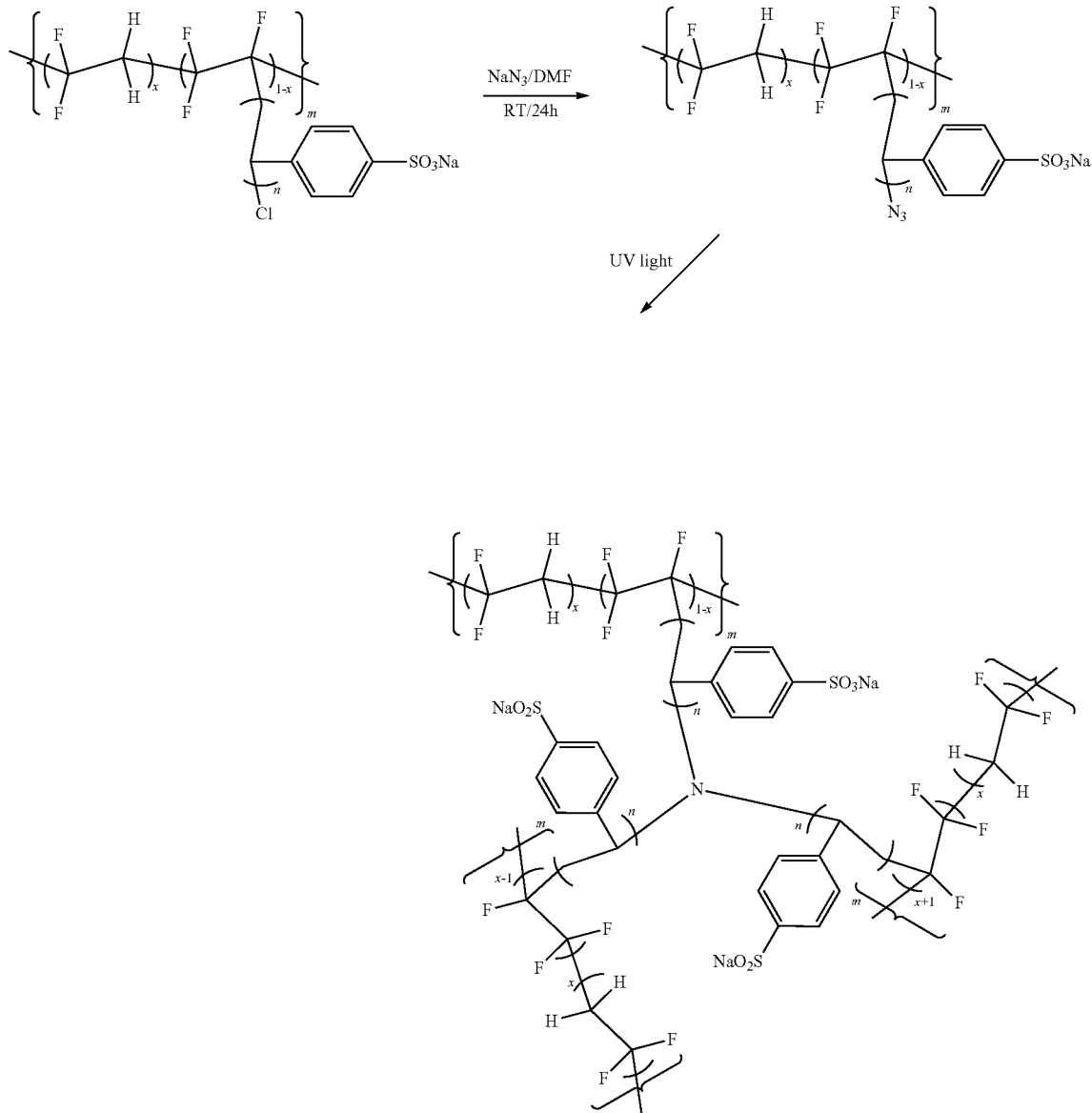

Additional information concerning this process is provided by *J. Membr. Sci.*, 313, 315 (2008), which is incorporated herein by reference.

Polyether sulfones have been crosslinked using benzophenone as a photoinitiator. This approach is exemplified by the following scheme.

The cross-linkable polyether sulfone was fabricated from a 15% (w/v) DMSO solution with benzophenone (1 wt. % PES 70 solid content) as a photo-initiator. The polymer solution was poured on a glass plate and the thickness of the film was controlled using a doctor blade. To obtain the cross-linked membrane, the polymer solution was UV irradiated (350 nm, 400 W) for 30 minutes under a nitrogen atmosphere. The UV-irradiated membrane was dried at 60° C. under reduced pressure for 30 hours. The membrane was placed in 10% HCl solution at 50° C. for 12 hours and washed thoroughly with de-ionized water several times to obtain cross-linked PES 70 membranes.

Radiation crosslinking also can be accomplished as demonstrated for ETFE films. An ETFE base film was irradiated using γ-ray irradiation at a dose rate of 25 kGy/hour under argon gas at room temperature. After crosslinking, the samples were heat-treated in a vacuum oven at 80° C. for 48 hours to eliminate the residue radicals. Additional information concerning this process can be found in *J. Power Sources*, 158, 69 (2006), which is incorporated herein by reference.

Crosslinked polymeric materials suitable for use as fuel cell membrane materials also can be produced using intermediates comprising appropriate functional groups. Crosslinkable functional groups include, by way of example, and without limitation, polyols, such as glycols and silanes. Polyol crosslinking is exemplified by the following scheme.

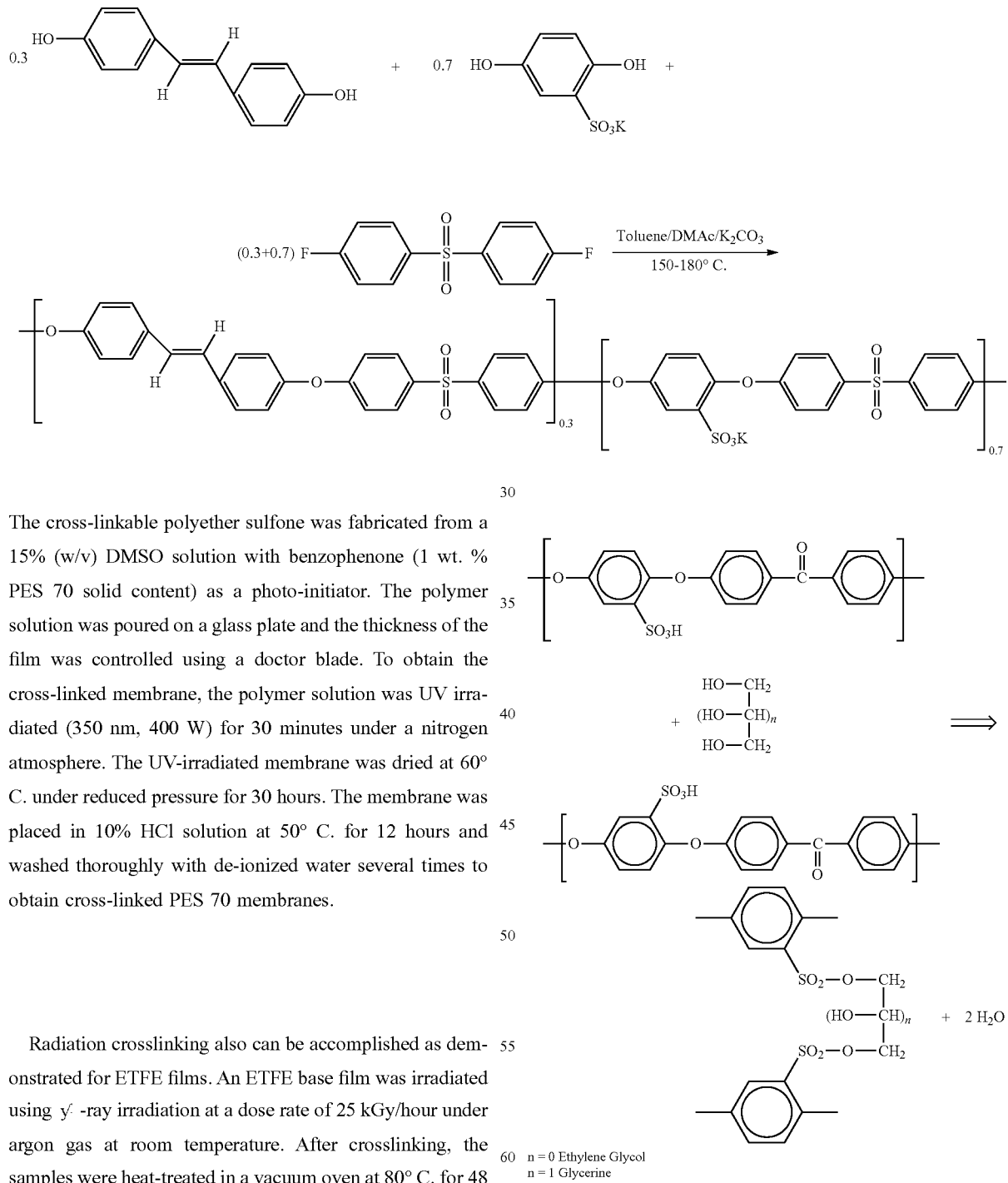

n = 0 Ethylene Glycol
n = 1 Glycerine
n = 2 Erythrite

Additional information concerning this exemplary process is provided by *J. Membrane Science*, 233 (2004), which is incorporated herein by reference.

Crosslinking using silane groups is exemplified by the following process.

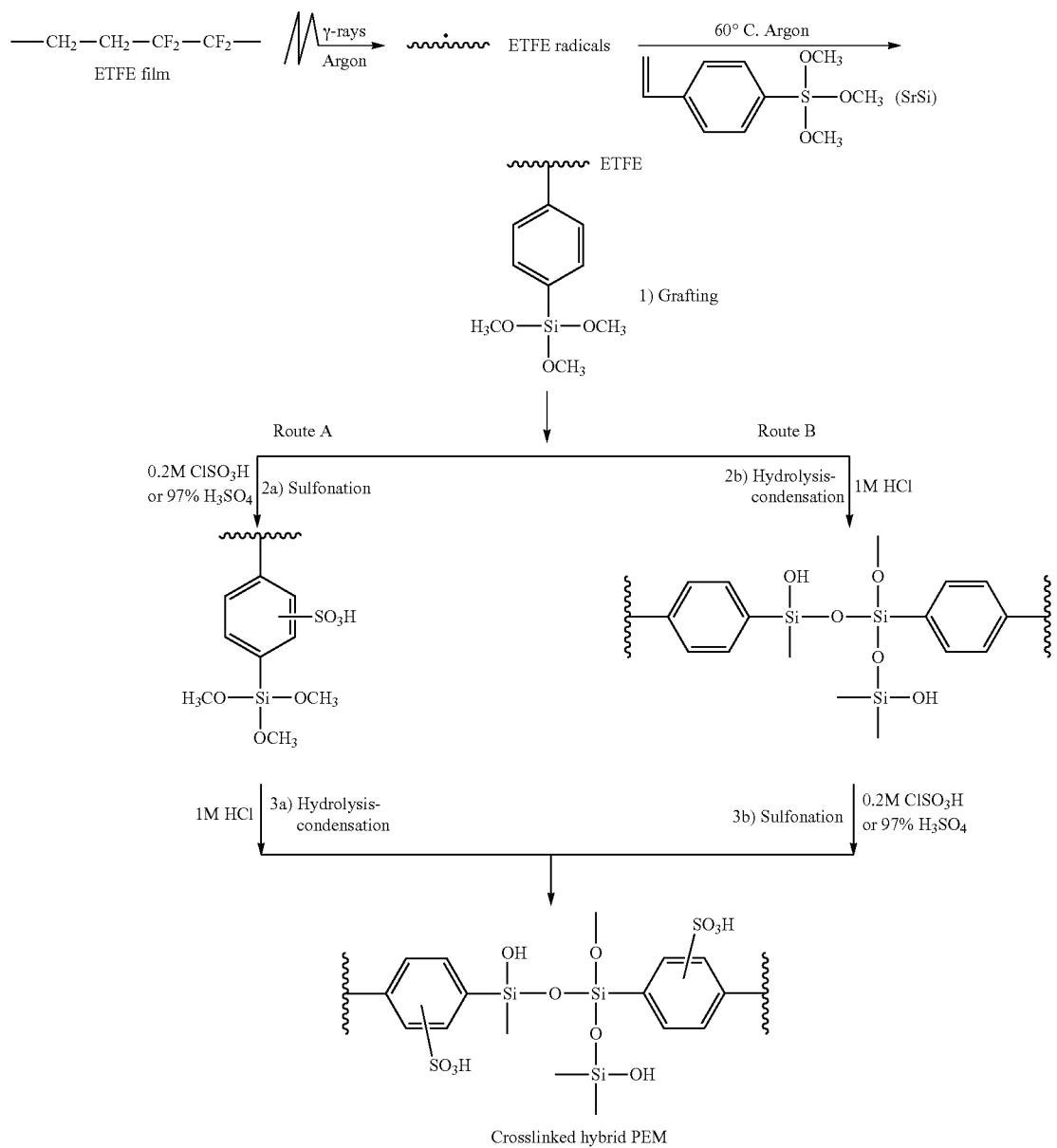

Additional information concerning this process is provided by *J. Poly. Sci. Chem.*, 46, 5559 (2008), which is incorporated herein by reference.

Crosslinkable monomers also can be added to a polymeric electrolyte solution, followed by crosslinking, to produce crosslinked polymeric materials suitable for the present invention. This process is illustrated by the following scheme.

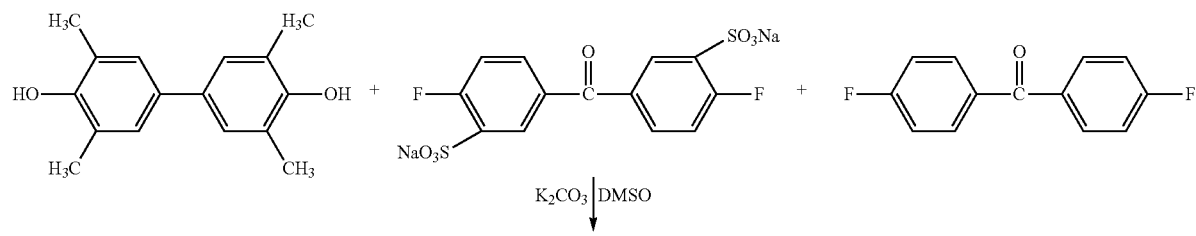

-continued

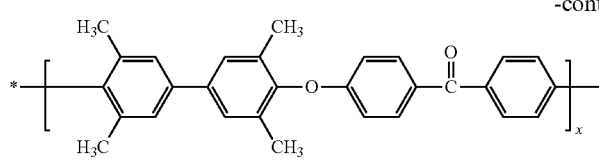
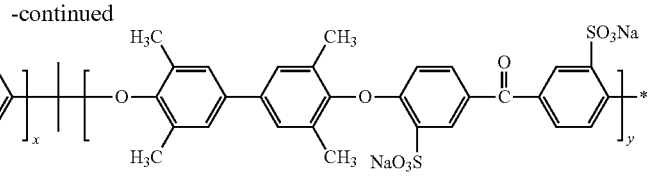

The preparation and the chemical structure of SPEEK

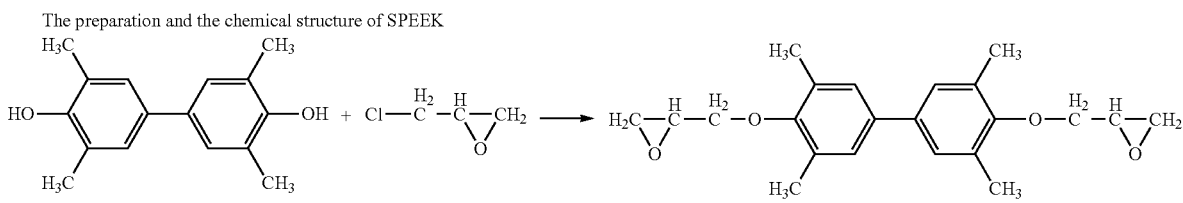

The preparation and the chemical structure of TMBP

Additional information concerning this process is provided by *J. Pow. Sour.*, 165, 708 (2007), which is incorporated herein by reference.

Wholly aromatic, partially fluorinated polymer electrolytes with cross-linkable end groups (ESF-BPs) have been synthesized. Covalently cross-linkable end-groups were included in this polymerization. Additional information concerning crosslinking and the effects of crosslinking on polymer membrane properties is provided by Example 2.

V. Energetics of Quaternary Ammonium-Biphosphate Ion Pairs

Figure 1F:
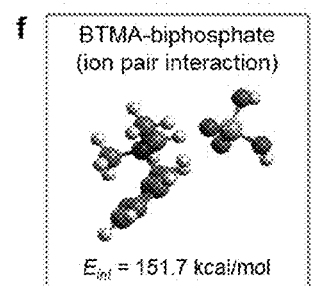
FIG. 1F illustrates intermolecular interaction energy of BTMA-biphosphate, where the intermolecular interaction energy was calculated by density functional theory employing ωB97XD functional and 6-311++G(2d,2p) basis sets.

Phosphoric acid-doped quaternary ammonium polyphenylenes provide a strong $QA^+\cdot\cdot\cdot H_2PO_4^-$ interaction. The intermolecular interaction energy between benzyltrimethyl-ammonium (BTMA) and biphosphate anion is calculated as 151.7 kcal/mol, which is 135.4 kcal/mol greater than the interaction between biphosphate and one water molecule, ca. 16.3 kcal/mol (FIG. 1F). The intermolecular interaction energy between the ionic pair and phosphoric acid gradually decreases when additional phosphoric acid molecules are associated. Through the stronger interactions driven by the ionic pair, phosphoric acid-doped, quaternary ammonium polyphenylenes maintain high phosphoric acid content in spite of water absorption. Since the presence of water increases the proton transfer rate, phosphoric acid-doped, quaternary ammonium polyphenylenes do not require a high concentration of cationic groups. The range of cationic groups is measured by ion exchange capacity. The desirable cationic group range is from 1.0 to about 3 mmol/gram, preferably 1.5 to 2.5 mmol/gram. In general, an ion exchange capacity less than 1.0 provides insufficient conductivity since the amount of phosphoric acid doping is insufficient. For an ion exchange capacity greater than 3, the mechanical properties of the proton exchange membrane start to become insufficient for certain embodiments. One problem associated with poly(diallydimethylammonium) membranes is that they have an ion exchange capacity greater than 6 mmol/gram. For cross-linked membranes the ion exchange capacity can be increased to greater than 3 because crosslinking enhances the mechanical properties of polymeric materials and membranes made therefrom.

VI. Phosphoric Acid Retention

Table 1 compares the properties of phosphoric acid-doped, quaternary ammonium polyphenylene and phosphoric acid-doped polybenzimidazole. The base moiety concentration in quaternary ammonium polyphenylene is 1.7 mmols/gram, approximately 3.8 times less than that in polybenzimidazole. The number of phosphoric acid molecules per base moiety for phosphoric acid-doped quaternary ammonium polyphenylene is 14.4, which is slightly greater than that for phosphoric acid-doped polybenzimidazole. This result confirms that the interactions of phosphoric acid in phosphoric acid-doped quaternary ammonium polyphenylene are stronger than those in phosphoric acid-doped polybenzimidazole. The polymer content of phosphoric acid-doped quaternary ammonium polyphenylene is more than two times higher than that of phosphoric acid-doped polybenzimidazole because of the significantly lower quaternary ammonium ion concentration compared to benzimidazole concentration. The number of water molecules per base moiety for the phosphoric acid-doped polymers is much higher than the amount for the un-doped polymers, indicating that the phosphoric acid molecules play a strong role in water uptake. The number of water molecules per phosphoric acid for phosphoric acid-doped quaternary ammonium polyphenylene is 4.4, which is less than that for phosphoric acid-doped polybenzimidazole, suggesting that phosphoric acid-doped polybenzimidazole is more hygroscopic than phosphoric acid-doped quaternary ammonium polyphenylene. The lower water affinity of phosphoric acid-doped quaternary ammonium polyphenylene may be due to the stronger interactions of doped phosphoric acid molecules. A similar trend is observed in sulfonated polymers in which polar groups such as nitrile or phosphine oxide in the polymer matrix effectively reduce the water uptake.

TABLE 1

Property Comparison between PA-Doped QAPOH and PBI Systems

| Polymer | Concentration of base moiety (meq./g) | Number of PA per base moiety | Polymer content[a] (%) | Number of $H_2O$ Per base moiety Un-doped | Number of $H_2O$ Per base moiety Doped | Number of $H_2O$ Per PA (doped) |
|---|---|---|---|---|---|---|
| QAPOH | 1.7 | 14.4 ± 0.1 | 29 | 27[b] | 64 | 4.4 |
| PBI | 6.5 | 11.6 ± 0.1 | 12 | 3.2[c] | 70 | 6.0 |

[a] for dry membrane.
[b] data taken from prior art
[c] data taken from prior art The properties of a quaternary ammonium tethered polystyrene (QASOH) are provided below in Table 2.

TABLE 2

| Polymer | Concentration of base moiety (mmol g$^{-1}$) | Number of PA per base moiety | Polymer content* (%) | Number of H$_2$O Per base moiety | | Per PA (doped) |
|---|---|---|---|---|---|---|
| | | | | Undoped | Doped | |
| QASOH | 2.0 | 2.7 ± 0.0 | 35 | 23 | 14 | 52 |

*for dry membrane.

The PA retention for PA-doped QAPOH and PA-doped PBI was compared at 80° C./40% RH and 220° C./0% RH (FIGS. 3A and 3B). The former testing conditions induce PA loss through water condensation and the latter conditions induce PA loss through PA evaporation. Under 80° C./40% RH, the PA-doped QAPOH retained 93% of the original weight and the PA-doped PBI held 54% after 44 hours of exposure (FIG. 3A). The number of PA per QA for the PA-doped QAPOH was found to be 12.8, retaining 90% of the original PA doping level. In contrast, the number of PA per benzimidazole for the PA-doped PBI was 5.7, retaining only 47% of the original PA content. Under 220° C./0% RH conditions, the PA-doped QAPOH retained 77% of the original weight and the PA-doped PBI retained 67%. The PA retention difference between two polymer systems through PA evaporation is much smaller than that through water condensation. This data establishes that ion pair coordination over acid-base coordination enables lower operating temperature with increased water tolerance.

The impact of the PA retention on proton conductivity is illustrated in FIG. 4A, which compares the proton conductivity change of PA-doped PBI and PA-doped QAPOH PEMs during RH cycles from 5 to 90% at 80° C. In the first run, the conductivity of PA-doped PBI gradually decreased as the RH increased to 90%. After the first run, the number of PA per benzimidazole in PA-doped PBI had decreased from 11.6 to 3.7, a loss of 68%. In subsequent runs, the conductivity of PA-doped PBI was decreased by three orders of magnitude under the low RH conditions. The PA-doped QAPOH showed different behavior. In the first run, the conductivity improved as the RH increased, reaching conductivity more than twice that achieved by PA-doped PBI. The proton conductivity gradually decreased during several subsequent runs before stabilizing after the fifth run, indicating that the loss of PA and corresponding loss of conductivity is much slower for QAPOH than for PBI. The number of PA per QA stabilized at 8.5, a 40% loss of the original PA content.

FIG. 4B shows the equilibrated proton conductivity of PEMs at 80° C. as a function of RH. The proton conductivity of PA-doped PBI gradually decreased with increasing RH due to PA leaching from the PEM. The proton conductivity of PA-doped QAPOH increased as RH increased to approximately 50%, then decreased with further RH increase. This suggests that unlike PA-doped PBI, PA-doped QAPOH effectively uses both PA and water for proton conduction without excessive PA loss in the intermediate RH range. The proton conductivity of Nafion® increased as RH increased, as expected. However, reasonable conductivity (>60 mS/cm) was only obtained when the RH level was more than 90%.

FIG. 4C shows the conductivity changes of these PEMs during fuel cell operation. The proton conductivity of PA-doped PBI measured at water partial pressure, $P_{H2O}$, of 2.3 kPa was stable; however, the proton conductivity with $P_{H2O}$ of 5.4 and 9.7 kPa started out high, but decreased with time. This result establishes that water absorption-induced PA loss from PA-doped PBI occurs at a very low water pressure.

In contrast, the proton conductivity of PA-doped QAPOH was reasonably stable up to $P_{H2O}$=17.3 kPa. The conductivity decay rate of PA-doped QAPOH at $P_{H2O}$=9.7 kPa was only −1.0 µS/cm/h, more than three orders of magnitude lower than that of PA-doped PBI at the same water partial pressure. This result establishes that PA-doped PBI can be used in fuel cells at 80° C. only at a very low water level partial pressure, equivalent to that produced from operation at 150 mA/cm². In contrast, the ion pair coordinated PA-doped QAPOH PEM enables fuel cell operation at 80° C. at high current density.

VII. Fuel Cell Performance and Durability

Membrane electrode assemblies (MEAs) using PA-doped QAPOH membranes were prepared with carbon-supported Pt catalysts and QA tethered poly(styrene). The H$_2$/O$_2$ fuel cell performance of MEAs at 80, 120 and 160° C. is compared at relatively low $P_{H2O}$ in FIGS. 5A-C. The PA-doped QAPOH MEA shows significantly better performance than Nafion® and PA-doped PBI (Celtec® P-1000) MEAs at 80° C. and 120° C. (FIGS. 4A and B). The poor performance of the Nafion® MEA is due to the high cell high frequency resistance (HFR), as a result of insufficient hydration of the PEM; the poor performance of the Celtec® MEA is due to the high cell HFR as a result of PA loss during the 10-14 hour break-in at the partially humidified condition. At 160° C., the Celtec® MEA showed excellent performance at the beginning of test; however, the performance gradually decreased and the cell HFR increased from 70 to 300 mΩ cm² over 40 hours (FIG. 5C). As a result, a comparable performance for the Celtec® MEA was obtained after 40 hours break-in. This suggests that PA loss is still occurring for PA-doped PBI even at 160° C. when $P_{H2O}$ is 49.6 kPa. In contrast, the performance of the QAPOH MEA did not change over time.

Figure 11:
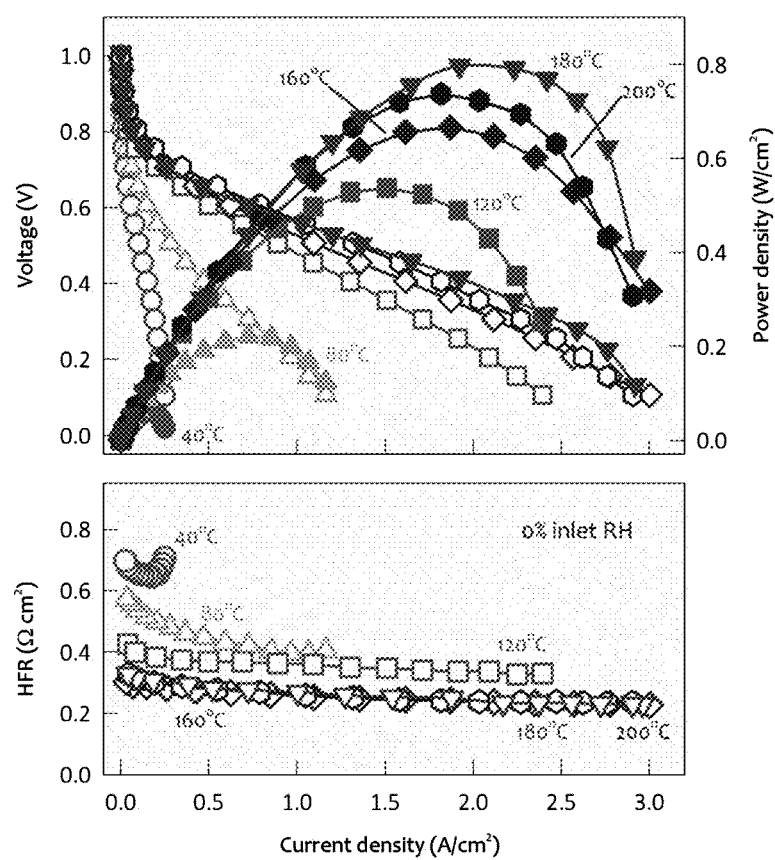
FIG. 11 provides i-V curves, power density and HFR of a QAPOH MEA (PEM thickness –120 μm) as a function of operating temperature; Tested at 206.8 kPa backpressure without external humidification; Anode: Pt/C (0.6 mg$_{Pt}$/cm$^2$), Cathode: Pt—Ru/C (0.4 mg$_{Pt}$/cm$^2$). Data represented by the filled symbols in the panel refer to the secondary y axe.
Figure 12A:
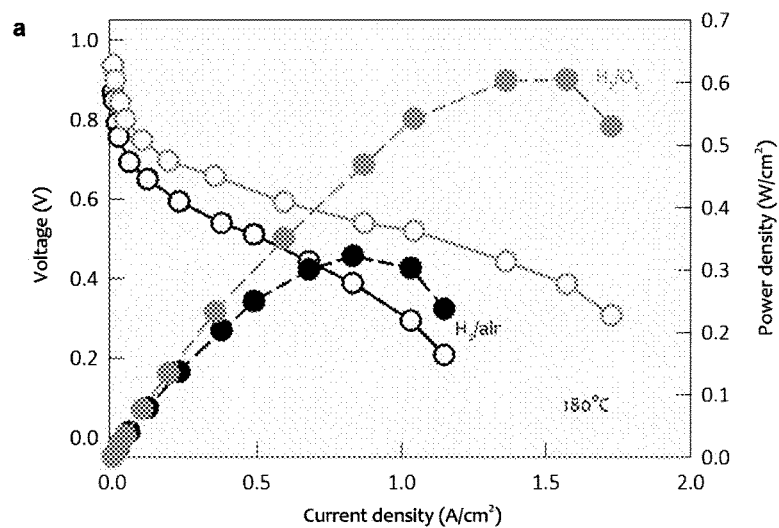
FIG. 12A provides i-V curves and power density of a QAPOH MEA (PEM thickness: 35 μm) at 180° C. under H$_2$/O$_2$ and H$_2$/air conditions; tested at 206.8 kPa backpressure without external humidification; anode: Pt/C (0.6 mg$_{Pt}$/cm$^2$), Cathode: Pt/C (0.6 mg$_{Pt}$/cm$^2$). Data represented by the filled symbols refer to the secondary y axes.
Figure 12B:
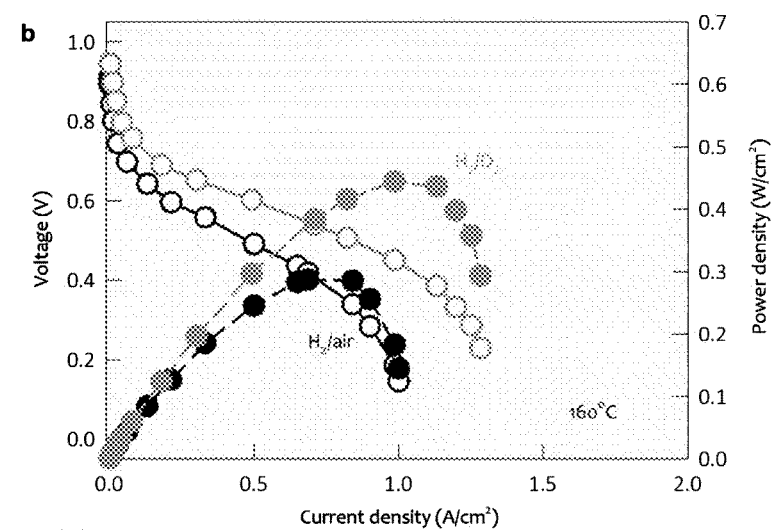
FIG. 12B provides i-V curves and power density of a QAPOH MEA (PEM thickness: 35 μm) at 160° C. under H$_2$/O$_2$ and H$_2$/air conditions; tested at 206.8 kPa backpressure without external humidification; anode: Pt/C (0.6 mg$_{Pt}$/cm$^2$), Cathode: Pt/C (0.6 mg$_{Pt}$/cm$^2$). Data represented by the filled symbols refer to the secondary y axes.

The H$_2$/O$_2$ fuel cell performance of the QAPOH MEA was also measured without external humidification as a function of operating temperature (FIG. 11). The performance increased when the operating temperature increased from 80° C. to 180° C., with 800 mW/cm² peak power density obtained at 180° C. The HFR of the MEA decreased from 0.68 to 0.23 Ω cm² as the operating temperature increased from 40° C. to 160° C. No significant performance improvement and HFR reduction were observed when the cell temperature was further increased to 200° C. The peak power density of H$_2$/air fuel cell of QAPOH MEAs typically shows approximately 50% of that of H$_2$/O$_2$ fuel cell (FIG. 12).

Figure 13:
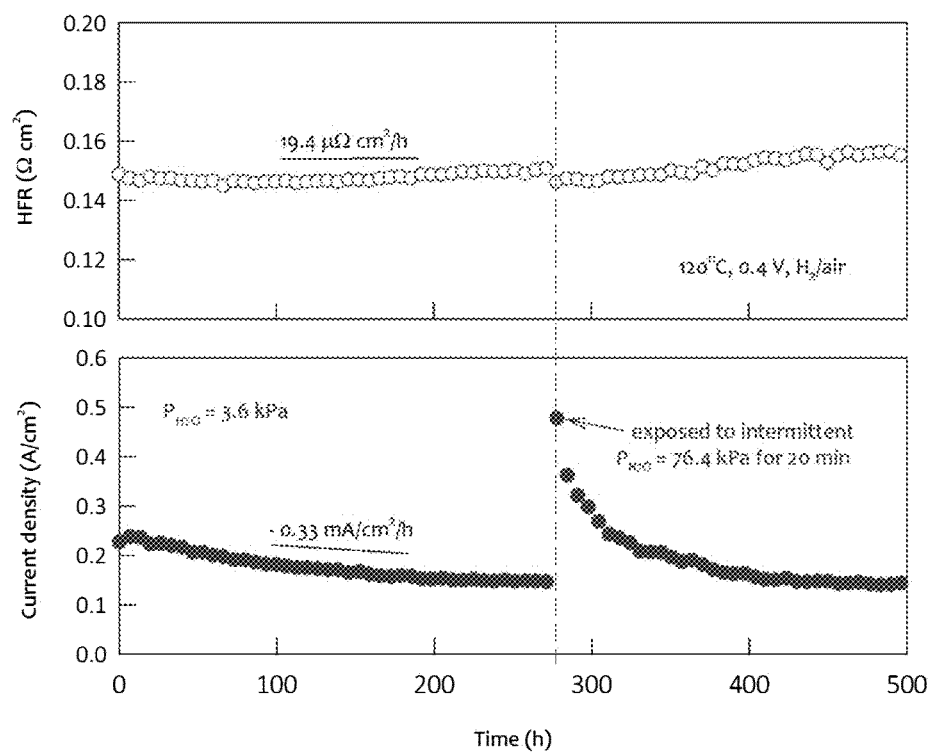
FIG. 13 provides i-V curves for H$_2$/air long-term performance at 120° C. Membrane: PA-doped QAPOH (thickness: 65 μm); The HFR growth rate was 19.4 μΩ cm$^2$/h, and the decay rate of the cell current density was –0.33 mA cm$^2$/h. The increased HFR after the first 276 h of fuel cell operation fully recovered to the initial value with the intermittent $P_{H2O}$=76.4 kPa. This suggests that the increased HFR and the current density loss observed for the first 276 h are primarily due to the slow dehydration. The HFR and current density after the intermittent inlet RH gradually changed over the next ~200 h as the cell was drying out again without humidification.
Figure 14:
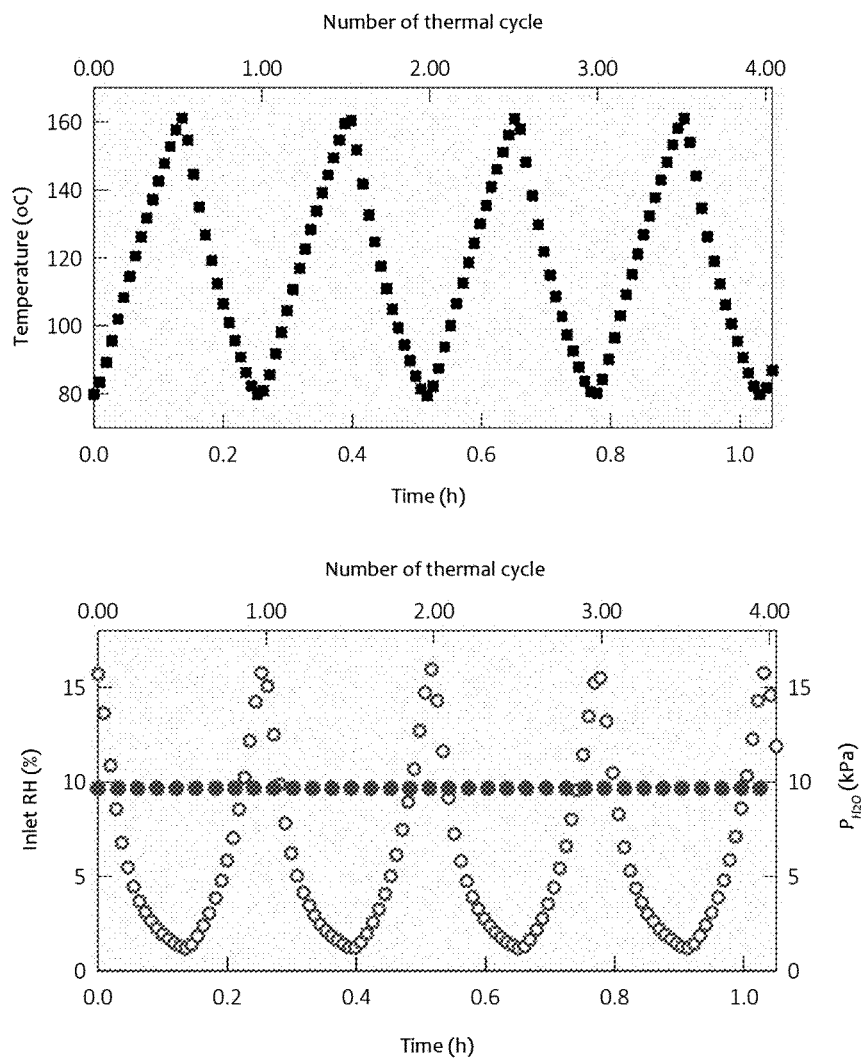
FIG. 14 provides temperature, inlet RH and cathode water vapor pressure ($P_{H2O}$) profiles during 1 h AST, where data represented by the filled symbols in the panel refer to the secondary y axes.
Figure 15A:
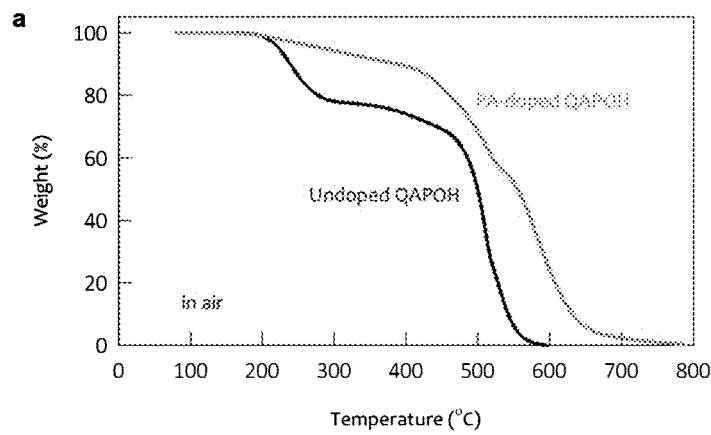
FIG. 15A provides thermal-oxidative stability of PA-doped QA tethered polymers. TGA temperature scan of QAPOH in air; the 5% thermal degradation temperature ($T_d$) of PA-doped QAPOH is 286° C. The degradation temperature is well above fuel cell operating temperatures. The higher $T_d$ of PA-doped polymers compared with un-doped polymers indicates that the ion pair interaction increases the thermal stability of the PEMs.
Figure 15B:
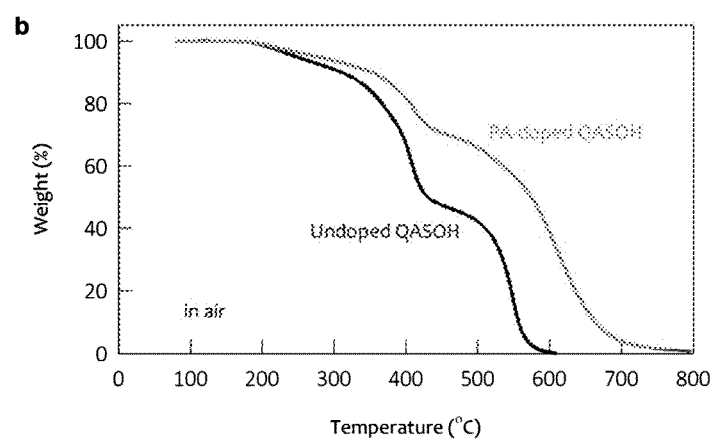
FIG. 15B provides thermal-oxidative stability of PA-doped QA tethered polymers. TGA temperature scan of QASOH in air; the 5% thermal degradation temperature ($T_d$) of PA-doped QASOH is 274° C. The degradation temperature is well above fuel cell operating temperatures. The higher $T_d$ of PA-doped polymers compared with un-doped polymers indicates that the ion pair interaction increases the thermal stability of the PEMs.
Figure 15C:
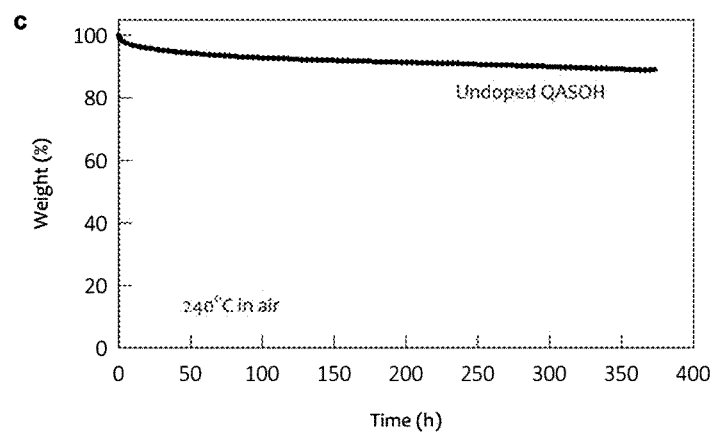
FIG. 15C provides a TGA time scan of PA-doped QASOH as a function of time at 240° C.
Figure 16:
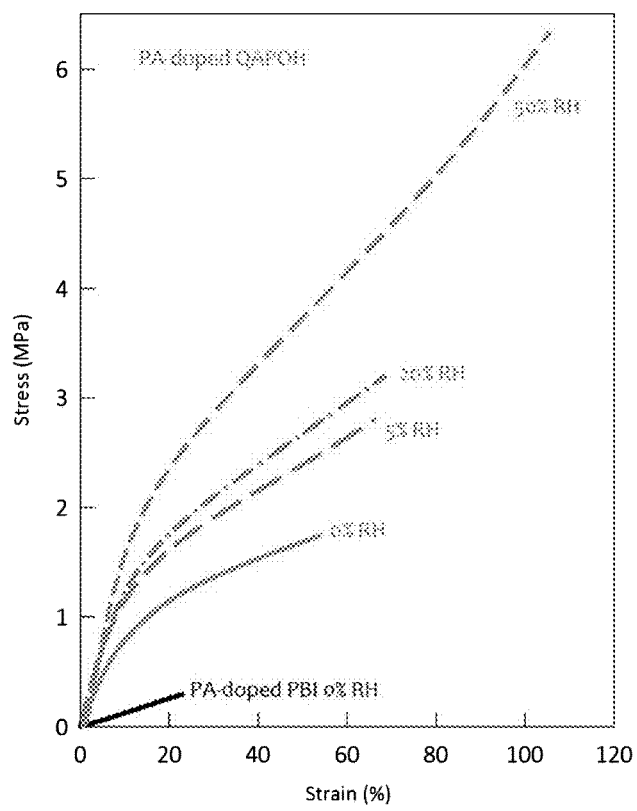
FIG. 16 provides stress-strain curves of PA-doped QAPOH at 80° C. as a function of RH, indicating that the mechanical properties of PA-doped PBI at 0% RH are relatively poor; and the tensile stress was 0.29 MPa with ~20% strain. Improved but inconsistent stress-strain behaviour for PA-doped PBI was observed when RH >0%, with behaviour depending on equilibration conditions.

The durability of QAPOH MEAs was first evaluated under 120° C. H$_2$/air conditions for 500 hours (FIG. 13). The data shows no performance degradation due to PA loss or PEM degradation. Therefore, the durability of QAPOH MEAs using a more rigorous accelerated stress test (AST) was conducted. The AST consisted of thermal cycling from 80° C. to 160° C. with a temperature ramp of 10° C./min, with $P_{H2O}$ of 9.7 kPa (FIG. 14). FIG. 5D compares the durability of the Celtec® and QAPOH under this AST. The voltage of the Celtec® MEA at constant current density of 0.15 A/cm² and 68.9 kPa backpressure decreased from 0.78 to about 0 V within only 70 cycles, revealing much inferior stability compared to operation under anhydrous conditions.

After the AST, the number of PA per benzimidazole for the Celtec® MEA was reduced to 1.7, retaining less than 15% of the original PA doping level. In contrast, the performance of the QAPOH MEA was relatively stable, with a voltage decay at 160° C. of −0.39 mV/cycle (−1.51 mV/h). The number of PA per QA after the 500 thermal cycles was 8.4, retaining 60% of the original PA doping level.

Date presented herein establishes that, while acid-base coordinated PBI fuel cells require anhydrous conditions for optimal performance and durability, fuel cells based on ion-pair coordinated cationic polymeric materials, such as QAPOH PEMs, are more tolerant of water condensation or absorption. This enables fuel cell operation at lower temperatures with substantially higher water partial pressure than are possible for high-temperature PA-doped PBI fuel cells. Furthermore, the cationic-doped polymeric materials, such as PA-doped QAPOH PEMs, disclosed herein provided excellent thermal and mechanical properties. This enables fuel cell operation at temperatures up to 180° C. At the same time, these ion-pair coordinated PEM fuel cells can operate at higher temperatures and lower humidity levels than low-temperature Nafion®-based PEM fuel cells. This operational flexibility, which is unattainable with prior fuel cell technology, enables fuel cell system simplification and cost reduction, leading to a paradigm shift in the effort to spur commercialization of low-cost fuel cells for clean energy automotive and stationary power applications.

VIII. Examples

The following examples are provided to illustrate certain specific features of disclosed embodiments. A person of ordinary skill in the art will appreciate that the scope of the present invention is not limited to these particular exemplary features.

Example 1

Materials.

The PA-doped PBI membranes (Celtec® P) produced through the polyphosphoric acid process [Xia, L. X. et al., "High Temperature Polybenzimidazole Fuel Cell Membranes via a Sol-gel Process," *Chem. Mater.* 17, 5328 (2005), incorporated herein by reference] were supplied by BASF Fuel Cells Inc. (Somerset, N.J., USA). The membrane thickness was 260 μm. Nafion® membranes (Nafion® NR-212, 50 μm thickness) were purchased from Ion Power, Inc. (New Castle, Del., USA). Gas diffusion electrodes (GDEs, ELE0142) for Nafion® MEAs were supplied by Johnson Matthey. The GDEs contain HiSPEC 9100 60% Pt/C (Pt loading: 2.0 $mg_{Pt}$ $cm^2$). PA-doped PBI MEAs were supplied by BASF Fuel Cells Inc. (Somerset, N.J., USA). The MEAs were Celtec®-P 1000 MEAs produced at BASF Fuel Cell GmbH (Frankfurt, Germany). Anode catalyst: Pt/C (Pt loading: 1.0 $mg_{Pt}$ $cm^{-2}$); cathode catalyst: Pt-alloy/C (Pt loading: 0.75 $mg_{Pt}$ $cm^{-2}$) [Schmidt T. J, et al, "Properties of High Temperature PEFC Celtex®-P1000 MEAs in Start/Stop Operation Mode," *J. Power Sources* 176, 428 (2008), incorporated herein by reference]. PA-doped PBI PEM thickness: ~50 μm. For the fabrication of QAPOH MEAs, commercial 60% Pt/C (HiSPEC™ 9100) and 40% Pt—Ru/C (Pt:Ru=2:1, HiSPEC™ 10000) were purchased from Alfa Aesar and Johnson Matthey, respectively. The Pt loading on the anode and cathode were both 0.6 $mg_{Pt}/cm^2$. Single-side ELAT® gas diffusion layers (GDLs) were purchased from ETEK.

QAPOH membranes were synthesized by an irreversible Diels-Alder reaction between tetramethylbis(cyclopentadienone) and 1,4-diethynylbenzene. This polymer was then brominated, converting a fraction of the methyl positions into bromomethyl groups. The resultant functionalized polymer was then cast into films from chloroform. The films were then soaked in a 5 M solution of aqueous trimethyl amine to generate the QAPOH membranes. The QAPOH membranes were then immersed in an 85 wt. % aqueous solution of PA at room temperature for 2 hours. All PA-doped QAPOH were used after removing the excess PA on the membrane surface by blot drying.

Quaternary ammonium tethered poly(styrene) hydroxide (QASOH) ionomeric binder was synthesized via nucleophilic substitution of triethylamine (TEA) and 4-fluorophenethylamine onto poly(vinylbenzyl chloride) (PS-bzCl). A solution of poly(vinylbenzyl chloride) (10 g, Sigma-Aldrich) in N,N-dimethylformamide (DMF) (360 ml) was reacted with TEA (3.3151 g, Sigma-Aldrich) at 130° C. for 3 hours. To the reaction mixture, 4-fluorophenethylamine (4.5594 g, Sigma-Aldrich) was added and reacted for an additional 12 hours. This 5 wt. % polystyrene copolymer solution in DMF was used as an ionomer solution. PA-doped QASOH was obtained after electrode fabrication process via imbibing process (see below).

Spectroscopy.

The proton nuclear magnetic resonance ($^1$H NMR) spectra were recorded using a Bruker Avance 500 spectrometer (500 MHz) in deuterated dimethylsulfoxide (DMSO-$d_6$). Chemical shifts of $^1$H NMR spectra were referenced to tetramethylsilane (TMS) at 0 ppm as an internal reference. The Fourier transform infrared spectroscopy (FTIR) spectra were recorded using a Thermoscientific FTIR 8700 at a resolution of 4 $cm^{-1}$ in the range of 4000-600 $cm^{-1}$.

Titration.

The PA-doping level of PEMs was determined by acid-base titration using the following procedure: i) PEM samples measuring 0.5 inch×2 inches were weighed; ii) the PEM samples were titrated with 0.1 M NaOH solution using phenolphthalein as an indicator; iii) the samples were washed with water and dried in a vacuum plate at 100° C. for 3 hours and weighed again. The number of PA per repeat unit (X) was calculated from the following equation:

$$X = \frac{V_{NaOH} \cdot C_{NaOH}}{\left(Eqiv_{mol} \times \left(\frac{W_{dry}}{M_W}\right)\right)} \quad (1)$$

where $V_{NaOH}$ (l): the volume of NaOH
$C_{NaOH}$ (mol/l): the molar concentration of NaOH
$Equiv_{mol}$: equivalent mole of titrant for PA which is 3; three mole of NaOH reacts with one more of phosphoric acid to produce trisodium phosphate.
$W_{dry}$ (g): dry polymer weight
$M_W$ (g/mol): the molecular weight of the polymer repeat unit.

The number of PA per QA (or benzimidazole), ($nPA_{QA}$) was calculated from the following equation:

$$nPA_{QA} = \frac{(X \cdot 1000)}{(IEC \cdot M_W)} \quad (2)$$

where IEC (mmol/gram): ion exchange capacity of undoped PEM.

The hydration number (k), defined as the number of water molecules per QA (or benzimidazole) of PA-doped PEMs, was calculated from the following equation:

$$\lambda = \frac{\left(W_{wet} - W_{dry} - 98 \cdot W_{dry} \cdot nPA_{FG} * \frac{IEC}{1000}\right)}{\left(18 \cdot W_{dry} \cdot \frac{IEC}{1000}\right)} \quad (3)$$

where $W_{wet}$ (g): wet weight of PA-doped PEM.

Thermogravimetric Analysis.

PA loss for PA-doped PBI and PA-doped QAPOH was measured under two conditions: i) 80° C./40% RH and ii) 220° C./0% RH. For the 80° C. conditions, 0.5 inch×2 inches rectangular test PEM strips were put in a convection oven at 80° C. for 1 hour to remove most water. After measuring the weight of the test strips, the samples were equilibrated at 80° C./40% RH for 1 hour in an environment oven and taken out to dry at 80° C. and 0% RH for 1 hour to remove water. The weight of the dried samples was measured. The equilibrating and drying steps were repeated until the total equilibrated time reached 44 hours. After finishing the last measurement, the samples were immersed in boiling water for 2 hours to remove all PA, dry at 80° C. for 6 hours and measured the weight to calculate the PA loss. Two samples were tested for each PEM. For the 220° C. conditions, the weight of PEMs was measured by thermogravimetric analysis (TGA, TA Instrument 2100 series). The temperature scan was performed with 3 steps: 1) PEMs were heated from 30° C. to 100° C. at a heating rate of 10° C./minutes in air, followed by maintaining at 100° C. for 1 hour to remove moisture; ii) PEMs were heated from 100° C. to 200° C. at a heating rate of 10° C./minutes in air, followed by maintaining at 200° C. for 50 hours to observe the loss of PA. Thermal oxidative stability of un-doped and PA-doped QA functionalized polymers were measured by TGA. The polymer membranes were preheated at 150° C. for 1 hour in the TGA furnace to remove moisture. The temperature scan was performed from 80° C. to 800° C. at a heating rate of 10° C./minutes in air. The isothermal experiment was performed at 240° C. in air.

Proton Conductivity.

In-plane proton conductivity of the PEMs was measured from AC impedance spectroscopy using a Solartron 1260 gain phase analyser over a frequency range from 1 Hz to 1 MHz. Sample strips had a dimension of approximately 0.5×1 in. and were seated between two Pt coated electrodes of a window cell. The conductivity ($\sigma$, mS/cm) of the PEMs in the longitudinal direction was calculated from the equation:

$$\sigma = \frac{L}{R \cdot d \cdot W} \quad (4)$$

where L (cm) is the distance between the electrodes
R (mΩ) is the resistance that was read from the low intersect of the high frequency semicircle on a complex impedance plane with the Re(Z) axis.
d (cm) is the wet thickness of the membrane.
W (cm) is the width of the membrane.

The proton conductivity change during RH cycles was measured at 5% RH (1st run) and 10 to 90% RH (subsequent runs) with 10% RH increments. Two hour equilibration time was applied at a given RH. Before each RH cycle, samples were equilibrated for 14 h at 5% RH. Each RH cycle took 32 hours. The equilibrated proton conductivity was obtained from the conductivity of PEMs after exposure to a given RH.

The conductivity of PEMs was measured every two hour and the equilibrated conductivity at the given RH was taken when the conductivity change was less than 2% from the previous measurement.

The proton conductivity of the PEMs was obtained in fuel cell mode by an HFR method. Hibbs, M. R., et al. "Synthesis and Characterization of poly(phenylene)-based Anion Exchange Membrane for Alkaline Fuel Cells," Macromolecules 42, 8316-8321 (2009), which is incorporated herein by reference. For the measurement, MEAs comprising of PEMs, catalyst layers and gas diffusion layers were fabricated and run at 150 mA/cm². A small AC signal was applied to the MEAs to modulate the DC load current under $H_2/O_2$ fuel cell operating conditions. The single high frequency was determined by imposing the AC perturbation over a broad range of frequency by an electrochemical impedance. The measured HFR was converted to proton conductivity without subtracting the electronic resistance contributions.

Through-plane conductivity (a, mS/cm) of the PEMs was calculated from the equation:

$$\sigma = \frac{t}{R} \quad (5)$$

where t (cm) is the thickness of membrane.
R (mΩ/cm²) is the HFR that was read from the single frequency measurement.

The water partial pressure, $P_{H2O}$, was calculated from the inlet RH and water mass flux ($J_0$, g/cm²-s) produced via oxygen reduction reaction to the mass flux of water of a given inlet RH. The mass flux of water was calculated from the equation:

$$J_0 = \frac{j_o M_{Water}}{2F} \quad (6)$$

where $j_0$ (A/cm²) is the Faradaic current density.
$M_{Water}$ (g/mol) is the molar mass of water.
F (C/mol) is the Faraday constant.

Mechanical Properties.

The mechanical properties of PEMs were characterized by dynamic mechanical thermal analysis (DMTA, TA Instrument Q800-RH). The temperature and humidity were controlled in an environmental chamber. The tensile test was performed using 0.5 inch×1 inch rectangular test strips at a load ramp of 0.5 MPa min$^{-1}$ at 80° C. and 0, 5, 20 and 50% RH. The stress-strain behaviour of the membranes was measured after 1 h of equilibrium time at the target RH. Three samples were tested for each condition.

MEA fabrication. MEAs were prepared from catalyst inks containing Pt/C catalysts (HiSPEC™ 9100), 5 wt. % QASOH dispersion in DMF, methanol, and ethylene glycol. The catalyst ink composition was 1.5 wt. % Pt/C, 3.5 wt. % QASOH dispersion, 22 wt. % ethylene glycol, and 73 wt. % methanol. Gas diffusion electrodes (GDEs) were prepared by painting catalyst inks onto GDLs on a vacuum plate at 100° C. The catalyst coated GDEs were sandwiched with a PA-doped QAPOH PEM after immersion of both GDEs in 85 wt. % PA solution at room temperature for 5 minutes, followed by removing the excess PA on the GDE surface with blot drying. In this way, the PA doping was controlled to a low level of about 2.7 PA per QA, to prevent PA flooding during fuel cell tests. The active area of each MEA was 4.8 cm².

Fuel Cell Performance and Durability.

$H_2/O_2$ fuel cell performance of the MEAs was measured using a fuel cell test station (Fuel Cell Technologies, Inc.). Polarization curves and HFR of MEAs were obtained at temperatures ranging from 40° C. to 200° C. $H_2$ and $O_2$ were supplied at a rate of 200 and 300 sccm, respectively. $H_2$/air long-term stability tests were performed as well. The cell current density and HFR were measured every minute under constant voltage of 0.4 V without backpressure and without external humidification (cathode outlet $P_{H2O}$=3.6 kPa) for the first 276 hours, then with 3.7% intermittent inlet RH (cathode outlet $P_{H2O}$=76.4 kPa) for 20 minutes. The stability of PEMs was evaluated by AST. For this experiment, a temperature cycling AST consisting of triangular thermal cycles from 80° C. to 160° C. with a ramp of 10° C./min was performed. The anode and cathode inlet dew point was fixed to 40° C. Cell voltage under a constant current density of 0.15 A/cm² at 68.9 kPa backpressure was measured every minute. The cell HFR was measured each time the cell temperature reached 80° C. or 160° C. The inlet RH and $P_{H2O}$ were reported for fuel cell performance and durability measurement.

Modeling.

DFT calculations were performed using the Gaussian 09 suite of programs. Geometrical parameters were optimized employing ωB97XD functional with 6-311++G(2d, 2p) basis set, where the functional includes effects of long-range correction and dispersion correction. The basis set superposition error (BSSE) for interaction energy calculations were corrected using the counterpoise method.

Example 2

This example concerns a method for crosslinking polymeric materials as disclosed herein, and the physical properties that result from such crosslinking. Sulfonated polymeric materials were used as a method for demonstrating crosslinking effects generally. Proton conductivity and water uptake of ESF-BP membranes were measured as a function of degree of sulfonation and degree of crosslinking in order to assess proton conductivity and water uptake. The nomenclature used for the membranes are ESFx-BP-y (where x is DS and y is DC). Select membranes were tested in fuel cells in order to evaluate performance and durability. Membrane-electrode assemblies (MEAs) using thin ESFx-BP-y membranes and Nafion®-bonded catalysts were fabricated by a modified Decal hot pressing method [22]. This method provided good adhesion between membrane and electrodes resulting in no significant interfacial issues between the hydrocarbon membranes and Nafion®-bonded electrodes. Fuel cell performance was evaluated and compared with Nafion®.

A. Materials

Potassium 2,5-dihydroxybenzenesulfonate (SHQ), 4,4'-biphenol (BP) and potassium carbonate were purchased from Aldrich Chemical Co. and used after vacuum drying at 100° C. for 2 days. Benzene and N,N-dimethylacetamide (DMAc) were purchased from Aldrich Chemical Co. and used without further purification. Decafluorobiphenyl (DFBP) was purchased from Fluorochem Ltd. and used without purification. 3-Ethynylphenol was purchased from Alfa AESAR Co.

B. Polymer Synthesis

Highly fluorinated and cross-linkable ESF-BP random copolymers were synthesized via nucleophilic aromatic substitution of SHQ and BP with DFBP followed by the reaction with 3-ethynylphenol as illustrated by Scheme 1 below.

Scheme 1

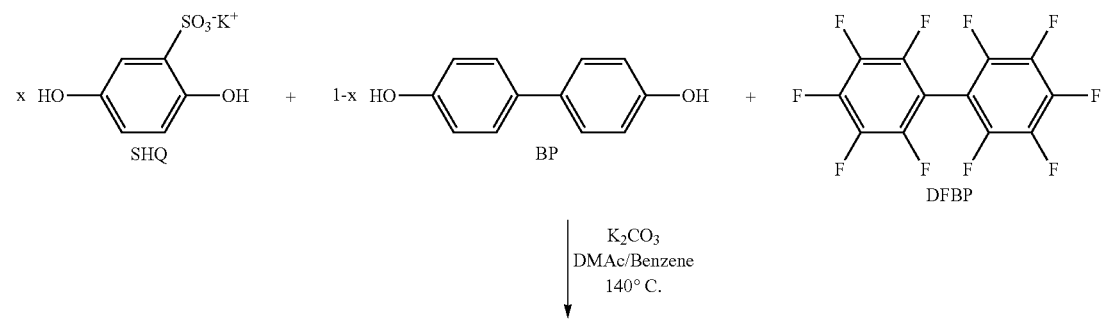

-continued

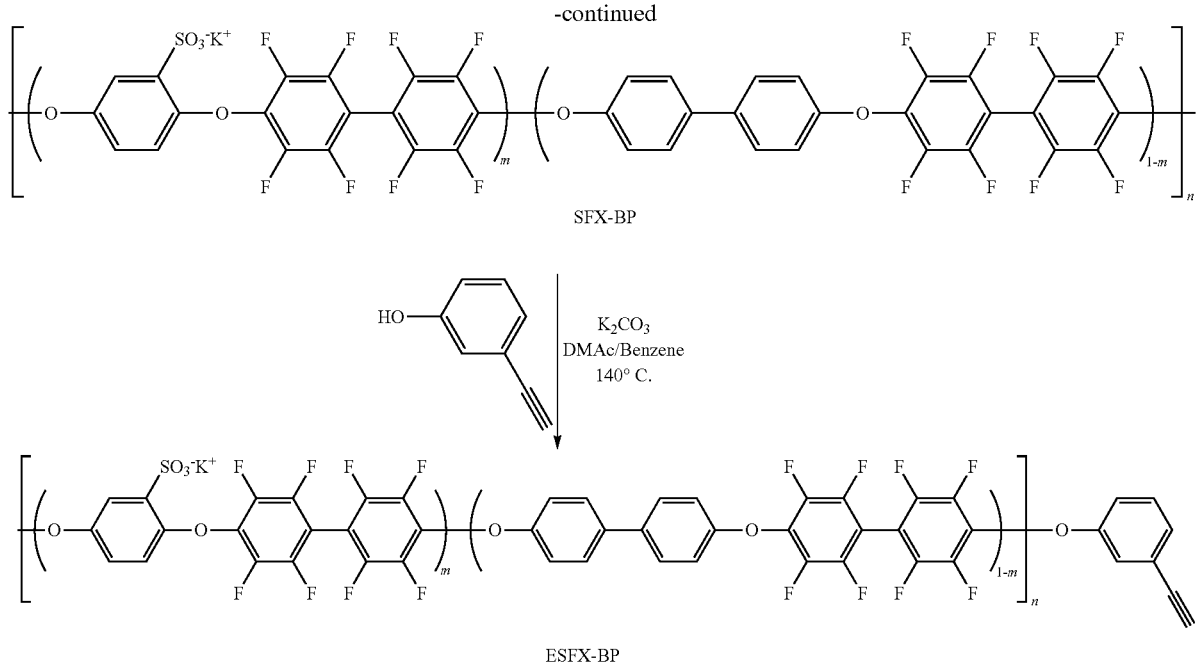

SFX-BP

ESFX-BP

The DS of polymers was precisely controlled by the feed ratio of sulfonated monomer (SHQ) and non-sulfonated monomer (BP). A typical copolymerization for an ESF-BP series will be described using ESF90-BP as a representative example, where 90 is the DS for the polymer. For ESF90-BP, SHQ (18.0 mmol, 4.11 g) and BP (2.0 mmol, 0.37 g) were dissolved in a mixture of DMAc (40 mL) and benzene (20 mL) with $K_2CO_3$ (3.40 g, 1.15 eq. of dihydroxy monomer). The reaction mixture was heated to 140° C. in a 250 mL 2-neck flask equipped with a magnetic stirrer, a nitrogen inlet, and Dean-Stark trap, and this temperature was maintained for 5 hours to ensure complete dehydration. This reaction mixture was allowed to reflux at 140° C. while the benzene azeotropically removed the water produced in the system. After removing benzene, the reaction mixture was stirred at this temperature for a further period 2 hours. A solution of DFBP (6.70 g, 1.002 equivalents of dihydroxy monomers) in DMAc (20 mL) was added and stirred at 140° C. for 12 hours.

An ethynyl group was used as an exemplary crosslinking moiety. In order to attach the ethynyl group at the end of polymer, 3-ethynylphenol (0.4 g, 0.17 eq. of dihydroxy monomer), DMAc (10 mL), and benzene (10 mL) were added to the reaction mixture and the reaction was continued for 3 hours. The reaction mixture was cooled and then precipitated into 1 L of ethanol/water (9.8:0.2). The precipitated polymer was filtered and washed with ethanol. The brown solid was dried under vacuum (60° C.) for 3 days.

C. Characterization $^1$H and $^{19}$F NMR spectra were recorded on a JEOL JNM-LA 300 WB FT-NMR with deuterated dimethylsulfoxide (DMSO-d6) as a solvent and tetramethylsilane (TMS) and fluorinated trichlorofluoromethane as internal and external references, respectively. Molecular weights of ESFx-BP were determined by the ratio of end groups to aromatic groups in the polymer as determined from relative $^1$H NMR signals. Inherent viscosities ($\eta_{inh}$) of potassium form ESFx-BP were obtained at 25° C. in DMAc using an Ubbelohde viscometer, thermostatically controlled in a water bath. Differential scanning calorimetry (DSC, TA Instrument 2100 series) was used to measure cross-linking kinetics of ESFx-BP. Heat flow was measured as a function of time for isothermal curing at a temperature of 250° C. The degree of cross-linking (given in %) was determined as $y=(H_t/H_T)\times 100$, where $H_t$ is the total heat flow normalized for sample mass for a given cross-linking time, t, and $H_T$ is the total heat flow normalized for sample mass for a cross-linking time of 100 minutes (the point where no further cross-linking reactions were observed, i.e. 100% DC). Based on comparisons between the enthalpy of cyclotrimerization of acetylene (i.e. 143 kcal/mol) and the heat flows of ESF-BPs witnessed by DSC at 100% DC (~130 kcal/mol), it seems that most ethynyl groups (ca. >90% of end-groups) are cross-linked in the 100% DC samples.

D. Membrane Preparation

The non-cross-linked ESFx-BP polymers were cast from 30% (w/v) DMAc solution on clean glass substrates. The polymer solutions were filtered to remove particulates using a disposable syringe and disc filters (1 μm) prior to casting. The removal of DMAc was accomplished in an oven at 50° C. in an inert ($N_2$) environment over 3 hours. Thermal cross-linking of ESFx-BP was subsequently performed on hot plate at 250° C. The degree of cross-linking was controlled by varying cross-linking times. The membranes, prepared in salt form, were acidified by immersion in 0.5 M boiling sulfuric acid ($H_2SO_4$) solution for 2 hours, followed by treatment with boiling deionized water for 2 hours. All acidified membranes were stored at room temperature in deionized water for at least 1 day before testing. ESFx-BP copolymers with DS of 70-100% were synthesized via direct copolymerization from SHQ, BP and DFBP, followed by the reaction with 3-ethynylphenol as a cross-linkable end-group. The molecular weights of the prepared copolymers were controlled using reaction time and temperature and the molar feed ratio of monomers. In order to investigate the side reaction of ortho positioned fluorines of decafluorobiphenyl (DFBP), the effect of reaction temperature was examined at 140° C., 145° C., and 155° C. by $^{19}$F NMR.

Polymerization at a reaction temperature of 155° C. resulted in the reaction solution forming a gel, while no such gel formed at lower temperatures. This result indicated that polymerization temperatures may need to be limited to below about 145° C. to avoid side reactions such as branching and cross-linking for certain disclosed polymeric materials.

Figure 17:
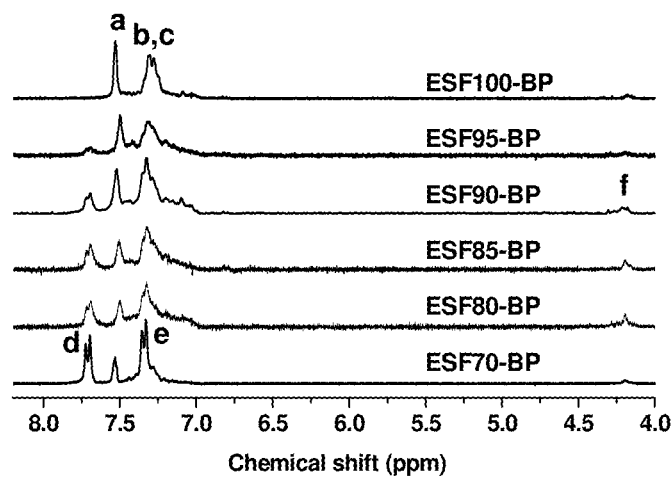
FIG. 17 provides $^1$H NMR spectra of ESFx-BP as a function of sulfonation level as discussed in Example 2.
Figure 18:
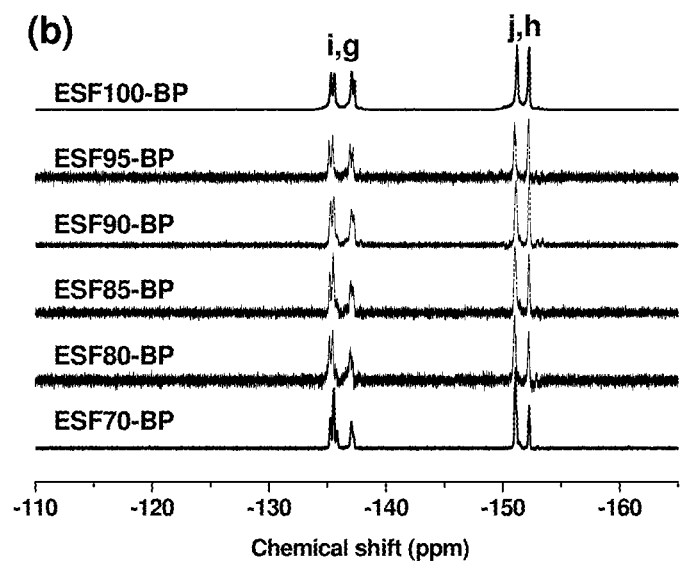
FIG. 18 provides $^{19}$F NMR spectra of ESFx-BP as a function of sulfonation level as discussed in Example 2.

The molecular structures of ESFx-BP were characterized by $^1$H NMR, and $^{19}$F NMR spectrum. The $^1$H NMR spectra of ESFx-BP (FIG. 17) as a function of sulfonation level showed clear trends in their peaks near 7.51 ppm corresponding to the prevalence of the SHQ moiety as compared to the BP moeity. For example the peak at 7.51 ppm became much more pronounced at high sulfonation level (higher SHQ content). On the other hand, the peaks centered at 7.71(peak d) and 7.34(peak e) ppm (corresponding to the BP moiety) decreased with increasing DS (reduced BP content). The subpeak at 4.2 ppm was due to the ethynyl crosslinking moiety and was used for molecular weight determination. The $^{19}$F NMR spectra of ESFx-BP were dominated by peaks centered at −135.42, −137.20, −151.14 and −152.25 ppm, corresponding to two ortho and two $^{meta}$ fluorine atoms, respectively (identified in FIG. 18). The fluorine peak associated with the para position expected at −146.82 ppm was not observed, confirming complete nucleophilic aromatic substitution. These ESFx-BP copolymers were soluble in aprotic polar solvents such as DMSO, DMF, DMAc, and NMP, allowing processing into membranes and confirming cross-linking reactions had been avoided.

Table 3 below provides DS, inherent viscosity, molecular weight and yield of non-cross-linked ESFx-BP, as well as the heat flow per mass associated with complete cross-linking of these samples.

TABLE 3

Properties of Non-cross-linked ESF-BP Copolymer

| sample | DS (%) target | DS (%) measured | $\eta_{Inh}$ (dL/g) | $M_n$ (g/mol) | yield (%) | ΔH for cross-linking (J/g) |
|---|---|---|---|---|---|---|
| ESF70-BP-0 | 70 | 68 | 0.905 | 18 546 | 94 | 57.7 |
| ESF80-BP-0 | 80 | 80 | 1.006 | 18 961 | 94 | 56.5 |
| ESF85-BP-0 | 85 | 85 | 1.048 | 18 748 | 92 | NA |
| ESF90-BP-0 | 90 | 89 | 1.240 | 16 199 | 95 | 65.8 |
| ESF95-BP-0 | 95 | 94 | 1.233 | 19 839 | 94 | 61.3 |
| ESF100-BP-0 | 100 | 100 | 0.787 | 15 292 | 94 | 67.1 |

NA: Not available

The DS was calculated from the ratio of peaks between the sulfonated region (7.51 ppm; peak a in FIG. 17) and the unsulfonated (7.71 ppm; peak d in FIG. 17) region from $^1$H NMR. The measured DS for the ESFx-BP polymers is in a good agreement with target DS. Inherent viscosity ($\eta_{inh}$) of ESFx-BP was between 0.787-1.240 (dL/g), corresponding molecular weight by 1H NMR end group analysis was of 15,292-19,839 g/mol and heat flow per mass as obtained by DSC for complete cross-linking ranged between 56 to 67 J/g. All copolymers were synthesized with high yields between 92 to 95%. The molecular weight obtained has reasonable qualitative agreement, but suggests that experimental uncertainty or complex trends prevent stronger trends. Still, the spread of molecular weight values is relatively minor as little as ±10%. Based on this narrow range of molecular weights, potential molecular weight effects are ignored in further discussion. Comparison of enthalpy of each polymer also suggests that the number of cross-links is similar at a given degree of cross-linking of each of the samples presented on a mass normalized basis.

Figure 19:
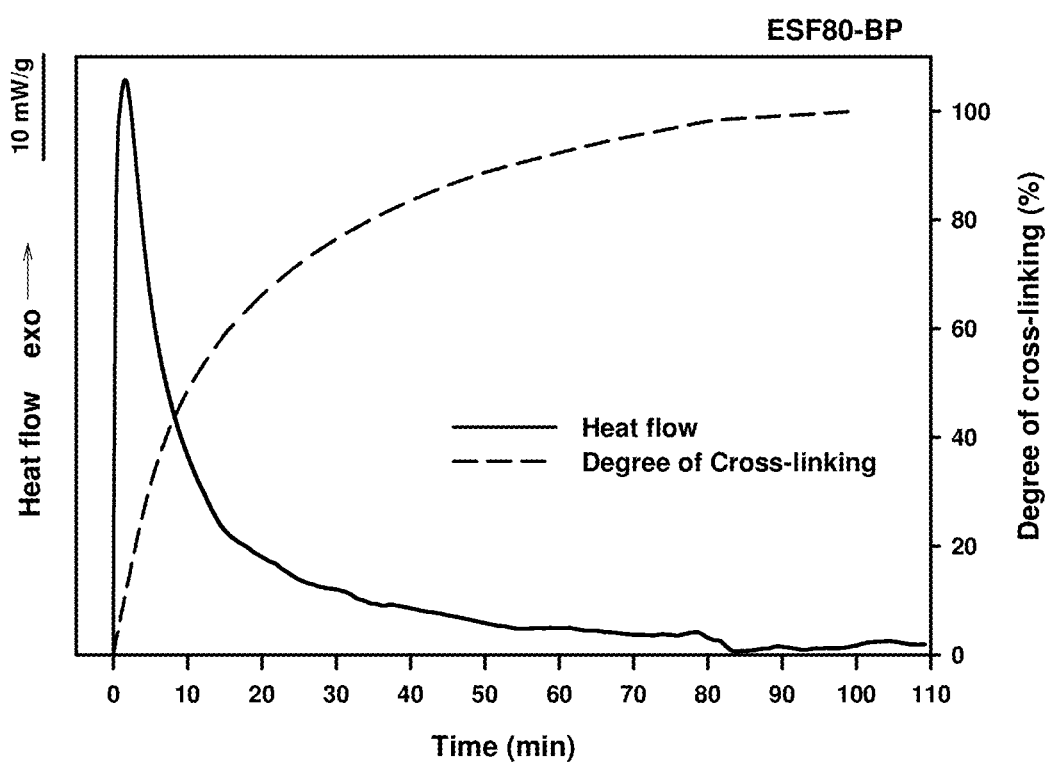
FIG. 19 is a graph of heat flow and degree of crosslinking as a function of time illustrating cross-linking kinetics and degree of crosslinking as discussed in Example 2.

ESFx-BP membranes were thermally cross-linked at 250° C. Temperature scans from 50° C. to 300° C. at 10° C./minute of ESFx-BP indicated by the appearance of a reaction exothermic peak that the onset of ethynyl end-group reaction occurred at about 220° C. This high reaction temperature suggests that cross-linking reactions at fuel cell operating temperatures are negligible and could be safely avoided in membrane processing until specifically intended. Cross-linking kinetics and DC were gauged by DSC isotherm experiments like that shown in FIG. 19 for ESF80-BP. About 60% of cross-linking reaction occurred within first 20 minutes and further cross-linking took place roughly proportional to time afterwards. Heating at 250° C. for 100 minutes appeared to give complete cross-linking conversion of ethynyl end group as judged by no further exothermic peak in DSC at longer times. The extent of cross-linking was estimated by comparison of the integrated area under the DSC isotherm as a function of time, normalized to "complete" or "100%" cross-linking that occurred after 100 minutes. DC was calculated from reaction time of each sample and reported.

E. Effect of DS

Table 4 below provides the density, IEC, IECV, IECV (WET), water uptake (WU), and conductivity of non-cross-linked (ESFx-BP-0) and fully cross-linked (ESFx-BP-100) copolymers as a function of DS.

TABLE 4

Properties of the Non-Cross-Linked and Cross-Linked Esfx-Bp Membranes as a Function of DS

| sample | density (g/) | IEC (meqv/) | IEC$_V$ (meqv/) | IEC$_{V(WET)}$ (meqv/) | water up take (wt. %) | conductivity (mS/cm) |
|---|---|---|---|---|---|---|
| ESF70-BP-0 | 1.48 | 1.45 | 2.15 | 1.36 | 39 | 64 |
| ESF80-BP-0 | 1.51 | 1.66 | 2.51 | 0.91 | 116 | 82 |
| ESF85-BP-0 | 1.52 | 1.76 | 2.68 | 0.45 | 321 | 16[b] |
| ESF90-BP-0 | 1.54 | 1.86 | 2.86 | 0.29 | ~580 | 2[b] |
| ESF95-BP-0 | 1.57 | 1.96 | 3.08 | 0.15 | ~1240 | ~0 |
| ESF100-BP-0 | 1.65 | 2.07 | 3.42 | 0.07 | >2700 | ~0[b] |
| ESF70-BP-100 | 1.50 | 1.45 | 2.18 | 1.67 | 20 | 53 |
| ESF80-BP-100 | 1.54 | 1.66 | 2.56 | 1.75 | 30 | 74 |
| ESF85-BP-100 | 1.56 | 1.76 | 2.75 | 1.78 | 35 | 94 |
| ESF90-BP-100 | 1.60 | 1.86 | 2.98 | 1.76 | 43 | 110 |
| ESF95-BP-100 | 1.65 | 1.96 | 3.23 | 1.26 | 95 | 131 |
| ESF100-BP-100 | 1.68 | 2.07 | 3.48 | 1.03 | 142 | 144 |
| BPSH-30[a] | 1.30 | 1.34 | 1.74 | 1.24 | 31 | 40 |
| BPSH-35[a] | 1.34 | 1.54 | 2.06 | 1.34 | 40 | 72 |
| BPSH-45[a] | 1.41 | 1.92 | 2.74 | 1.15 | 98 | 140 |

[a]disulfonated poly(arylene ether sulfone)s; data was taken from ref. 26.
[b]estimated from the conductivity vs. degree of cross-linking plot.

Properties of a similar non-fluorinated hydrocarbon polymer, BPSH, are presented as well for comparison purposes. All three polymer families show clear trends in the dry state with increasing density, IEC, and IECV as a function of increasing sulfonation level. WU also increased with DS for the three different families of polymers studied; however, the non-cross-linked ESFx-BP membranes with high DS (i.e. >80%) had very high water uptakes, forming hydrogels that lacked mechanical integrity.

The BPSH family of polymers presented has been shown to have similar features at higher IEC and molecular weight than those reported here for non-cross-linked ESFx-BP. The cross-linked ESFx-BP membranes had significantly lower WU than non-cross-linked ESFx-BPs when compared at the same DS, and this tendency was more pronounced at high DS. For example, ESF100-BP showed the largest WU reduction from >2700 to 142% after cross-linking, while ESF70-BP showed a WU reduction from 39 to 20%. The cross-linking density of these two systems is expected to be similar since the non-cross-linked molecular weights (and changes in mass normalized DSC thermograms based on cross-linking reaction time) are similar. These data show the importance and ability of modestly cross-linked samples to limit water uptake, particularly at high degrees of sulfonation.

Proton conductivity of non-cross-linked ESFx-BP-0 membranes showed a maximum value of 82 mS/cm at 80% DS. Similar behavior was also reported in the PFSA Nafion® membranes where proton conductivity went through a maximum of 120 mS/cm at an EW of 900-1000 g/equivalents. In general, the trend in polymer electrolytes is toward increased conductivity with increased acid content, however at high sulfonation levels increased acid content (on a dry polymer basis) results in water uptake becoming excessive due to the polymers inability to prevent swelling and the subsequent dilution of acid groups that occurs at high water contents without some other way to inhibit water uptake such as cross-linking as described here. Acid group (or equivalently proton) concentration relevant for these materials under operating conditions can be more appropriately expressed by a hydrated, volume based IEC (IECV (wet)) also is presented in Table 4. Non-cross-linked, ESFx-BP-0, samples exhibit low conductivity at high sulfonation levels due to dilution effects resulting in decreased effective acid concentrations apparent from IECV(wet) values dropping by more than an order of magnitude between ESF70-BP-0 and ESF100-BP-0. The maximum conductivity obtained for the non-cross-linked ESFx-BP-0 membranes is around 0.9 meqv/cm3 (IECV(wet)), corresponding to a DS of 80%. While this IECV(wet) is less than for the sample with DS of 70%, the conductivity values obtained are affected by several factors including the concentration of protons in the membrane (IECV(wet)), but also depending on other factors such as overall water uptake and structure (which includes aspects such as interanionic distances, separation of hydrophilic and hydrophobic regions, and number of water molecules per proton). For the fully cross-linked ESFx-BP-100 membranes, IECV(wet) went through a maximum around a DS of 85% and decreased only modestly even at 100% DS. The modest dilution effect was not as significant on conduction as the added water, and proton conductivity increased with increasing DS over the full range of compositions explored. The BPSH family of polymers shows similar trend with fully cross-linked ESFx-BP-100 membranes.

When comparing conductivity at similar water uptakes, fully cross-linked ESFx-BP-100 membranes exhibited significantly higher conductivity than non-cross-linked ESFx-BP-0 membranes. For example, the conductivity of non-cross-linked ESF70-BP-0 (WU=39%) was 64 mS/cm, which was only 70% of the conductivity for the cross-linked ESF85-BP-100 (WU=35%). These data show the importance and ability of cross-linking to provide significant gains in conductivity at a given water uptake.

F. Effect of DC

Degree of cross-linking (DC) is a percentage value that represents how much cross-linking reaction has occurred assuming 100% reaction after 100 minutes at 250° C. where DSC exotherms show complete reaction. For end-group cross-linking, the cross-linking density or molecular weight between cross-links (Mc) of the fully cross-linked polymers is determined by the molecular weight (Mn) of the end-group capped non-cross-linked polymer. In general, it is rather difficult to control the molecular weight of sulfonated polymers via nucleophilic aromatic substitution due to the water absorbing sulfonated monomer. However, the ESFx-BP copolymers we synthesized have similar, so we assume that Mc of all ESF-BP copolymers changes with DC in a similar manner and present DC instead of Mc as a tunable parameter.

DC was probed by the extent of time that samples were held at 250° C. to induce cross-linking reactions. Water uptake, IECV(wet), number of water molecules per acid site (often referred to as hydration number and abbreviated $\lambda$), and proton conductivity of ESFx-BP-y samples (where x is DS and y is DC) are presented in Table 5, below.

TABLE 5

Properties Of The ESF-BP Membranes as a Function of DC

| sample | water uptake (wt %) | $\lambda$ (# $H_2O/SO_3H$) | $IEC_{V(WET)}$ (meqv/cm$^3$) | Conductivity (mS/cm) |
|---|---|---|---|---|
| ESF70-BP-0 | 39 | 14.9 | 1.36 | 64 |
| ESF70-BP-56 | 33 | 12.6 | 1.44 | 70 |
| ESF70-BP-72 | 29 | 11.1 | 1.50 | 68 |
| ESF70-BP-100 | 20 | 7.7 | 1.67 | 53 |
| ESF80-BP-0 | 110 | 36.8 | 0.91 | 82 |
| ESF80-BP-49 | 72 | 24.1 | 0.96 | 88 |
| ESF80-BP-66 | 54 | 18.1 | 1.18 | 89 |
| ESF80-BP-92 | 35 | 11.7 | 1.57 | 78 |
| ESF80-BP-100 | 30 | 10.0 | 1.75 | 74 |
| ESF90-BP-0 | ~580 | ~173 | 0.29 | 2 |
| ESF90-BP-39 | 152 | 45.4 | 0.87 | 96 |
| ESF90-BP-52 | 116 | 34.6 | 1.01 | 118 |
| ESF90-BP-79 | 71 | 21.2 | 1.39 | 130 |
| ESF90-BP-83 | 60 | 17.9 | 1.51 | 133 |
| ESF90-BP-90 | 47 | 14.0 | 1.69 | 120 |
| ESF90-BP-100 | 43 | 12.8 | 1.76 | 110 |
| ESF95-BP-0 | ~1240 | ~351 | 0.15 | ~0 |
| ESF95-BP-42 | 206 | 58.4 | 0.73 | 70 |
| ESF95-BP-58 | 163 | 46.2 | 0.87 | 103 |
| ESF95-BP-69 | 139 | 39.4 | 0.97 | 117 |
| ESF95-BP-82 | 125 | 35.4 | 1.05 | 136 |
| ESF95-BP-87 | 113 | 32.0 | 1.14 | 143 |
| ESF95-BP-95 | 108 | 30.6 | 1.16 | 139 |
| ESF95-BP-100 | 95 | 26.9 | 1.25 | 133 |
| ESF100-BP-0 | >2700 | ~724 | 0.07 | ~0 |
| ESF100-BP-38 | 219 | 58.8 | 0.74 | 57 |
| ESF100-BP-57 | 188 | 50.4 | 0.78 | 93 |
| ESF100-BP-70 | 165 | 44.3 | 0.92 | 131 |
| ESF100-BP-80 | 160 | 42.9 | 0.94 | 137 |
| ESF100-BP-88 | 157 | 42.1 | 0.95 | 140 |
| ESF100-BP-93 | 151 | 40.5 | 0.98 | 144 |
| ESF100-BP-99 | 148 | 39.7 | 1.00 | 144 |
| ESF100-BP-100 | 142 | 38.1 | 1.03 | 144 |

Figure 20:
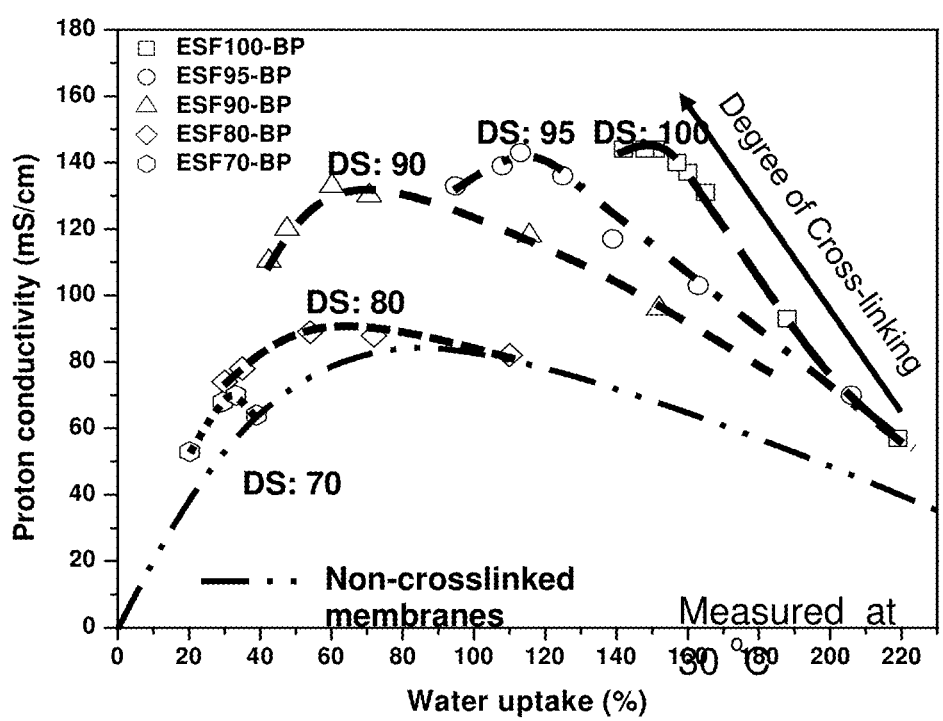
FIG. 20 is a graph of proton conductivity and water uptake with degree of sulfonation and degree of crosslinking.

The proton conductivity versus water uptake data of Table 5 is reproduced in graphical form in FIG. 20 to illustrate trends. Table 5 and FIG. 20 clearly show the dependence of water uptake on DC. Additionally, FIG. 20 shows that proton conductivity goes through a maximum, increasing for some time as water uptake is decreased and then decreasing with further reductions in water uptake. This data highlights the tradeoffs between dilution due to excess water and the role of increased water content in enhancing proton conduction. Similar qualitative features to these cross-linked curves are reflected in the non-cross-linked membrane curve as well also shown in FIG. 20.

From the data in Table 5 and FIG. 20 the maximum conductivity achievable with cross-linking at a specific DS increased as DS increased with DS 100 having higher maximum conductivity than DS 95 and DS 95 having higher maximum conductivity than DS 90, etc. Two trends related to this increasing conductivity as a function of DS are also apparent: 1) the DC at which maximum conductivity occurs at a given DS increases with increasing DS (in other words, at higher sulfonation levels higher cross-linking results in higher maximum conductivity); and 2) the water uptake where the maximum conductivity at a given DS occurs as a function of cross-linking increases as a function of DS. Between DS 70 and 90, relatively small increases in water uptake result in meaningful increases in conductivity, but above DS 90 relatively large increases in water uptake result in rather modest gains in conductivity. These results reflect the effectiveness with which additional water is contributing to conduction and can be at least partially rationalized through hydration number differences. At lower sulfonation levels hydration numbers below 20 (and as low as about 13 for DS 70) waters per acid group are where maximum conductivities occur. At these relatively low water contents the increased ion mobility associated with the presence of additional water outweighs dilution issues or increased distances within conducting domains. At high sulfonation levels hydration numbers above 30 and approaching 40 are where maximum conductivities occur. At these relatively high water contents the presence of additional water does little to increase ion mobility and aspects such as acid dilution and increased distance become more important.

G. Fuel Cell Performance

Figure 21:
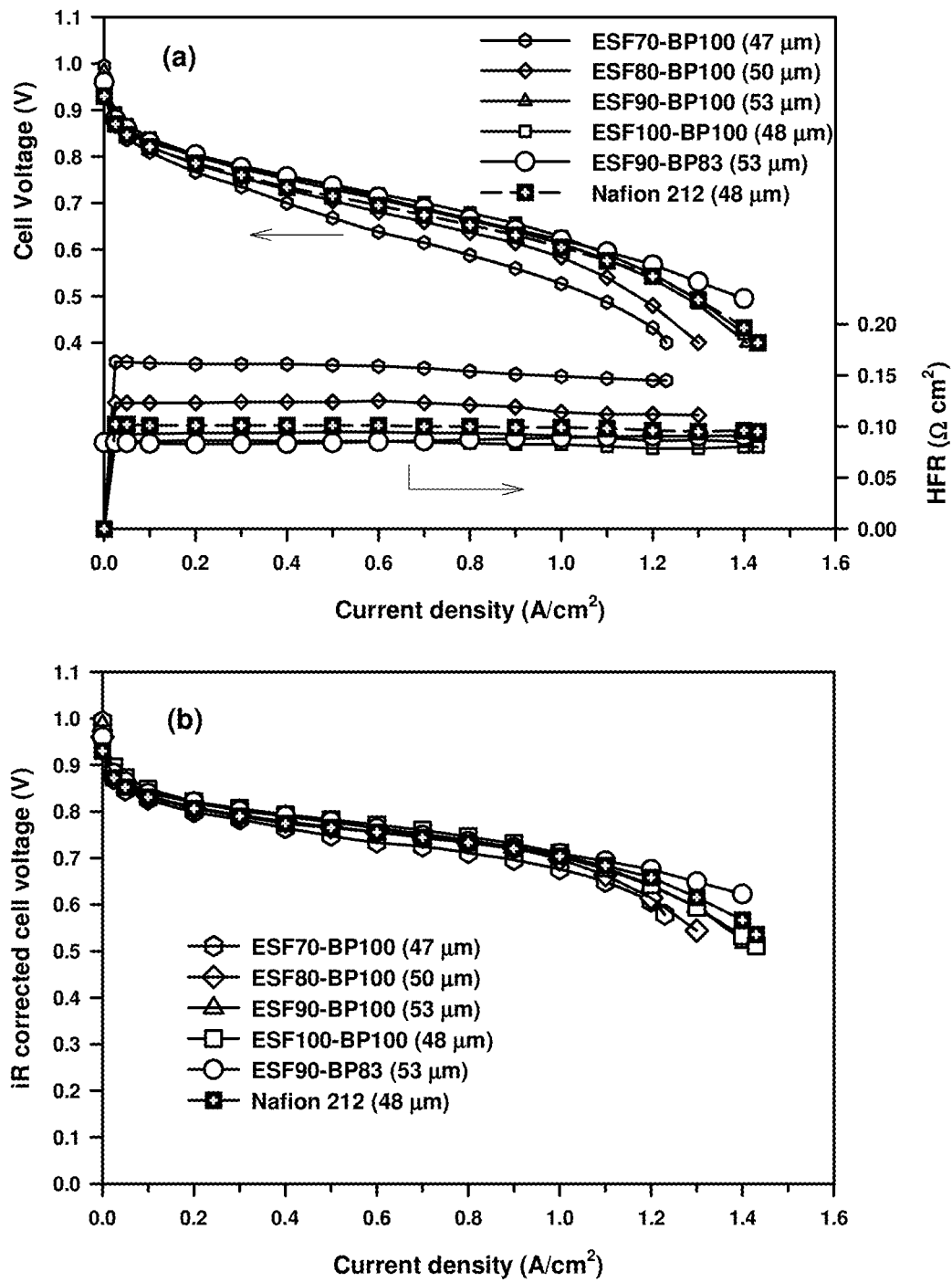
FIG. 21 provides $H_2$/air polarization curves of ESF-BPs and Nafion 212; iR incorrected (a) and iR corrected (b) (membrane thickness in parenthesis; performance measured at 80° C. under fully humidified conditions. Pt loading: 0.2 mg/cm$^2$).

The data presented concern evaluating the effect of polymer cross-linking to improve polymer electrolyte properties. The implementation of these or similar materials in fuel cells is the ultimate goal. In order to access the potential of these materials in fuel cell applications fuel cell testing was performed on select membranes. Membrane electrode assemblies (MEAs) using non-cross-linked ESFx-BP-0 membranes with high DS (ca. 80% DS) were not mechanically stable due to excessive water uptake of the membranes. However, mechanically stable MEAs using cross-linked ESFx-BP-y even with high DS were possible. FIG. 21 provides H$_2$/air fuel cell performance of MEAs using ESF70, 80, 90, and 100-BP-100, ESF90-BP-83 and Nafion® 212. High frequency resistance (HFR) of fully cross-linked (i.e. ESFx-BP-100) membranes decreased from 0.147 to 0.086 Ω cm$^2$ and cell performance increased as DS increased from 70 to 100%. HFR of ESF90-BP-83 was 0.089 92 cm$^2$ which was noticeably less than those of fully cross-linked ESF90-BP-100 (ca. 0.094 Ω cm$^2$) and Nafion® (ca. 0.100 Ω cm$^2$). The polarization curves reflect the conductivity behavior of free-standing membranes. FIG. 21 shows the iR corrected performance and shows that differences in performance are based entirely (within experimental error) on conductance differences between samples. This high performance and consistency between membrane samples shows that we have produced high quality MEAs for each of the samples. MEAs using ESF100-BP-100 and ESF90-BP-83 exhibited slightly better performance than the MEA using Nafion® 212. ESF70 and 80-BP100 showed inferior fuel cell performance to Nafion® 212. Open circuit voltage (OCV) of MEAs using ESF-BPs membranes was noticeably higher (ca. 0.96-1.0 V) than that of Nafion® MEA (ca. 0.93 V), indicating less hydrogen crossover.

Example 3

This example evaluates the performance of membranes comprising a crosslinked polyaryl compound (XL10-BPN1) (cross-linked 10 mol. %), shown below.

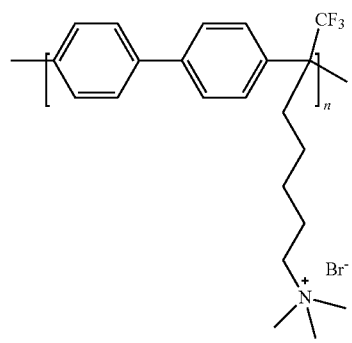

Membranes were formed using this material and had a thickness of 25-30 μm; a molecular weight (Mn) of 64,000 Daltons; a Polydispersity Index of 1.8; and a theoretical IEC of 2.6 mequiv/g. These membranes were pretreated in phosphoric acid and tested in a 5 cm$^2$ high temperature fuel cell using a commercial Pt/C catalyst, 0.6 mg$_{Pt}$/cm$^2$ at both the anode and cathode.

A. MEA Preparation

The polyaryl compound was synthesized according to the procedure reported by W. H. Lee, Y. S. Kim, C. Bae, *ACS Macro Letters*, 4, 8, 814-818 (2015), which is incorporated herein by reference. The membranes were pretreated in 85% phosphoric acid for 5 minutes at room temperature, then dried on a vacuum table @ 60° C. for 30 minutes. GDEs were made using a commercial gas diffusion layer (ELAT/NC/SS V211) and a catalyst ink having the following composition:

TABLE 6

| COMPONENT | AMOUNT |
| --- | --- |
| 60% Pt/C (Alfa Aesar) | 10 mg |
| QASOH Ionomer (5%) | 48 mg |
| Ethylene Glycol | 250 mg |
| Methanol | 1000 mg |

The prepared ink catalyst was sonicated for 90 seconds and applied equally to 2-5 cm$^2$ ELAT backings (anode and cathode) on vacuum table @ 80° C. and allowed to cure for 60 minutes. After curing, the GDEs were immersed in PA for 10 minutes, followed by lightly blotting and set aside.

B. Fuel Cell Assembly and Testing

Using the pretreated membrane and prepared anode and cathode on ELAT, the fuel cell was assembled using Teflon coated gasket material of 0.21 mm thickness. A torque of 55 pounds was applied to the hardware.

The fuel cell underwent a 16 hour break-in period at 140° C. with non-humidified gases using flow rates of 300 sccm hydrogen, 300 sccm oxygen and a back pressure of 10 psig. The break-in increased the current from 0.92 to 7.55 A over the 16 hour period with a constant voltage of 0.4 V.

Figure 23:
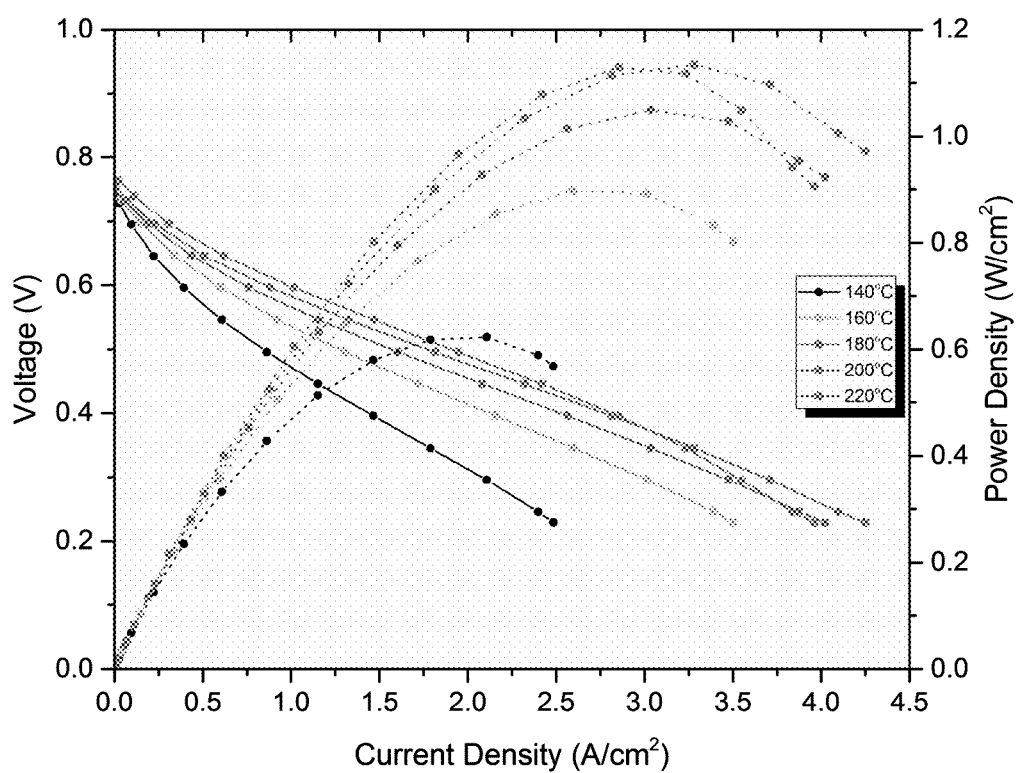
FIG. 23 is a graph of current density (A/cm$^2$) versus voltage (V) providing $H_2$/$O_2$ polarization curves and power density of an MEA comprising a PA-doped crosslinked polyaryl compound membrane according to Example 3 as a function of operating temperature under anhydrous conditions.

Hydrogen-oxygen performance was determined at various temperatures ranging from 140° C.-220° C. using non-humidified gases with flow rates of 300 sccm hydrogen and 300 sccm oxygen, and a backpressure of 10 psig. The hydrogen-oxygen polarization plots in FIG. 23 represent the values of the uncorrected upward scan. Fuel cell test results for the PA-doped polyaryl compound demonstrate the power density increasing with temperature. Over 1 W/cm$^2$ peak power density was obtained at an operating temperature >180° C.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A membrane electrode assembly, comprising a phosphoric acid-doped polymeric membrane comprising a polymer comprising at least one functional group, wherein the polymer is selected from polyaryl polymers, polyarylamides, polyimides, polystyrenes, polysulfones, polyethers, polyether sulfones, polyketones, polyetherketones, polyarylethers, polyolefins, and polynitriles, and wherein the at least one functional group is a cationic functional group (CFG) that forms a cation-phosphate ion pair, the cationic functional group being selected from ammonium

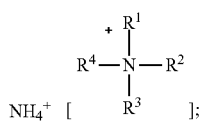

imidazolium

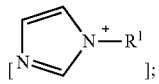

guanidinium

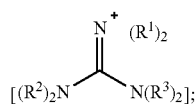

phosphazenium

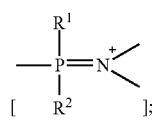

sulfonium

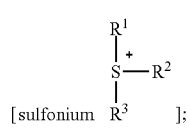

oxonium

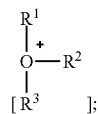

and phosphonium

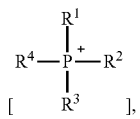

wherein $R^1$-$R^4$ are independently hydrogen, $C_{1-10}$ alkyl and benzyl.

2. The assembly according to claim 1 having an ion exchange capacity of 0.8 to 3 milliequivalents/g or 1.5 to 2.5 mmol/g and an operating temperature range of from 80° C. to a 220° C.

3. The assembly according to claim 1 wherein the polymer has a formula

[Polymer repeating unit]$_m$-[Optional Linker]$_o$-[Cationic Functional Group (CFG)]$_n$ where m is two or more up to the number of monomeric subunits coupled to form a particular polymeric species; o is from 0 to at least m; and n is from 1 to at least o.

4. The assembly according to claim 3 wherein the polymer has a formula

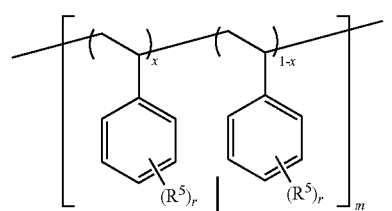

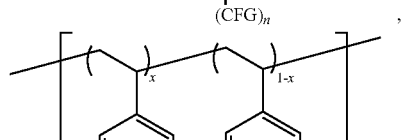

, or

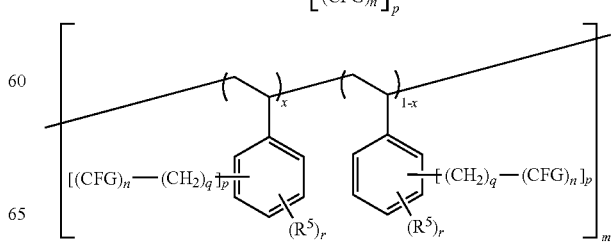

CFG is a cationic group selected from ammonium

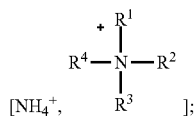

imidazolium

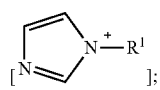

gaunidinium

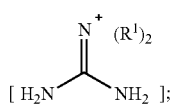

phosphazenium

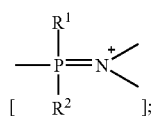

sulfonium

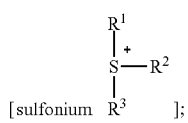

oxonium

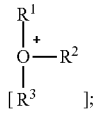

and phosphonium

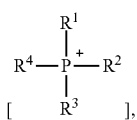

wherein $R^1$-$R^4$ are independently selected from hydrogen, aliphatic, aryl, and heteroaryl;
m is from two up to the number of monomeric subunits coupled to form a particular polymeric species;
p is from 1 to the number of possible positions available on the monomeric unit;
$R^5$ is a substituent selected from alkyl, alkenyl, alkynyl, alkoxy, alkylamino, alkylthio, acyl, aldehyde, amide, amino, aminoalkyl, aryl, arylalkyl, carboxyl, cyano, cycloalkyl, dialkylamino, halo, haloaliphatic, heteroaliphatic, heteroaryl, heterocycloaliphatic, hydroxyl, nitrile, oxo, sulfonamide, sulfhydryl, thioalkoxy, or other functionality;
r is 0 to 4; and
x is from 0 to 0.99.

5. The assembly according to claim 3 wherein the polymeric material has a formula

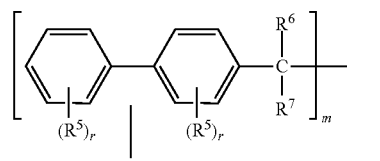

or

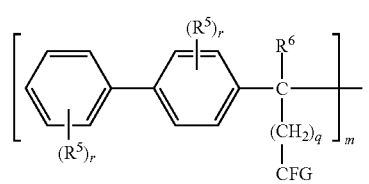

where:
CFG is a cationic group selected from ammonium

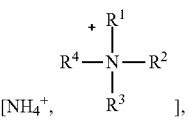

imidazolium

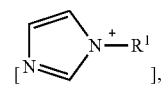

gaunidinium

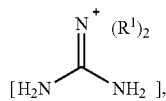

phosphazenium

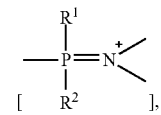

sulfonium

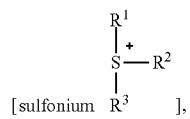
[sulfonium], oxonium

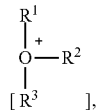
[ ], and phosphonium

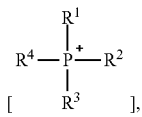
[ ], wherein $R^1$-$R^4$ are independently selected from hydrogen, aliphatic, aryl, and heteroaryl;
  $R^5$ is a substituent selected from alkyl, alkenyl, alkynyl, alkoxy, alkylamino, alkylthio, acyl, aldehyde, amide, amino, aminoalkyl, aryl, arylalkyl, carboxyl, cyano, cycloalkyl, dialkylamino, halo, haloaliphatic, heteroaliphatic, heteroaryl, heterocycloaliphatic, hydroxyl, nitrile, oxo, sulfonamide, sulfhydryl, thioalkoxy, or other functionality; m is from two up to the number of monomeric subunits coupled to form a particular polymeric species;
  $R^6$ and $R^7$ are independently selected from hydrogen, aliphatic, heteroaliphatic, aryl, heteroaryl, m is two or more up to the number of monomeric subunits coupled to form a particular polymeric species;
  n is from 1 to at least m;
  q is 1 to 10; and
  r is from 0 to 4.

6. The assembly according to claim 3 wherein the polymeric material is a polyether sulfone having a formula

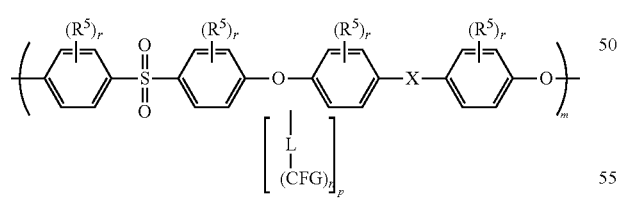

where:
  CFG is a cationic group selected from ammonium

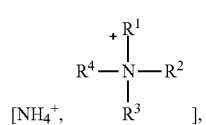
[$NH_4^+$, ], imidazolium

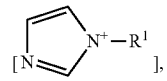
[ ], gaunidinium

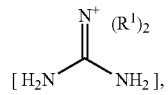
[ ], phosphazenium

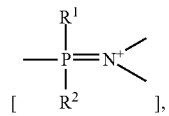
[ ], sulfonium

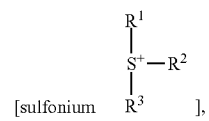
[sulfonium ], oxonium

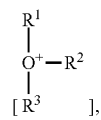
[ ], and phosphonium

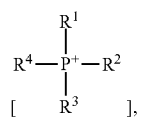
[ ], wherein $R^1$-$R^4$ are independently selected from hydrogen, aliphatic, aryl, and heteroaryl;
  L is a linker;
  $R^5$ is a substituent selected from alkyl, alkenyl, alkynyl, alkoxy, alkylamino, alkylthio, acyl, aldehyde, amide, amino, aminoalkyl, aryl, arylalkyl, carboxyl, cyano, cycloalkyl, dialkylamino, halo, haloaliphatic, heteroaliphatic, heteroaryl, heterocycloaliphatic, hydroxyl, nitrile, oxo, sulfonamide, sulfhydryl, thioalkoxy, or other functionality; m is from two up to the number of monomeric subunits coupled to form a particular polymeric species;
  m is two or more up to the number of monomeric subunits coupled to form a particular polymeric species;
  n is from 1 to at least m;
  p is 1 to 5;
  r is from 0 to 4; and X is not present, or is selected from SO, SO₂, CO, O, S,

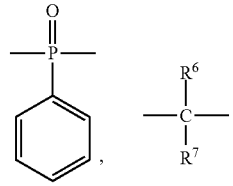

where R⁶ and R⁷ are aliphatic, heteroaliphatic, aryl, or heteroaryl,

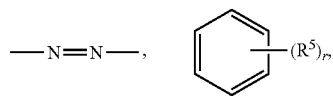

and combinations thereof.

7. The assembly according to claim 6 wherein X is

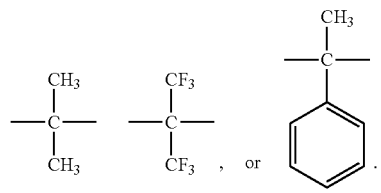

8. The assembly according to claim 6 wherein the polyether sulfone has a formula selected from

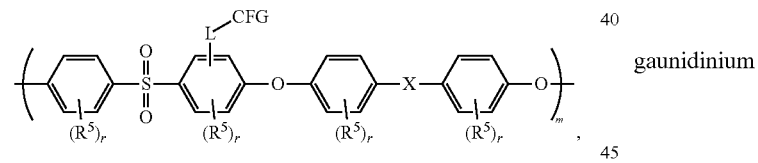

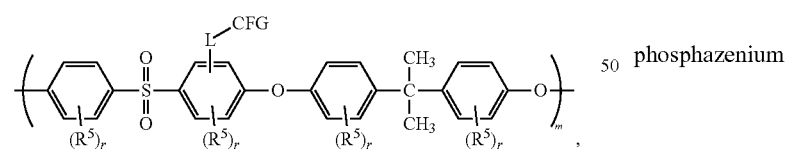

and

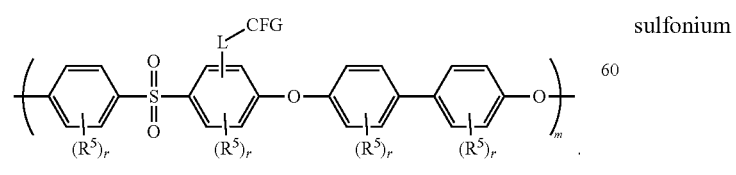

9. The assembly according to claim 3 wherein the polymeric material is a polyketone having a formula

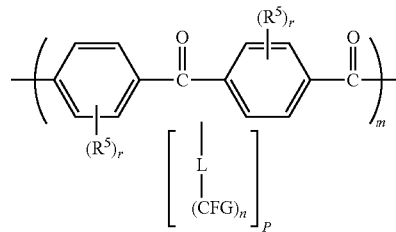

or a polyetherketone having a formula

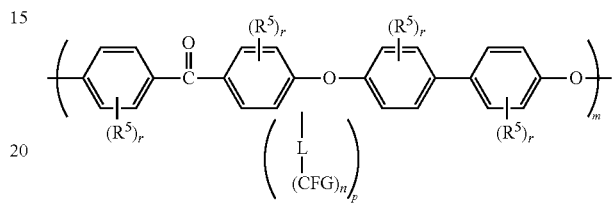

where:
CFG is a cationic group selected from ammonium

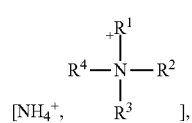

imidazolium

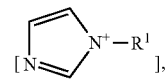

gaunidinium

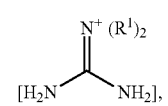

phosphazenium

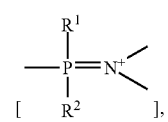

sulfonium

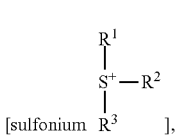

oxonium

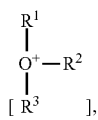

and phosphonium

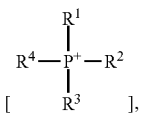

wherein R¹-R⁴ are independently selected from hydrogen, aliphatic, aryl, and heteroaryl;
L is a linker;
R⁵ is a substituent selected from alkyl, alkenyl, alkynyl, alkoxy, alkylamino, alkylthio, acyl, aldehyde, amide, amino, aminoalkyl, aryl, arylalkyl, carboxyl, cyano, cycloalkyl, dialkylamino, halo, haloaliphatic, heteroaliphatic, heteroaryl, heterocycloaliphatic, hydroxyl, nitrile, oxo, sulfonamide, sulfhydryl, thioalkoxy, or other functionality; m is from two up to the number of monomeric subunits coupled to form a particular polymeric species;
m is two or more up to the number of monomeric subunits coupled to form a particular polymeric species;
n is from 1 to at least m;
p is 1 to 5; and
r is from 0 to 4.

10. The assembly according to claim 3 wherein the polymeric membrane comprises a halogenated polyarylether or a nitrile-containing polyaryl ether having a formula

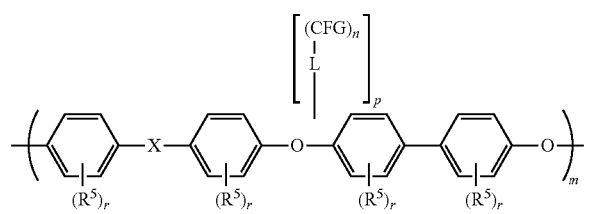

where:
CFG is a cationic group selected from ammonium

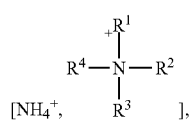

imidazolium

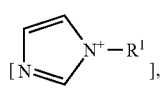

gaunidinium

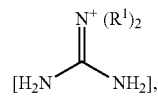

phosphazenium

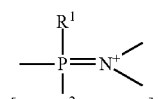

sulfonium

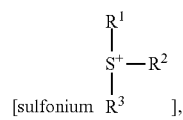

oxonium

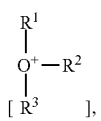

and phosphonium

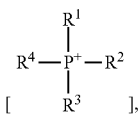

wherein R¹-R⁴ are independently selected from hydrogen, aliphatic, aryl, and heteroaryl;
L is a linker;
R⁵ is a halogen or nitrile;
m is two or more up to the number of monomeric subunits coupled to form a particular polymeric species;
n is from 1 to at least m;
p is from 1 to 5; and
r is from 0 to 4.

11. The assembly according to claim 10 wherein the polymeric material has a formula

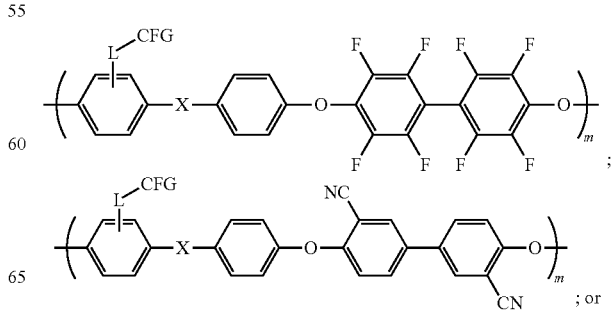

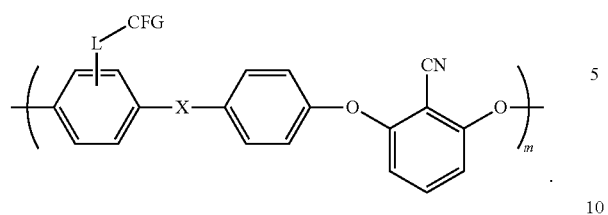
12. The assembly according to claim 3 comprising a phosphoric acid doped polymeric membrane comprising a material having a formula
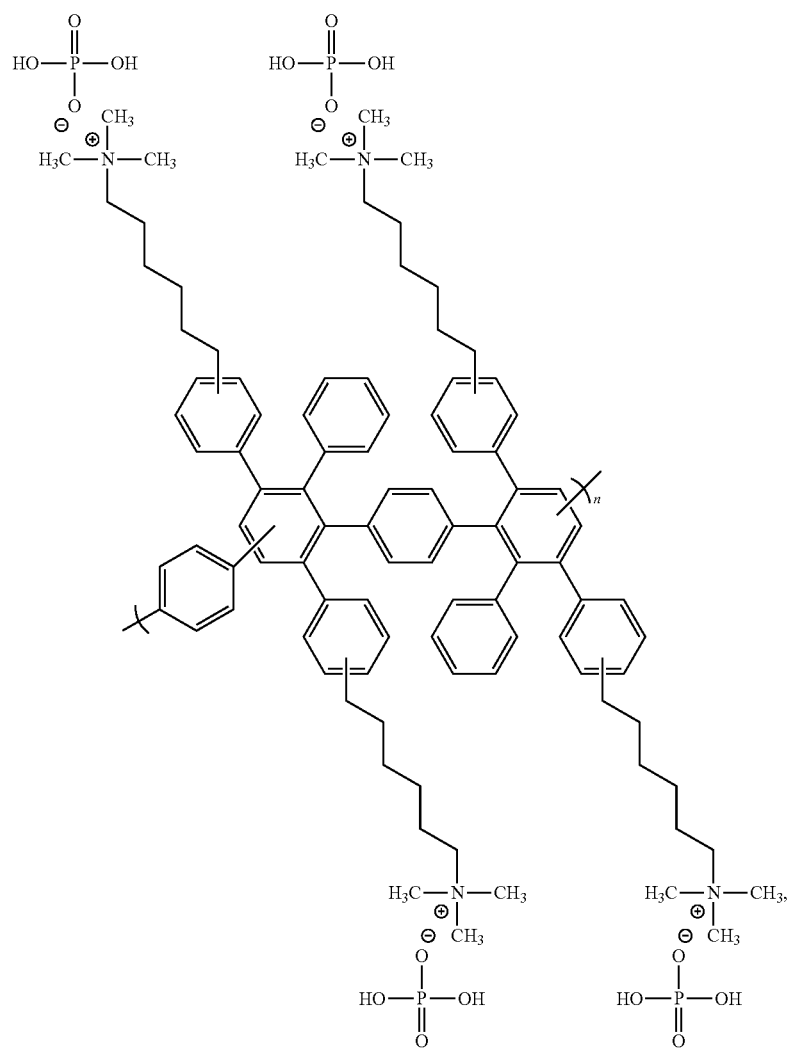

-continued

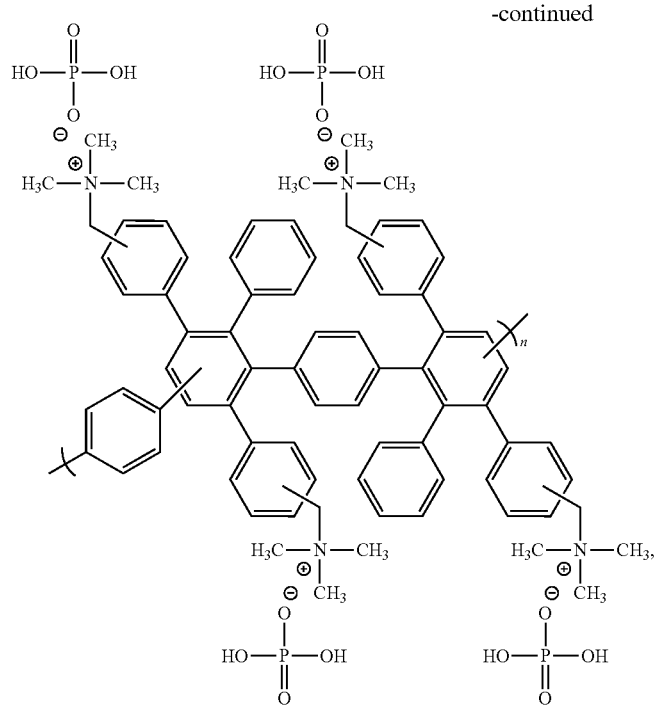

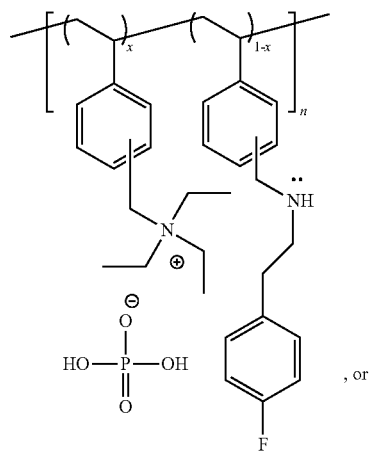, or

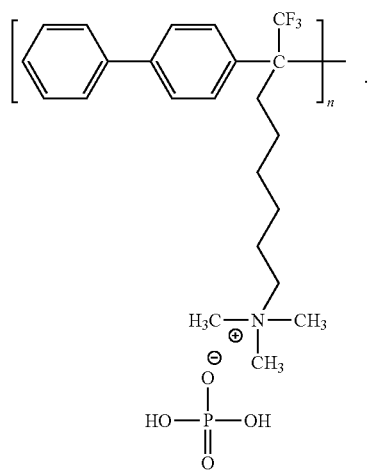

13. The assembly according to claim 1 wherein the polymer is crosslinked.

14. The assembly according to claim 1 comprising a quaternary ammonium tethered, phosphoric acid-doped polyaromatic polymer or a fluorinated or perfluorinated polymer.

15. A proton exchange membrane fuel cell comprising the assembly according to claim 1.

16. A vehicle, comprising a proton exchange membrane fuel cell according to claim 15.

17. A stationary power device comprising a proton exchange membrane fuel cell according to claim 15.

18. A membrane electrode assembly comprising a phosphoric-acid doped polymeric membrane comprising a polyphenylene polymer having a formula

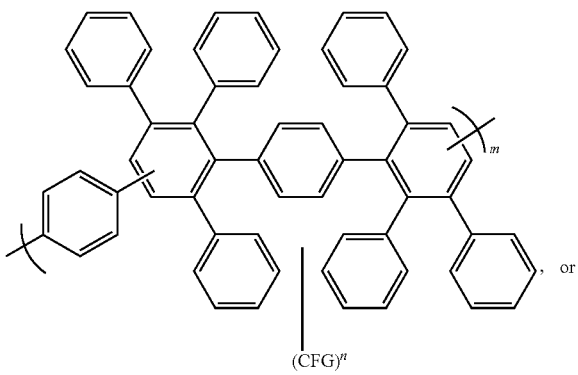, or

-continued

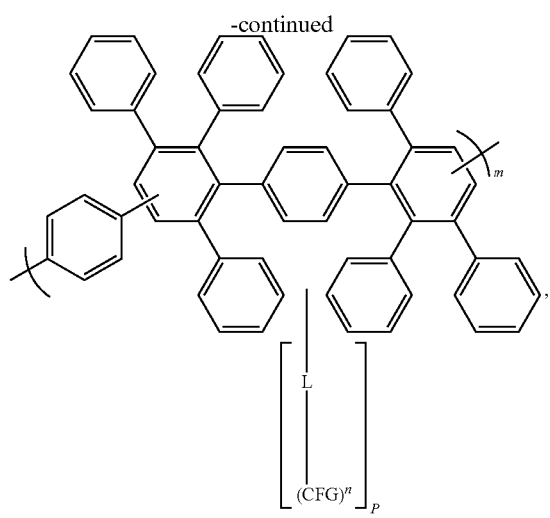

where m is 2 to 1000, n is at least 1 up to the number of total positions available on each monomeric unit, CFG is cationic functional group coupled to the polyphenylene core that forms a cation-phosphate ion pair and is selected from ammonium

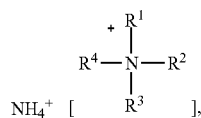

imidazolium

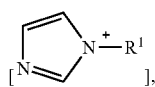

guanidinium

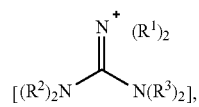

phosphazenium

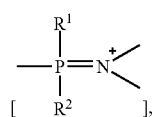

sulfonium

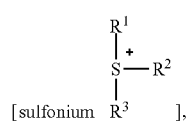

oxonium

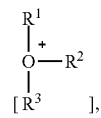

and phosphonium

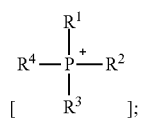

$R^1$-$R^4$ are independently hydrogen, $C_1$-$C_{10}$ alkyl and benzyl; L is a linker; and p is 1 to n.

19. The assembly according to claim 18 wherein the polymer has a structure

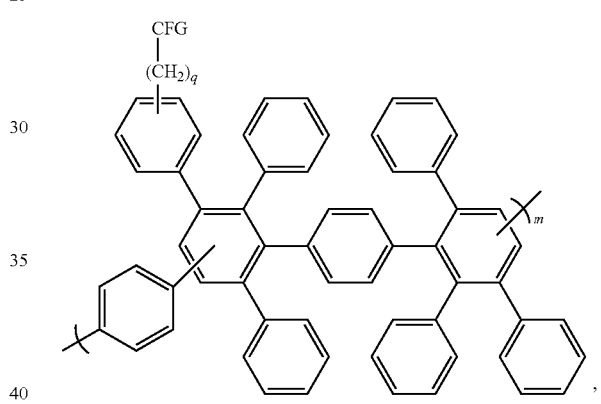

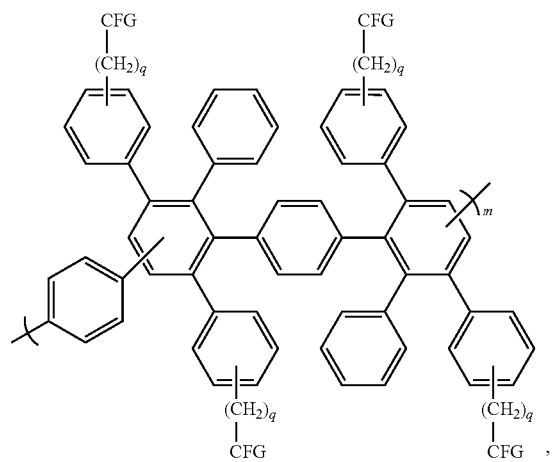

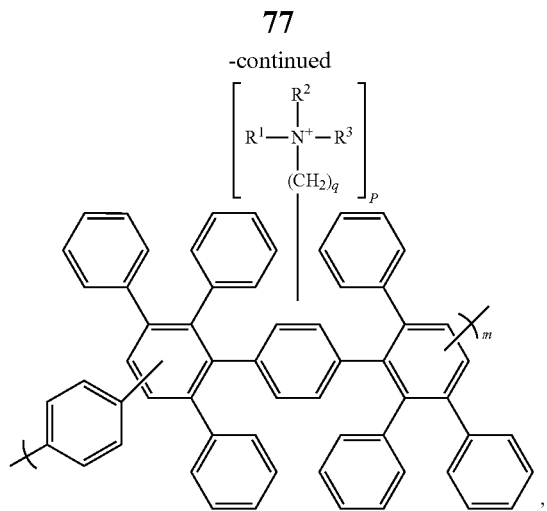

,

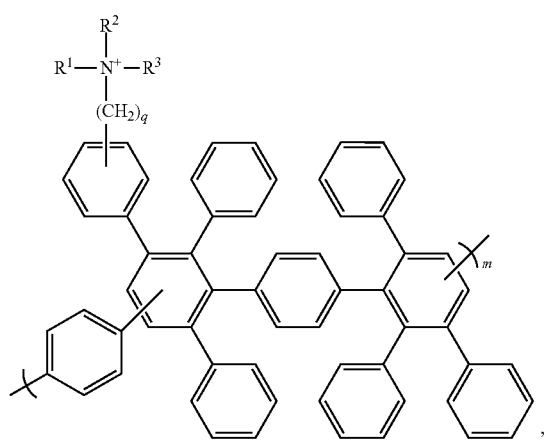

,

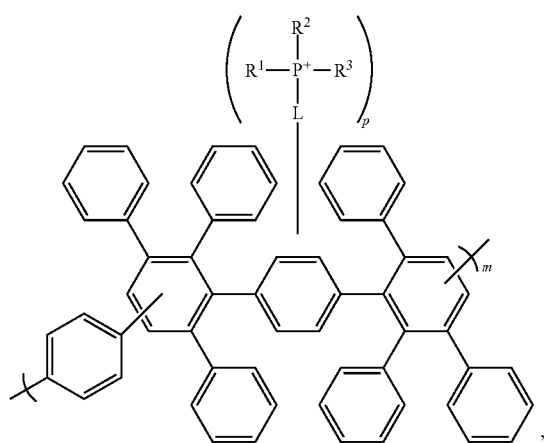

,

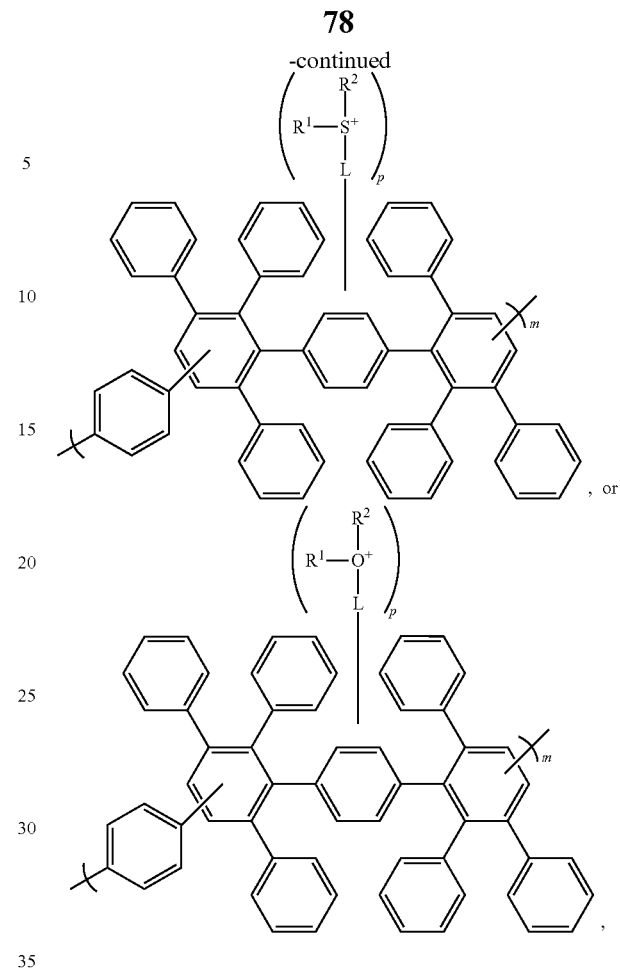

, or

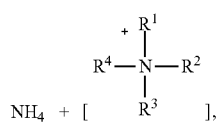

where q is from 1 to 10.

20. The assembly according to claim 18 wherein the linker is a $C_1$-$C_{10}$ alkyl linker or an aryl linker.

21. A membrane electrode assembly, comprising:
a phosphoric acid-doped polymeric membrane comprising a polymer and at least one functional group for each monomeric unit of the polymer, wherein the polymer is selected from polyaryl polymers, polyarylamides, polyimides, polystyrenes, polysulfones, polyethers, polyether sulfones, polyketones, polyetherketones, polyarylethers, polyolefins, and polynitriles, and wherein the at least one functional group is a cationic functional group (CFG) that forms a cation-phosphate ion pair and is selected from ammonium $$NH_4 \; + \; [ \quad R^4-\overset{+}{\underset{R^3}{N}}-R^2 \quad ],$$

imidazolium

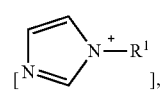

, guanidinium

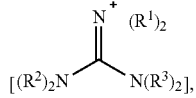

phosphazenium

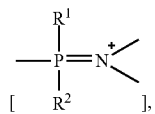

sulfonium

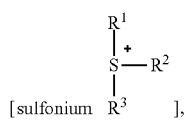

oxonium

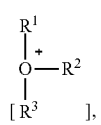

and phosphonium

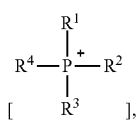

wherein $R^1$-$R^4$ are independently hydrogen, $C_{1-10}$ alkyl and benzyl;
a phosphoric-acid-doped, cationic-functionalized ionomeric binder;
an anode catalyst layer;
a cathode catalyst layer; and
an electrocatalyst.

22. A membrane electrode assembly, comprising a phosphoric acid-doped polymeric membrane comprising a polymeric material comprising plural monomeric units and at least one functional group per monomeric unit, wherein the polymer is selected from polyaryl polymers, polyarylamides, polyimides, polystyrenes, polysulfones, polyethers, polyether sulfones, polyketones, polyetherketones, polyarylethers, polyolefins, and polynitriles, and wherein the at least one functional group is a cationic functional group (CFG) that forms a cation-phosphate ion pair and is selected from ammonium

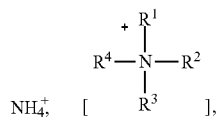

imidazolium

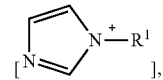

guanidinium

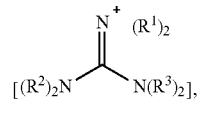

phosphazenium

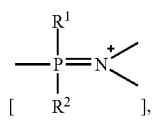

sulfonium

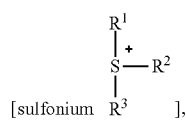

oxonium

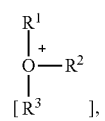

and phosphonium

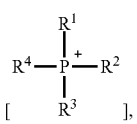

wherein $R^1$-$R^4$ are independently hydrogen, $C_{1-10}$ alkyl and benzyl.

* * * * *